US012640843B2

(12) United States Patent
Kim et al.

(10) Patent No.:     US 12,640,843 B2
(45) Date of Patent:     May 26, 2026

(54) METHOD, COMMUNICATION DEVICE, PROCESSING DEVICE, AND STORAGE MEDIUM FOR PERFORMING CHANNEL ENCODING, AND METHOD, COMMUNICATION DEVICE, PROCESSING DEVICE, AND STORAGE MEDIUM FOR PERFORMING CHANNEL DECODING

(71) Applicant: LG ELECTRONICS INC., Seoul (KR)

(72) Inventors: Bonghoe Kim, Seoul (KR); Kyungho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 18/858,984

(22) PCT Filed: Apr. 22, 2022

(86) PCT No.: PCT/KR2022/005766
§ 371 (c)(1),
(2) Date: Oct. 22, 2024

(87) PCT Pub. No.: WO2023/204328
PCT Pub. Date: Oct. 26, 2023

(65) Prior Publication Data
US 2025/0279849 A1     Sep. 4, 2025

(51) Int. Cl.
*H04L 1/18*     (2023.01)
*H04L 1/00*     (2006.01)

(52) U.S. Cl.
CPC .......... *H04L 1/0057* (2013.01); *H04L 1/0067* (2013.01)

(58) Field of Classification Search
None
See application file for complete search history.

(56) References Cited

U.S. PATENT DOCUMENTS

| | | | |
|---|---|---|---|
| 11,336,301 B2 * | 5/2022 | Huangfu | H04L 1/0057 |
| 2018/0323905 A1 * | 11/2018 | Shelby | H04L 1/0058 |

(Continued)

FOREIGN PATENT DOCUMENTS

| | | |
|---|---|---|
| EP | 3829089 | 6/2021 |
| WO | 2019024555 | 2/2019 |

OTHER PUBLICATIONS

PCT International Application No. PCT/KR2022/005766, International Search Report dated Jan. 19, 2023, 5 pages.

(Continued)

*Primary Examiner* — Mujtaba M Chaudry
(74) *Attorney, Agent, or Firm* — LEE, HONG, DEGERMAN, KANG & WAIMEY

(57)     ABSTRACT

A communication device generates N encoded bits by encoding an information block on the basis of a polar sequence $Q^{N-1}_0 = \{Q_0, Q_1, \ldots, Q_{N-1}\}$ wherein N>1024, and $0 <= Q^N_i <= N-1$ denotes a bit index for i=0, 1, . . . , N−1, the polar sequence $Q^{N-1}_0$ is defined in ascending order of reliability $W(Q^N_0) < W(Q^N_1) < \ldots < W(Q^N_{N-1})$, $W(Q^N_i)$ is the reliability of the bit index $Q^N_i$, a reliability order of bit indices 0 to 1023 in the polar sequence $Q^{N-1}_0$ is the same as the reliability order of bit indices 0 to 1023 of a pre-defined polar sequence $Q_0^{Nmax-1}$ in which Nmax=1024, and bit indices having a partial order that can be evaluated from among bit indices greater than or equal to 1024 in the polar sequence $Q^{N-1}_0$ satisfy $W(Q^N_x) < W(Q^N_y)$ for at least $Q^N_x < Q^N_y$.

9 Claims, 13 Drawing Sheets

(56) References Cited

U.S. PATENT DOCUMENTS

| | | | |
|---|---|---|---|
| 2019/0044540 A1* | 2/2019 | Jiang ................. | H03M 13/2796 |
| 2019/0165887 A1* | 5/2019 | Arikan ............... | H03M 13/1148 |
| 2019/0296857 A1* | 9/2019 | Gritsenko ......... | H03M 13/3769 |
| 2021/0184696 A1 | 6/2021 | Wang et al. | |
| 2021/0306096 A1 | 9/2021 | Shelby | |

OTHER PUBLICATIONS

3rd Generation Partnership Project (3GPP), "Technical Specification Group Radio Access Network; NR; Multiplexing and channel coding (Release 16)," 3GPP TS 38.212 V16.9.0, Apr. 2022, 153 pages.

* cited by examiner

$$F = \begin{bmatrix} 1 & 0 \\ 1 & 1 \end{bmatrix}$$

Figure 10:
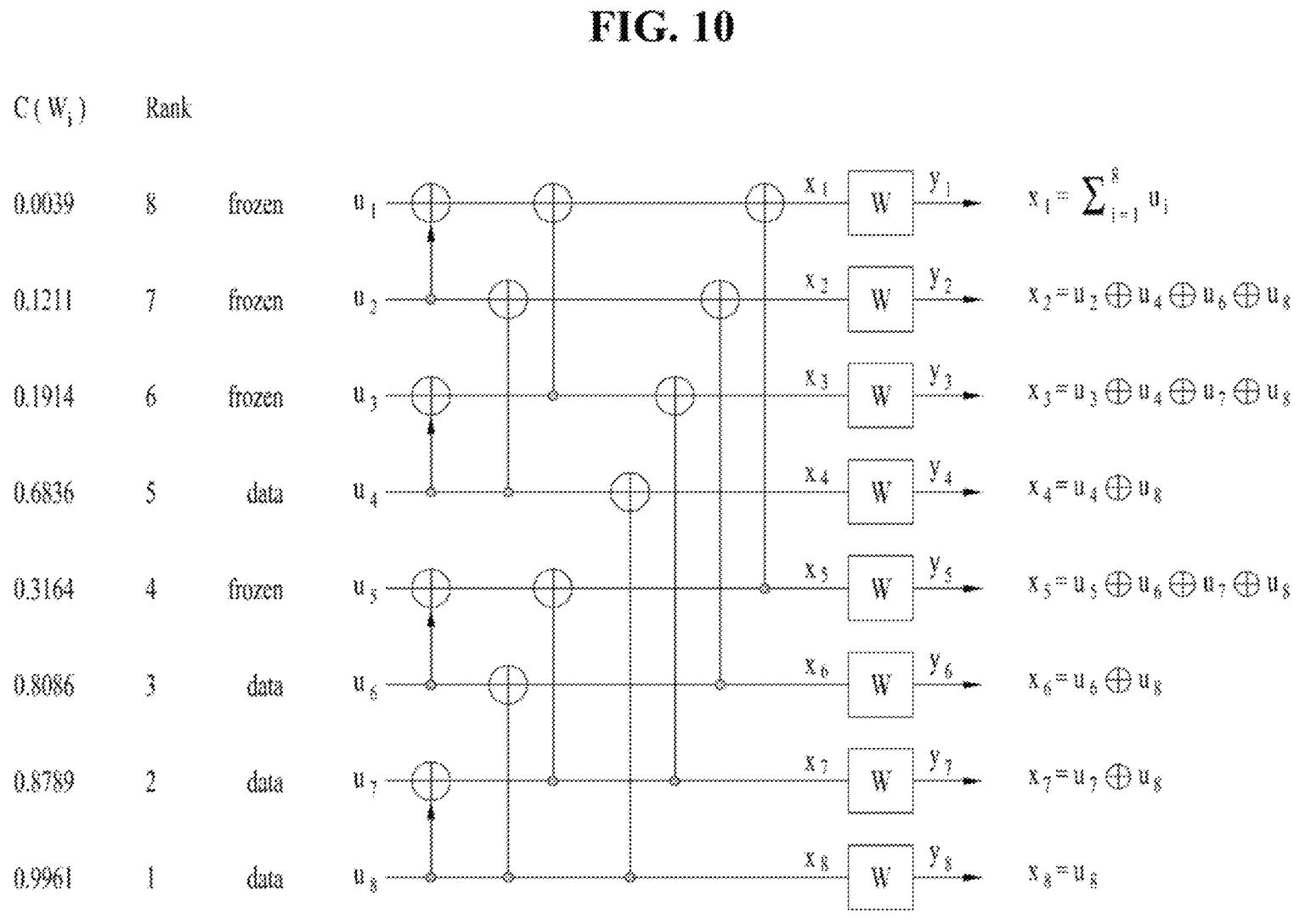

$$x_1 = \sum_{i=1}^{8} u_i$$

$$x_2 = u_2 \oplus u_4 \oplus u_6 \oplus u_8$$

$$x_3 = u_3 \oplus u_4 \oplus u_7 \oplus u_8$$

$$x_4 = u_4 \oplus u_8$$

$$x_5 = u_5 \oplus u_6 \oplus u_7 \oplus u_8$$

$$x_6 = u_6 \oplus u_8$$

$$x_7 = u_7 \oplus u_8$$

$$x_8 = u_8$$

| $C(W_j)$ | Rank | | |
|---|---|---|---|
| 0.0039 | 8 | frozen | $u_1$ |
| 0.1211 | 7 | frozen | $u_2$ |
| 0.1914 | 6 | frozen | $u_3$ |
| 0.6836 | 5 | data | $u_4$ |
| 0.3164 | 4 | frozen | $u_5$ |
| 0.8086 | 3 | data | $u_6$ |
| 0.8789 | 2 | data | $u_7$ |
| 0.9961 | 1 | data | $u_8$ |

Left cyclic shift upon encoding each bit

Determine an information block for channel coding. — S1501

Encode the information block based on a Polar sequence $Q^{N-1}_0$ with N>1024. — S1503

Receive encoded bits. — S1601

Decode the encoded bits based on a Polar sequence $Q^{N-1}_0$ with N>1024. — S1603

METHOD, COMMUNICATION DEVICE, PROCESSING DEVICE, AND STORAGE MEDIUM FOR PERFORMING CHANNEL ENCODING, AND METHOD, COMMUNICATION DEVICE, PROCESSING DEVICE, AND STORAGE MEDIUM FOR PERFORMING CHANNEL DECODING

CROSS-REFERENCE TO RELATED APPLICATION(S)

This application is the National Stage filing under 35 U.S.C. 371 of International Application No. PCT/KR2022/005766, filed on Apr. 22, 2022, the contents of which are all incorporated by reference herein in its entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

Polar codes have been used for small-sized information blocks as an alternative to existing channel codes, but polar codes to be applied to large-sized information blocks need to be defined to support different services or to support higher reliability.

The objects to be achieved with the present disclosure are not limited to what has been particularly described hereinabove and other objects not described herein will be more clearly understood by persons skilled in the art from the following detailed description.

According to an aspect of the present disclosure, a channel encoding method of a communication device in a wireless communication system is provided. The method includes determining an information block input to channel encoding, generating N encoded bits by encoding the information block based on a polar sequence $Q^{N-1}_0 = \{Q_0, Q_1, \ldots, Q_{N-1}\}$, generating rate-matched bits by performing rate matching on the encoded bits, and transmitting the rate-matched bits. The $0 \leq Q^N_i \leq N-1$ is a bit index for $i=0$, $1, \ldots$, and $N-1$, the polar sequence $Q^{N-1}_0$ is defined in ascending order of reliability $W(Q^N_0) < W(Q^N_1) < \ldots < W(Q^N_{N-1})$, $W(Q^N_i)$ being reliability of a bit index $Q^N_i$, $N>1024$, a reliability order between bit indices 0 to 1023 in the polar sequence $Q^{N-1}_0$ is equal to a reliability order between bit indices 0 to 1023 in a predefined polar sequence $Q_0^{Nmax-1}$ with Nmax=1024, and from among bit indices greater than or equal to 1024 in the polar sequence $Q^{N-1}_0$, bit indices for which a partial order is to be evaluated satisfy $W(Q^N_x) < W(Q^N_y)$ for at least $Q^N_x < Q^N_y$.

According to another aspect of the present disclosure, a communication device for performing channel encoding in a wireless communication system is provided. The communication device includes at least one transceiver, at least one processor, and at least one computer memory operably connected to the at least one processor and configured to store instructions that, when executed, cause the at least one processor to perform operations. The operations may include determining an information block input to channel encoding, generating N encoded bits by encoding the information block based on a polar sequence $Q^{N-1}_0 = \{Q_0, Q_1, \ldots, Q_{N-1}\}$, generating rate-matched bits by performing rate matching on the encoded bits, and transmitting the rate-matched bits. $0 \leq Q^N_i \leq N-1$ is a bit index for $i=0$, $1, \ldots$, and $N-1$, the polar sequence $Q^{N-1}_0$ is defined in ascending order of reliability $W(Q^N_0) < W(Q^N_1) < \ldots < W(Q^N_{N-1})$, $W(Q^N_i)$ being reliability of a bit index $Q^N_i$, $N>1024$, a reliability order between bit indices 0 to 1023 in the polar sequence $Q^{N-1}_0$ is equal to a reliability order between bit indices 0 to 1023 in a predefined polar sequence $Q_0^{Nmax-1}$ with Nmax=1024, and from among bit indices greater than or equal to 1024 in the polar sequence $Q^{N-1}_0$, bit indices for which a partial order is to be evaluated satisfy $W(Q^N_x) < W(Q^N_y)$ for at least $Q^N_x < Q^N_y$.

According to another aspect of the present disclosure, a processing device in a wireless communication system is provided. The processing device incudes at least one processor, and at least one computer memory operably connected to the at least one processor and configured to store instructions that, when executed, cause the at least one processor to perform operations. The operations include determining an information block input to channel encoding, generating N encoded bits by encoding the information block based on a polar sequence $Q^{N-1}{}_0=\{Q_0, Q_1, \ldots, Q_{N-1}\}$, generating rate-matched bits by performing rate matching on the encoded bits, and transmitting the rate-matched bits. $0<=Q^N{}_i<=N-1$ is a bit index for $i=0, 1, \ldots$, and $N-1$, the polar sequence $Q^{N-1}{}_0$ is defined in ascending order of reliability $W(Q^N{}_0)<W(Q^N{}_1)< \ldots <W(Q^N{}_{N-1})$, $W(Q^N{}_i)$ being reliability of a bit index $Q^N{}_i$, $N>1024$, a reliability order between bit indices 0 to 1023 in the polar sequence $Q^{N-1}{}_0$ is equal to a reliability order between bit indices 0 to 1023 in a predefined polar sequence $Q_0{}^{Nmax-1}$ with Nmax=1024, and from among bit indices greater than or equal to 1024 in the polar sequence $Q^{N-1}{}_0$, bit indices for which a partial order is to be evaluated satisfy $W(Q^N{}_x)<W(Q^N{}_y)$ for at least $Q^N{}_x<Q^N{}_y$.

According to another aspect of the present disclosure, a computer-readable storage medium is provided. The computer-readable storage medium stores at least one processor code including instructions that, when executed, cause at least one processor to perform operations is provided. The operations include determining an information block input to channel encoding, generating N encoded bits by encoding the information block based on a polar sequence $Q^{N-1}{}_0=\{Q_0, Q_1, \ldots, Q_{N-1}\}$, generating rate-matched bits by performing rate matching on the encoded bits, and transmitting the rate-matched bits. $0<=Q^N{}_i<=N-1$ is a bit index for $i=0, 1, \ldots$, and $N-1$, the polar sequence $Q^{N-1}{}_0$ is defined in ascending order of reliability $W(Q^N{}_0)<W(Q^N{}_1)< \ldots <W(Q^N{}_{N-1})$, $W(Q^N{}_i)$ being reliability of a bit index $Q^N{}_i$, $N>1024$, a reliability order between bit indices 0 to 1023 in the polar sequence $Q^{N-1}{}_0$ is equal to a reliability order between bit indices 0 to 1023 in a predefined polar sequence $Q_0{}^{Nmax-1}$ with Nmax=1024, and from among bit indices greater than or equal to 1024 in the polar sequence $Q^{N-1}{}_0$, bit indices for which a partial order is to be evaluated satisfy $W(Q^N{}_x)<W(Q^N{}_y)$ for at least $Q^N{}_x<Q^N{}_y$.

According to another aspect of the present disclosure, a channel decoding method of a communication device in a wireless communication system is provided. The method includes receiving encoded bits, and determining an information block by decoding the encoded bits based on a polar sequence $Q^{N-1}{}_0=\{Q_0, Q_1, \ldots, Q_{N-1}\}$. $0<=Q^N{}_i<=N-1$ is a bit index for $i=0, 1, \ldots$, and $N-1$, the polar sequence $Q^{N-1}{}_0$ is defined in ascending order of reliability $W(Q^N{}_0)<W(Q^N{}_1)< \ldots <W(Q^N{}_{N-1})$, $W(Q^N{}_i)$ being reliability of a bit index $Q^N{}_i$, $N>1024$, a reliability order between bit indices 0 to 1023 in the polar sequence $Q^{N-1}{}_0$ is equal to a reliability order between bit indices 0 to 1023 in a predefined polar sequence $Q_0{}^{Nmax-1}$ with Nmax=1024, and from among bit indices greater than or equal to 1024 in the polar sequence $Q^{N-1}{}_0$, bit indices for which a partial order is to be evaluated satisfy $W(Q^N{}_x)<W(Q^N{}_y)$ for at least $Q^N{}_x<Q^N{}_y$.

According to another aspect of the present disclosure, a communication device for performing channel decoding in a wireless communication system is provided. The communication device includes at least one transceiver, at least one processor, and at least one computer memory operably connected to the at least one processor and configured to store instructions that, when executed, cause the at least one processor to perform operations. The operations include receiving encoded bits, and determining an information block by decoding the encoded bits based on a polar sequence $Q^{N-1}{}_0=\{Q_0, Q_1, \ldots, Q_{N-1}\}$. $0<=Q^N{}_i<=N-1$ is a bit index for $i=0, 1, \ldots$, and $N-1$, the polar sequence $Q^{N-1}{}_0$ is defined in ascending order of reliability $W(Q^N{}_0)<W(Q^N{}_1)< \ldots <W(Q^N{}_{N-1})$, $W(Q^N{}_i)$ being reliability of a bit index $Q^N{}_i$, $N>1024$, a reliability order between bit indices 0 to 1023 in the polar sequence $Q^{N-1}{}_0$ is equal to a reliability order between bit indices 0 to 1023 in a predefined polar sequence $Q_0{}^{Nmax-1}$ with Nmax=1024, and from among bit indices greater than or equal to 1024 in the polar sequence $Q^{N-1}{}_0$, bit indices for which a partial order is to be evaluated satisfy $W(Q^N{}_x)<W(Q^N{}_y)$ for at least $Q^N{}_x<Q^N{}_y$.

According to another aspect of the present disclosure, a processing device in a wireless communication system is provided. The processing device includes at least one processor, and at least one computer memory operably connected to the at least one processor and configured to store instructions that, when executed, cause the at least one processor to perform operations. The operations include receiving encoded bits, and determining an information block by decoding the encoded bits based on a polar sequence $Q^{N-1}{}_0=\{Q_0, Q_1, \ldots, Q_{N-1}\}$. $0<Q^N{}_i<=N-1$ is a bit index for $i=0, 1, \ldots$, and $N-1$, the polar sequence $Q^{N-1}{}_0$ is defined in ascending order of reliability $W(Q^N{}_0)<W(Q^N{}_1)< \ldots <W(Q^N{}_{N-1})$, $W(Q^N{}_i)$ being reliability of a bit index $Q^N{}_i$, $N>1024$, a reliability order between bit indices 0 to 1023 in the polar sequence $Q^{N-1}{}_0$ is equal to a reliability order between bit indices 0 to 1023 in a predefined polar sequence $Q_0{}^{Nmax-1}$ with Nmax=1024, and from among bit indices greater than or equal to 1024 in the polar sequence $Q^{N-1}{}_0$ bit indices for which a partial order is to be evaluated satisfy $W(Q^N{}_x)<W(Q^N{}y)$ for at least $Q^N<Q^N{}_y$.

According to another aspect of the present disclosure, a computer-readable storage medium, the storage medium configured to store at least one processor code including instructions that, when executed, cause at least one processor to perform operations is provided. The operations include receiving encoded bits, and determining an information block by decoding the encoded bits based on a polar sequence $Q^{N-1}{}_0=\{Q_0, Q_1, \ldots, Q_{N-1}\}$. $0<=Q^N{}_i<=N-1$ is a bit index for $i=0, 1, \ldots$, and $N-1$, the polar sequence $Q^{N-1}{}_0$ is defined in ascending order of reliability $W(Q^N{}_0)<W(Q^N{}_1)< \ldots <W(Q^N{}_{N-1})$, $W(Q^N{}_i)$ being reliability of a bit index $Q^N{}_i$, $N>1024$, a reliability order between bit indices 0 to 1023 in the polar sequence $Q^{N-1}{}_0$ is equal to a reliability order between bit indices 0 to 1023 in a predefined polar sequence $Q_0{}^{Nmax-1}$ with Nmax=1024, and from among bit indices greater than or equal to 1024 in the polar sequence $Q^{N-1}{}_0$ bit indices for which a partial order is to be evaluated satisfy $W(Q^N{}_x)<W(Q^N{}_y)$ for at least $Q^N{}_x<Q^N{}_y$.

The foregoing solutions are merely apart of the examples of the present disclosure and various examples into which the technical features of the present disclosure are incorporated may be derived and understood by persons skilled in the art from the following detailed description.

According to some implementation(s) of the present disclosure, a wireless communication signal may be efficiently transmitted/received. Accordingly, the total throughput of a wireless communication system may be raised.

According to some implementation(s) of the present disclosure, various services with different requirements may be efficiently supported in a wireless communication system.

According to some implementation(s) of the present disclosure, delay/latency generated during radio communication between communication devices may be reduced.

According to some implementation(s) of the present disclosure, a new polar code for providing backward compatibility with channel encoding/decoding by the existing polar code may be provided.

According to some implementation(s) of the present disclosure, a polar code may also be applied to a relatively large-sized information block.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 1 illustrates an example of a communication system 1 to which implementations of the present disclosure are applied;

FIG. 10 illustrates the concept of selecting position(s) to which information bit(s) are to be allocated in polar codes;

DETAILED DESCRIPTION

Figure 2:
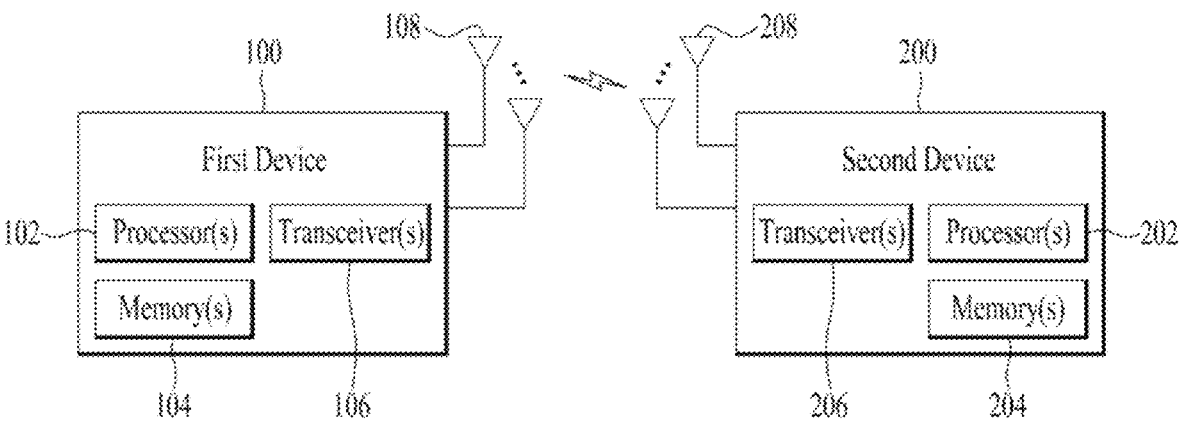
FIG. 2 is a block diagram illustrating examples of communication devices capable of performing a method according to the present disclosure.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Herein-below, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which anode may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (DL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. PSCell is a primary Scell of an SCG. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PC-FICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., a set of resource elements (REs)) that carry downlink control information (DCI), and the PDSCH refers to a set of time-frequency resources that carry DL data. The PUCCH, PUSCH, and PRACH refer to a set of time-frequency resources that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In this specification, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

Figure 1:
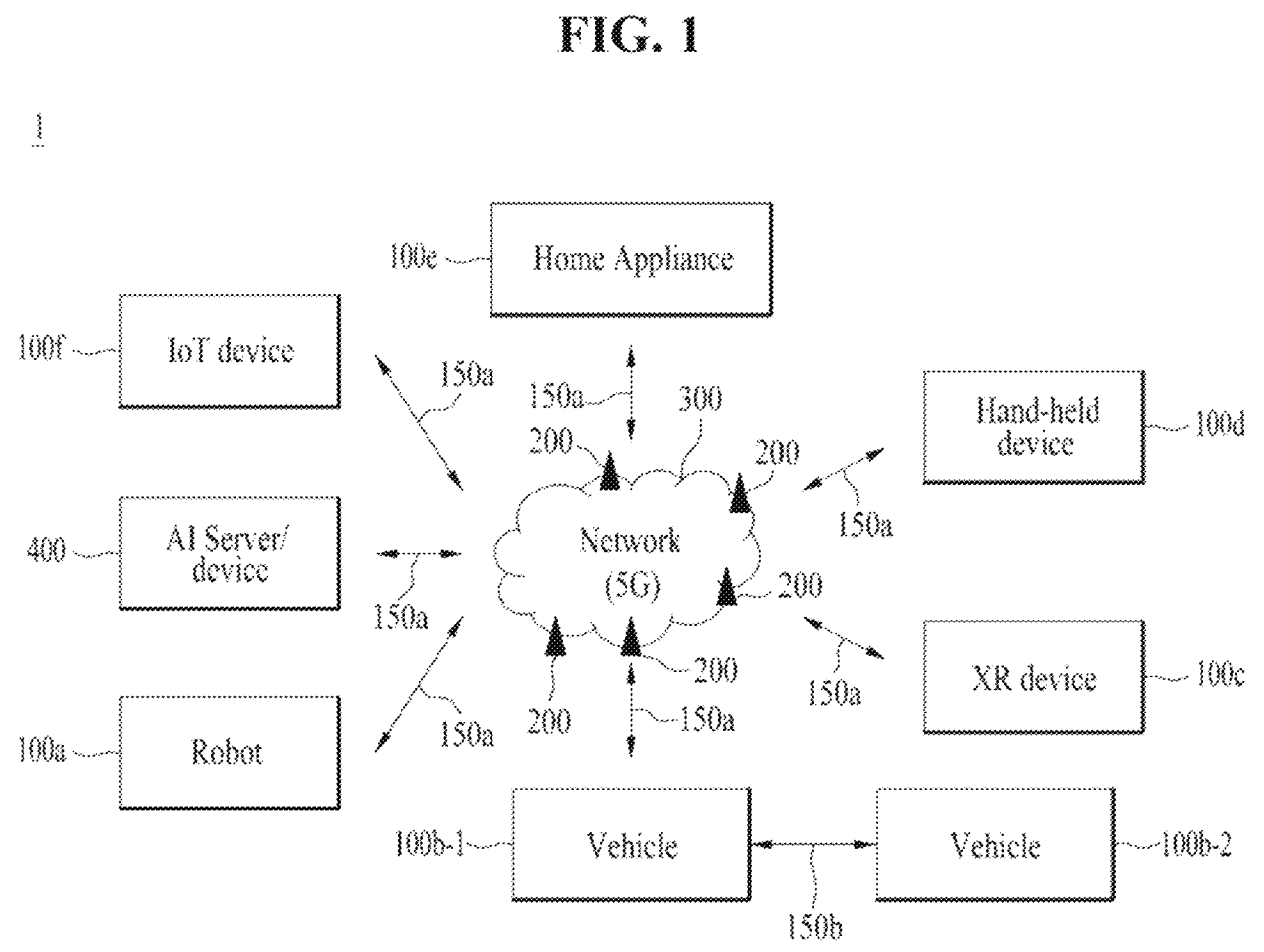

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/ proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s)

106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the afore/below-described/proposed functions, procedures, and/or methods. For example, the processor(s) 202 may process information within the memory(s) 204 to generate third information/signals and then transmit radio signals including the third information/ signals through the transceiver(s) 206. The processor(s) 202 may receive radio signals including fourth information/ signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the afore/below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/ chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and

204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
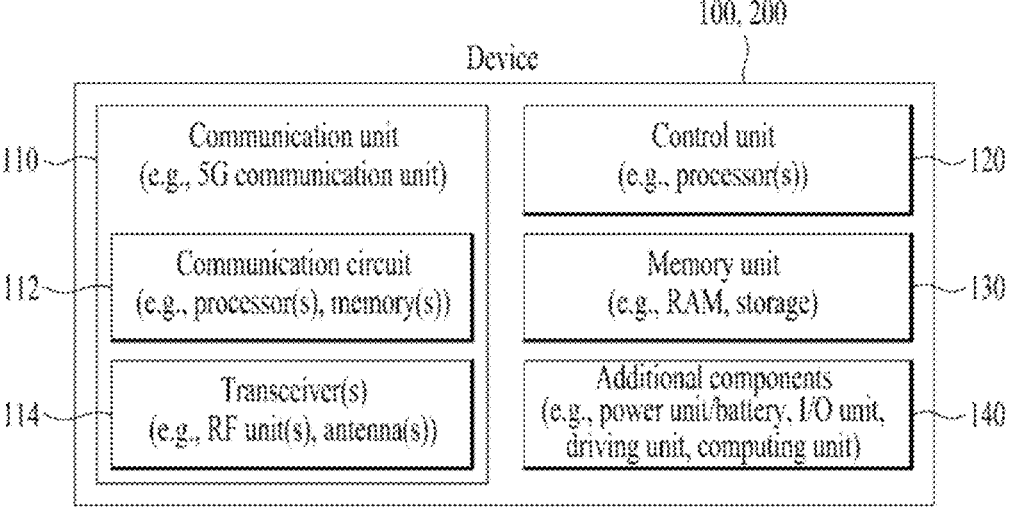
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-volatile) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-volatile) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
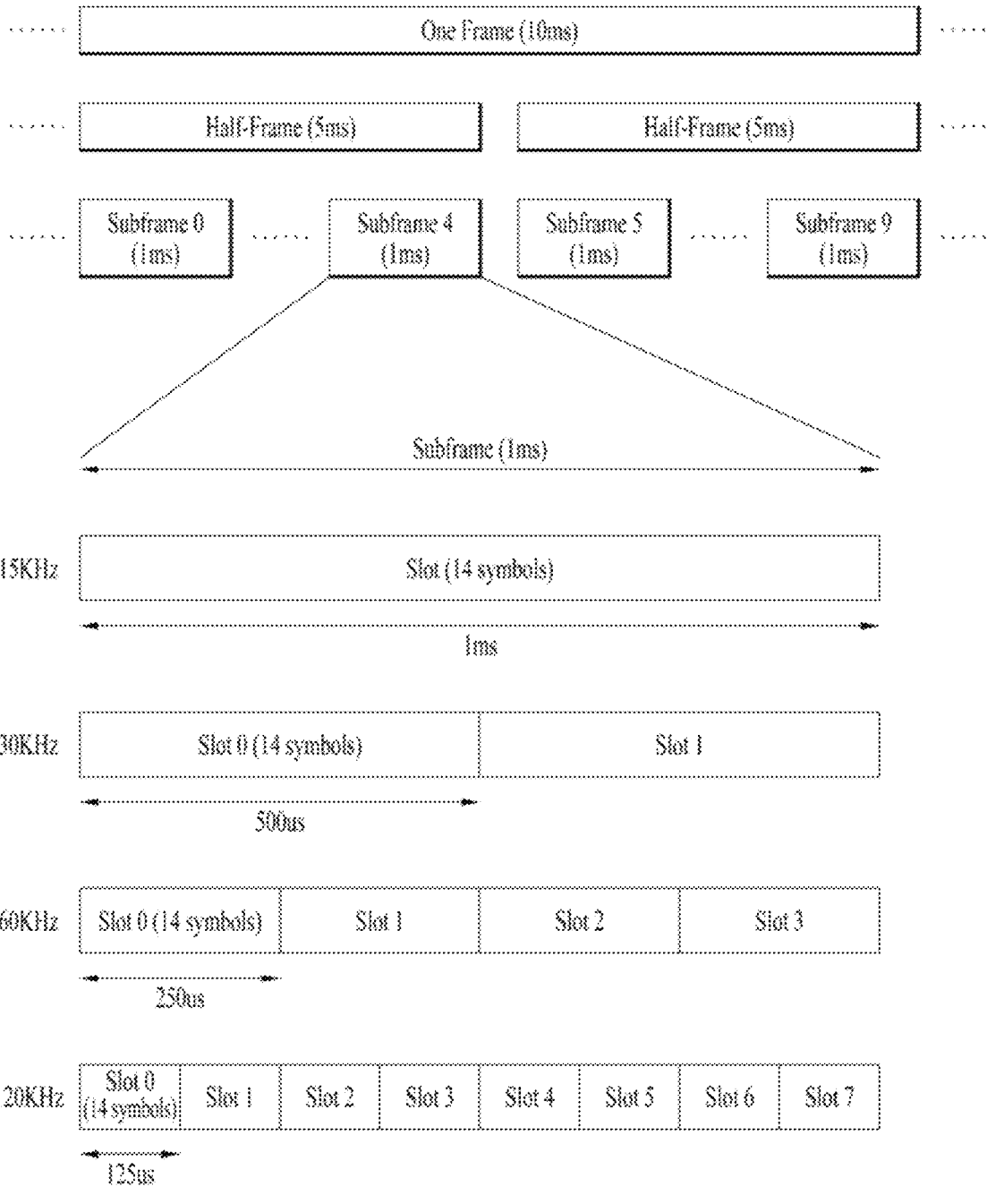
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f = (\Delta f_{max} * N_f / 100) * T_c = 10$ ms and is divided into two half-frames of 5 ms each. A basic time unit for NR is $T_c = 1/(\Delta f_{max} * N_f)$ where $\Delta f_{max} = 480 * 10^3$ Hz and $N_f = 4096$. For reference, a basic time unit for LTE is $Ts = 1/(\Delta f_{ref} * N_{f,ref})$ where $\Delta f_{ref} = 15 * 10^3$ Hz and $N_{f,ref} = 2048$. $T_c$ and $T_f$ have the relationship of a constant $\kappa = T_s/T_c = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| $N^{slot}_{symb}$ | $N^{frame,\,u}_{slot}$ | $N^{subframe,\,u}_{slot}$ |
|---|---|---|
| 14 | 10 | 1 |
| 14 | 20 | 2 |
| 14 | 40 | 4 |
| 14 | 80 | 8 |
| 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| $N^{slot}_{symb}$ | $N^{frame,\,u}_{slot}$ | $N^{subframe,\,u}_{slot}$ |
|---|---|---|
| 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

A slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB}=n^u_{CRB}+N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

A UE configured with carrier aggregation may be configured to use one or more cells. When the UE is configured to have a plurality of serving cells, the UE may be configured to have one or more cell groups. The UE may be configured to have a plurality of cell groups associated with different BSs. Alternatively, the UE may be configured to have a plurality of cell groups associated with a single BS. Each cell group of the UE includes one or more serving cells, and each cell group includes a single PUCCH cell configured with PUCCH resources. The PUCCH cell may be a Pcell or an Scell configured as a PUCCH cell from among Scells of the corresponding cell group. Each serving cell of the UE belongs to one of the cell groups of the UE, and does not belong to a plurality of cell groups.

Figure 5:
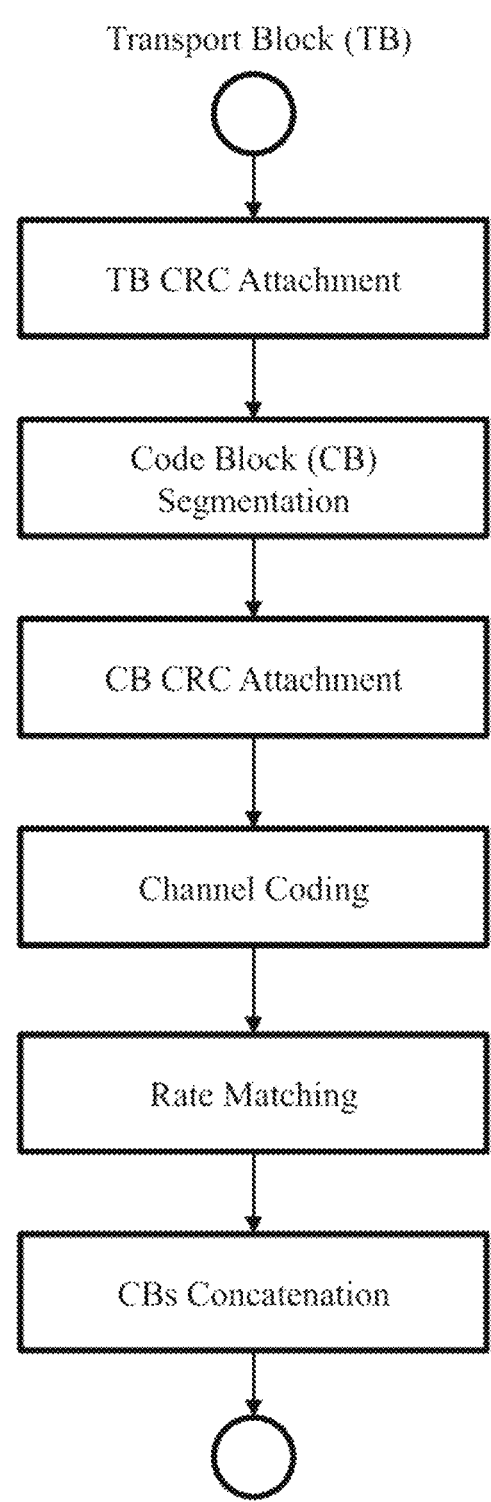
FIG. 5 illustrates a processing procedure on a transmission side for a transport block (TB)

FIG. 5 illustrates a processing procedure on a transmission side for a transport block (TB).

In order for a receiving side to correct errors that radio signals experience in a channel, a transmitting side encodes information using a forward error correction code and then transmits the encoded information. The receiving side demodulates a received signal and decodes the error correction code to thereby recover the information transmitted by the transmitting side. In this decoding procedure, errors in the received signal caused by a channel are corrected.

Data arrives at a coding block in the form of a maximum of two transport blocks every transmission time interval (TTI) in each DL/UL cell. The following coding steps may be applied to each transport block of the DL/UL cell:

cyclic redundancy check (CRC) attachment to a transport block;

code block segmentation and CRC attachment to a code block;

channel coding;

rate matching; and code block concatenation.

In an actual communication system, a transport block of a predetermined size or larger is divided into a plurality of smaller data blocks and then is encoded, to facilitate actual implementation of coding. The smaller data blocks are called code blocks. While the code blocks are generally of the same size, one of the code blocks may have a different size due to a limited size of the internal interleaver of a channel encoder. Error correction coding is performed on each code block of a predetermined interleaver size and then interleaving is performed to reduce the impact of burst errors that are generated during transmission over a radio channel. The error-corrected and interleaved code block is transmitted by being mapped to an actual radio resource. The amount of radio resources used for actual transmission is designated. Thus, the encoded code blocks are rate-matched to the amount of the radio resources. In general, rate matching is performed through puncturing or repetition. For example, if the amount of radio resources, i.e., the number of transmission bits capable of being transmitted on the radio resources, is M and if a coded bit sequence, i.e., the number of output bits of the encoder, is N, in which M is different from N, then rate matching is performed to match the length of the coded bit sequence to M. If M>N, then all or a part of bits of the coded bit sequence are repeated to match the length of the rate-matched sequence to M. If M<N, then a part of the bits of the coded bit sequence is punctured to match the length of the rate-matched sequence to M and the punctured bits are excluded from transmission.

Namely, in a wireless communication system, after a transmitting side encode data using channel coding with a specific code rate, the code rate of the data to be transmitted is adjusted through a rate-matching procedure consisting of puncturing and repetition.

There are various types of error correction codes, but the sizes of information blocks for obtaining optimal performance are determined depending on the error correction code. Although many coding schemes having high capacity information performance at large information block lengths are available, most of the schemes do not show consistently high performance over a wide range of information block lengths and code rates. However, turbo codes, low-density parity check (LPDC) codes, and polar codes show promising BLER performance in a wide range of coding rates and code lengths. As demand for various cases such as eMBB, massive IoT, and URLLC has increased, a coding scheme providing greater channel coding efficiency than in turbo codes is needed. In addition, increase in a maximum number of subscribers capable of being accommodated by a channel, i.e., increase in capacity, has been required. Polar codes among various error correction codes are codes providing anew framework capable of solving problems of legacy channel codes and were invented by Arikan at Bilkent University (reference: E. Arikan, "Channel Polarization: A Method for Constructing Capacity-Achieving Codes for Symmetric Binary-Input Memoryless Channels," in IEEE Transactions on Information Theory, vol. 55, no. 7, pp. 3051-3073, July 2009). Polar codes are the first capacity-achieving codes with low encoding and decoding complexities, which were proven mathematically. Polar codes outperform the turbo codes in large information block lengths while no error flow is present. Hereinafter, channel coding using the polar codes is referred to as polar coding.

Polar codes are known as codes capable of achieving the capacity of a given binary discrete memoryless channel. This can be achieved only when an information block size is sufficiently large. That is, polar codes are codes capable of achieving the capacity of a channel if the size N of the codes infinitely increases. Polar codes have low encoding and decoding complexity and may be successfully decoded. Polar codes are a sort of linear block error correction codes. Multiple recursive concatenations are basic building blocks for the polar codes and are bases for code construction. Physical conversion of channels in which physical channels are converted into virtual channels occurs and such conversion is based on a plurality of recursive concatenations. If multiple channels are multiplied and accumulated, most of the channels may become better or worse. The idea underlying polar codes is to use good channels. For example, data is sent through good channels at rate 1 and data is sent through bad channels at rate 0. That is, through channel polarization, channels enter a polarized state from a normal state.

Figure 6:
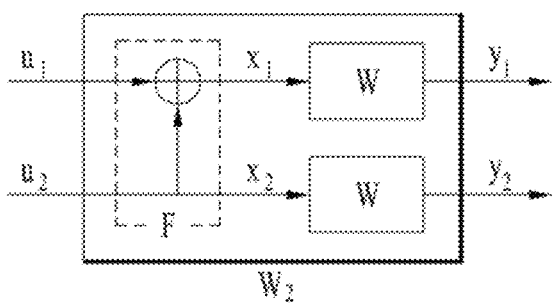
FIG. 6 is an example of block diagram for a polar encoder.

FIG. 6 is an example of block diagram for a polar encoder.

FIG. 6(a) illustrates a base module of a polar code, particularly, first level channel combining for polar coding. In FIG. 6(a), $W_2$ denotes an entire equivalent channel obtained by combining two binary-input discrete memoryless channels (B-DMCs), Ws. Herein, $u_1$ and $u_2$ are binary-input source bits and $y_1$ and $y_2$ are output coded bits. Channel combining is a procedure of concatenating the B-DMCs in parallel.

FIG. 6(b) illustrates a base matrix F for the base module. The binary-input source bits $u_1$ and $u_2$ input to the base matrix F and the output coded bits $x_1$ and $x_2$ of the base matrix F have the following relationship.

$$[u_1 \quad u_2]\begin{bmatrix} 1 & 0 \\ 1 & 1 \end{bmatrix} = [x_1 \quad x_2] \qquad \text{[Equation 1]}$$

The channel $W_2$ may achieve symmetric capacity I(W) which is a highest rate. In the B-DMC W, symmetric capacity is an important parameter which is used to measure a rate and is a highest rate at which reliable communication can occur over the channel W. The B-DMC may be defined as follows.

$$I(W) = \sum_{y \in Y}\sum_{x \in X} 1/2 W(y \mid x)\log\frac{w(y \mid x)}{1/2w(y \mid 0) + 1/2w(y \mid 1)} \qquad \text{[Equation 2]}$$

It is possible to synthesize or create a second set of N binary input channels out of N independent copies of a given B-DMC W and the channels have the properties $\{W_N^{(i)}: 1<=i<=N\}$. If N increases, there is a tendency for a part of the channels to have capacity approximating to 1 and for the remaining channels to have capacity approximating to 0. This is called channel polarization. In other words, channel polarization is a process of creating a second set of N channels $\{W_N^{(i)}: 1<=I<=N\}$ using N independent copies of a given B-DMC W. The effect of channel polarization means that, when N increases, all symmetric capacity terms $\{I(W_N^{(i)})\}$ tend towards 0 or 1 for all except a vanishing fraction of indexes i. In other words, the concept behind channel polarization in the polar codes is transforming N copies (i.e., N transmissions) of a channel having a symmetric capacity of I(W) (e.g., additive white Gaussian noise channel) into extreme channels of capacity close to 1 or 0. Among the N channels, an I(W) fraction will be perfect channels and an 1−I(W) fraction will be completely noise channels. Then, information bits are transmitted only through good channels and bits input to the other channels are frozen to 1 or 0. The amount of channel polarization increases along with a block length. Channel polarization consists of two phases: channel combining phase and channel splitting phase.

Figure 7:
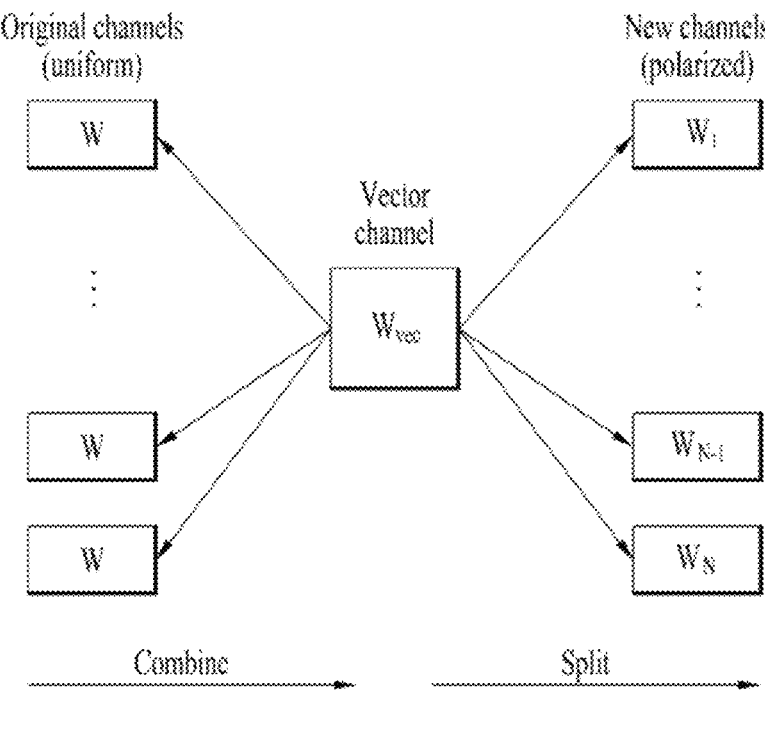
FIG. 7 illustrates the concept of channel combining and channel splitting for channel polarization.
Figure 7:
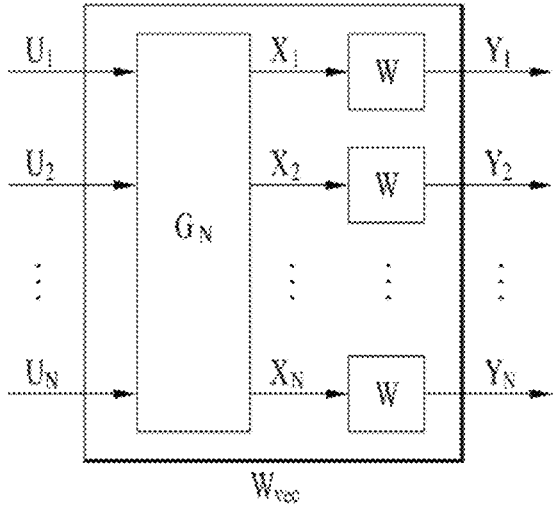

FIG. 7 illustrates the concept of channel combining and channel splitting for channel polarization. As illustrated in FIG. 7, when N copies of an original channel W are properly combined to create a vector channel $W_{vec}$ and then are split into new polarized channels, the new polarized channels are categorized into channels having capacity C(W)=1 and channels having C(W)=0 if N is sufficiently large. In this case, since bits passing through the channels having the channel capacity C(W))=1 are transmitted without error, it is better to transmit information bits therethrough and, since bits passing through the channels having capacity C(W)=0 cannot transport information, it is better to transport frozen bits, which are meaningless bits, therethrough.

Referring to FIG. 7(a), copies of a given B-DMC W are combined in a recursive manner to output a vector channel $W_{vec}$ given by $X_N \rightarrow Y_N$, where $N=2^n$ and n is an integer equal to or greater than 0. Recursion always begins at the 0th level and $W_1=W$. If n is 1 (n=1), this means the first level of recursion in which two independent copies of $W_1$ are combined. If the above two copies are combined, a channel $W_2$: $X_2 \rightarrow Y_2$ is obtained. A transitional probability of this new channel $W_2$ may be represented by the following equation.

$$W_2(y_1, y_2 \mid u_1, u_2) = W(y_1 \mid u_1 \oplus u_2)W(y_1 \mid u_2) \qquad \text{[Equation 3]}$$

If the channel $W_2$ is obtained, two copies of the channel $W_2$ are combined to obtain a single copy of a channel $W_4$. Such recursion may be represented by $W_4$: $X_4 \rightarrow Y_4$ having the following transitional probability.

$$W_4(y_1^4 \mid u_1^4) = W_2(y_1^2 \mid u_1 \oplus u_2, u_3 \oplus u_4)W_2(y_3^4 \mid u_2, u_4) \qquad \text{[Equation 4]}$$

In FIG. 7(b), $G_N$ is a size-N generator matrix. The relationship between input $u_1^N$ to $G_N$ and output $x_1^N$ of $G_N$ of FIG. 7(b) may be represented as $x_1^N=u_1^N G_N$, where $x_1^N=\{x_1, \ldots, x_N\}$, $u_1^N=\{u_1, \ldots, u_N\}$. When N B-DMCs are combined, each B-DMC may be expressed in a recursive manner. That is, $G_N$ may be indicated by the following equation.

$$G_N = B_N F^{W_n} \qquad \text{[Equation 5]}$$

Herein, $\otimes$ denotes the Kronecker product, $N=2^n$, $F^{\otimes n}=F\otimes F^{\otimes(n-1)}$ for all n>=1, and $F^{\otimes 0}=1$. $B_N$ is a permutation matrix known as a bit-reversal operation and $B_N=R_N$ $(I_2\otimes B_{N/2})$ and may be recursively computed. $I_2$ is a 2-dimensional identity matrix and this recursion is initialized to $B_2=I_2$. $R_N$ is a bit-reversal interleaver and is used to map an input $s^N_1=\{s_1, \ldots, s_N\}$ to an output $x^N_1=\{s_1, s_3, \ldots, s_{N-1}, s_2, \ldots, s_N\}$. The bit-reversal interleaver may not be included in a transmitting side. For example, $G_2$ corresponds to an elementary matrix F shown in FIG. 6(b). $G_4$ may be represented by the following matrix.

$$G_4 = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} 1 & 0 \\ 1 & 1 \end{bmatrix}^{\otimes 2} = \begin{bmatrix} 1 & 0 & 0 & 0 \\ 1 & 0 & 1 & 0 \\ 1 & 1 & 0 & 0 \\ 1 & 1 & 1 & 1 \end{bmatrix} \qquad \text{[Equation 6]}$$

Figure 8:
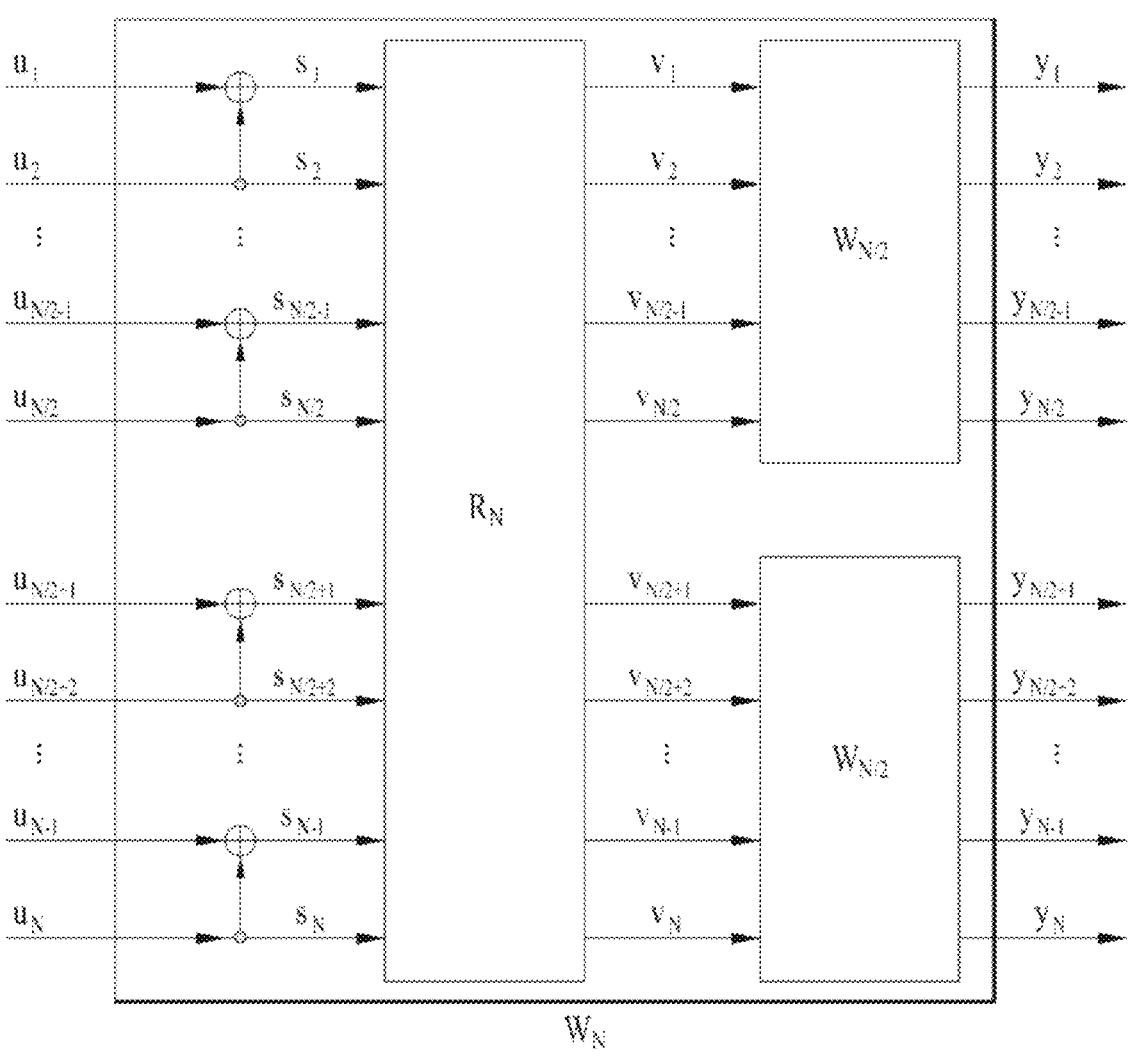
FIG. 8 illustrates N-th level channel combining for a polar code.

The relationship of Equation 5 is illustrated in FIG. 8.

FIG. 8 illustrates N-th level channel combining for a polar code.

A process of defining an equivalent channel for specific input after combining N B-DMCs Ws is called channel splitting. Channel splitting may be represented as a channel transition probability indicated by the following equation.

$$W^i_N\big(y^N_1, u^{i-1}_1 \mid u_i\big) = \sum_{u^N_{i+1}} \frac{1}{2^{N-1}} W_N\big(y^N_1 \mid u^N_1\big) \qquad \text{[Equation 7]}$$

Channel polarization has the following characteristics:
>Conservation: $C(W^-)+C(W^+)=2C(W)$,
>Extremization: $C(W^-)<=C(W)<=C(W^+)$.

When channel combining and channel splitting are performed, the following theorem may be obtained.

Theorem: For any B-DMC W, channels $\{W_N^{(i)}\}$ are polarized in the following sense. For any fixed $\delta\in\{0, 1\}$, as N goes to infinity through powers of 2, the fraction of indexes $i\in\{1, \ldots, N\}$ for channel capacity $I(W_N^{(i)})\in(1-\delta,1]$ goes to I(W) and the faction of i for channel capacity $I(W_N^{(i)})\in[0, \delta)$ goes to 1−I(W). Hence, if N→∞, then channels are perfectly noisy or are polarized free of noise. These channels can be accurately recognized by the transmitting side. Therefore, bad channels are fixed and non-fixed bits may be transmitted on good channels.

That is, if the size N of polar codes is infinite, a channel has much noise or is free of noise, with respect to a specific input bit. This has the same meaning that the capacity of an equivalent channel for a specific input bit is divided into 0 or I(W).

Inputs of a polar encoder are divided into bit channels to which information data is mapped and bit channels to which the information data is not mapped. As described earlier, according to the theorem of the polar code, if a codeword of the polar code goes to infinity, the input bit channels may be classified into noiseless channels and noise channels. Therefore, if information is allocated to the noiseless bit channels, channel capacity may be obtained. However, in actuality, a codeword of an infinite length cannot be configured, reliabilities of the input bit channels are calculated and data bits are allocated to the input bit channels in order of reliabilities. In the present disclosure, bit channels to which data bits are allocated are referred to as good bit channels. The good bit channels may be input bit channels to which the data bits are mapped. Bit channels to which data is not mapped are referred to as frozen bit channels. A known value (e.g., 0) is input to the frozen bit channels and then encoding is performed. Any values which are known to the transmitting side and the receiving side may be mapped to the frozen bit channels. When puncturing or repetition is performed, information about the good bit channels may be used. For example, positions of codeword bits (i.e., output bits) corresponding to positions of input bits to which information bits are not allocated may be punctured.

A decoding scheme of the polar codes is a successive cancellation (SC) decoding scheme. The SC decoding scheme obtains a channel transition probability and then calculates a likelihood ratio (LLR) of input bits using the channel transition probability. In this case, the channel transition probability may be calculated in a recursive form if channel combining and channel splitting procedures use characteristics of the recursive form. Therefore, a final LLR value may also be calculated in the recursive form. First, a channel transition probability $W_N^{(i)}(y_1^N, u_1^{i-1} \mid u_1)$ of an input bit u, may be obtained as follows. $u_1^i$ may be split into odd indexes and even indexes as expressed as $u_{1,o}^i$, $u_{1,e}^i$, respectively. The channel transition probability may be indicated by the following equations.

$$W_{2N}^{(2i-1)}\big(y_1^{2N}, u_1^{2i-1} \mid u_{2i-1}\big) = \sum_{u_{2i}^{2N}} \frac{1}{2^{2N-1}} W_{2N}\big(y_1^{2N} \mid u_1^{2N}\big) = \qquad \text{[Equation 8]}$$

$$\sum_{u_{2i,o}^{2N}, u_{2i,e}^{2N}} \frac{1}{2^{2N-1}} W_N\big(y_1^N \mid u_{1,o}^{2N} \oplus u_{i,e}^{2N}\big) W_N\big(y_{N+1}^{2N} \mid u_{1,e}^{2N}\big) =$$

$$\sum_{u_{2i}} \frac{1}{2} \sum_{u_{2i+1,e}^{2N}} \frac{1}{2^{N-1}} W_N\big(y_{N+1}^{2N} \mid u_{1,e}^{2N}\big) \cdot$$

$$\sum_{u_{2i+1,o}^{2N}} \frac{1}{2^{N-1}} W_N\big(y_1^N \mid u_{1,o}^{2N} \oplus u_{i,e}^{2N}\big) =$$

$$\sum_{u_{2i}} \frac{1}{2} W_N^{(i)}\big(y_1^N, u_{1,o}^{2i-2} \oplus u_{i,e}^{2i-2} \mid u_{2i-2} \oplus u_{2i}\big) \cdot$$

$$W_N^{(i)}\big(y_{N+1}^{2N}, u_{1,e}^{2i-2} \mid u_{2i}\big)$$

where $W_N^{(i)}\big(y_1^N, u_1^{i-1} \mid u_i\big) = \sum_{u_{i+1}^N} \frac{1}{2^{N-1}} W_N\big(y_1^N \mid u_1^N\big).$ $$W_{2N}^{(2i)}\big(y_1^{2N}, u_1^{2i-1} \mid u_{2i}\big) = \sum_{u_{2i+2}^{2N}} \frac{1}{2^{2N-1}} W_{2N}\big(y_1^{2N} \mid u_1^{2N}\big) = \qquad \text{[Equation 9]}$$

$$\sum_{u_{2i+1,o}^{2N}, u_{2i+1,e}^{2N}} \frac{1}{2^{2N-1}} W_N\big(y_1^N \mid u_{1,o}^{2N} \oplus u_{i,e}^{2N}\big) W_N\big(y_{N+1}^{2N} \mid u_{1,e}^{2N}\big) =$$

$$\frac{1}{2} \sum_{u_{2i+1,e}^{2N}} \frac{1}{2^{N-1}} W_N\big(y_{N+1}^{2N} \mid u_{1,e}^{2N}\big) \cdot$$

$$\sum_{u_{2i+1,o}^{2N}} \frac{1}{2^{N-1}} W_N\big(y_1^N \mid u_{1,o}^{2N} \oplus u_{i,e}^{2N}\big) =$$

$$\frac{1}{2} W_N^{(i)}\big(y_1^N, u_{1,o}^{2i-2} \oplus u_{i,e}^{2i-2} \mid u_{2i-1} \oplus u_{2i}\big) \cdot W_N^{(i)}\big(y_{N+1}^{2N}, u_{1,e}^{2i-2} \mid u_{2i}\big)$$

A polar decoder retrieves information and generates an estimate $u^{\sim N}_1$ of $u^N_1$ using values (e.g., reception bits, frozen bits, etc.) known for the polar codes. The LLR is defined as follows.

$$L_N^{(i)}\big(y_1^N, u_1^{i-1}\big) = \frac{W_N^{(i)}\big(y_1^N, u_1^{i-1} \mid u_i = 0\big)}{W_N^{(i)}\big(y_1^N, u_1^{i-1} \mid u_i = 1\big)} \qquad \text{[Equation 10]}$$

The LLR may be recursively calculated as follows.

$$L_N^{(2i-1)}\left(y_1^N, \hat{u}_1^{2i-2}\right) =$$ [Equation 11]

$$\frac{L_{N/2}^{(i)}\left(y_1^{N/2}, \hat{u}_{1,o}^{2i-2} \oplus \hat{u}_{1,e}^{2i-2}\right) \cdot L_{N/2}^{(i)}\left(y_{N/2+1}^N, \hat{u}_{1,e}^{2i-2}\right) + 1}{L_{N/2}^{(i)}\left(y_1^{N/2}, \hat{u}_{1,o}^{2i-2} \oplus \hat{u}_{1,e}^{2i-2}\right) + L_{N/2}^{(i)}\left(y_{N/2+1}^N, \hat{u}_{1,e}^{2i-2}\right)}$$

$$L_N^{(2i)}\left(y_1^N, \hat{u}_1^{2i-1}\right) = \left[L_{N/2}^{(i)}\left(y_1^{N/2}, \hat{u}_{1,o}^{2i-2} \oplus \hat{u}_{1,e}^{2i-2}\right)\right]^{1-2\hat{u}_{2i-1}} \cdot L_{N/2}^{(i)}\left(y_{N/2+1}^N, \hat{u}_{1,e}^{2i-2}\right)$$

Recursive calculation of LLRs is traced back to a code length of 1 with an LLR $L^{(1)}_1(y_i)=W(y_i|0)/W(y_i|1)$. $L^{(1)}_1(y_i)$ is soft information observed from a channel.

The complexity of a polar encoder and an SC decoder varies with the length N of polar codes and is known as having O(N log N). Assuming that K input bits are used for a length-N polar code, a coding rate becomes N/K. If a generator matrix of a polar encoder of a data payload size N is $G_N$, an encoded bit may be represented as $x^N_1=u^N_1G_N$. It is assumed that K bits out of $u_1$ correspond to payload bits, a row index of $G_N$ corresponding to the payload bits is i, and a row index of $G_N$ corresponding to (N−K) bits is F. A minimum distance of the polar codes may be given as $d_{min}(C)=\min_{i \in 1}2^{wt(i)}$, where wt(i) is the number of 1s within binary extension of i and i=0, 1, . . . , N−1.

SC list (SCL) decoding is an extension of a basic SC decoder. In this type of decoder, L decoding paths are simultaneously considered in each decoding stage. Herein, L is an integer. In other words, in the case of the polar codes, a list-L decoding algorithm is an algorithm for simultaneously tracking L paths in a decoding process.

Figure 9:
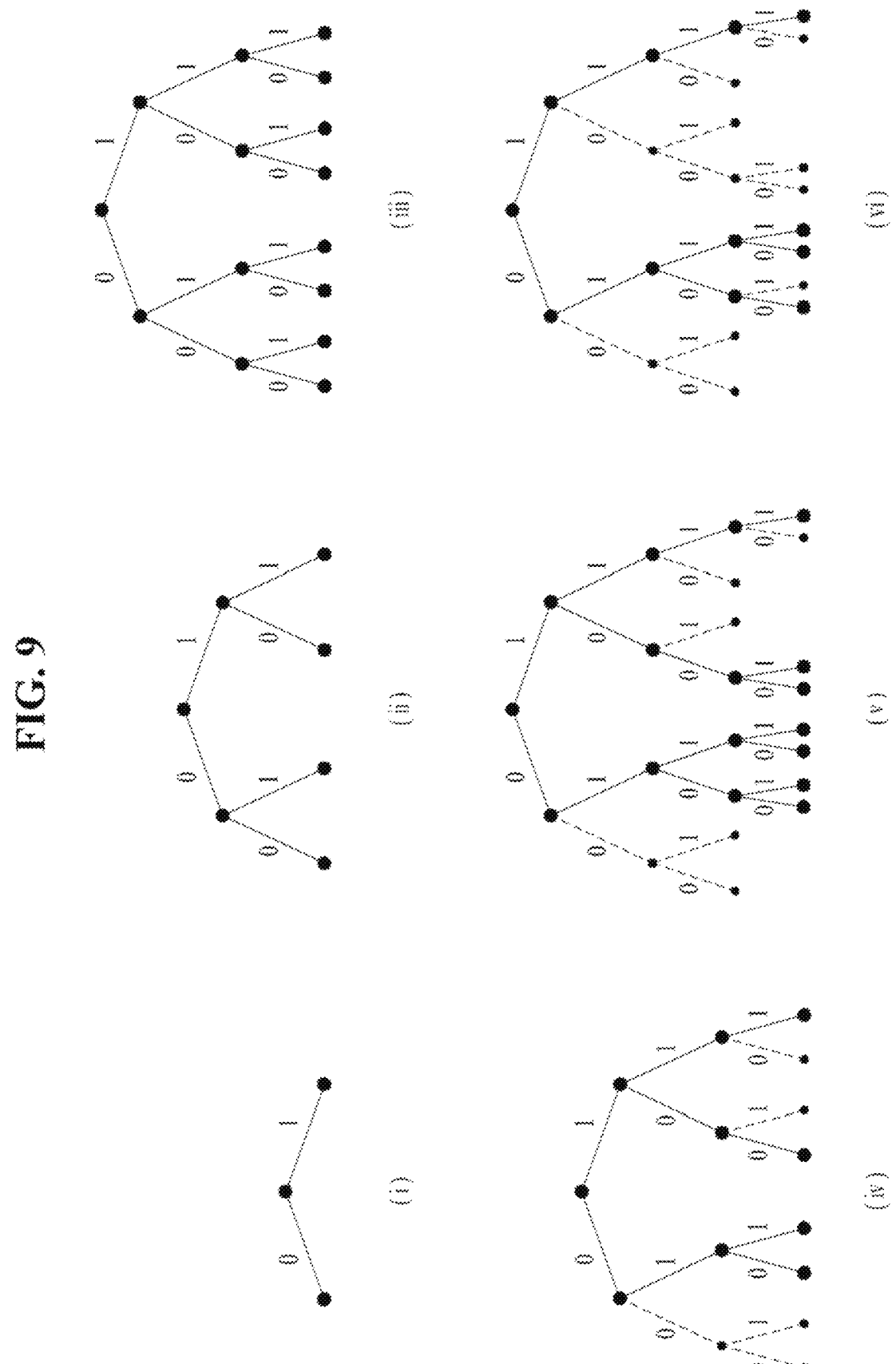
FIG. 9 illustrates an evolution of decoding paths in a list-L decoding process.

FIG. 9 illustrates an evolution of decoding paths in a list-L decoding process. For convenience of description, it is assumed that the number of bits that should be determined is n and all bits are not frozen. If a list size L is 4, each level includes at most 4 nodes with paths that continue downward. Discontinued paths are expressed by dotted lines in FIG. 9. A process in which decoding paths evolve in list-L decoding will now be described with reference to FIG. 9. i) If list-L decoding is started, the first unfrozen bit may be either 0 or 1. ii) list-L decoding continues. The second unfrozen bits may be either 0 or 1. Since the number of paths is not greater than L=4, pruning is not needed yet. iii) Consideration of all options for the first bit (i.e., a bit of the first level), the second bit (i.e. a bit of the second level), and the third bit (i.e., a bit of the third level) results in 8 decoding paths which are excessive because L=4. iv) the 8 decoding paths are pruned to L (=4) promising paths. v) 4 active paths continue by considering two options of the fourth unfrozen bit. In this case, the number of paths is doubled, i.e., 8 paths which are excessive because L=4. vi) The 8 paths are pruned back to L (=4) best paths. In the example of FIG. 9, 4 candidate codewords 0100, 0110, 0111, and 1111 are obtained and one of the codewords is determined to be a codeword most similar to an original codeword. In a similar manner to a normal decoding process, for example, in a pruning process or a process of determining a final codeword, a path in which the sum of LLR absolute values is largest may be selected as a survival path. If a CRC is present, the survival path may be selected through the CRC.

Meanwhile, CRC-aided SCL decoding is SCL decoding using CRC and improves the performance of polar codes. CRC is the most widely used technique in error detection and error correction in the field of information theory and coding. For example, if an input block of an error correction encoder has K bits and the length of information bits is k, and the length of CRC sequences is m bits, then K=k+m. CRC bits are a part of source bits for an error correction code. If the size of channel codes used for encoding is N, a code rate R is defined as R=K/N. CRC aided SCL decoding serves to detect an errorless path while a receiving device confirms a CRC code with respect to each path. An SCL decoder outputs candidate sequences to a CRC detector. The CRC detector feeds back a check result in order to aid in determining a codeword.

Although complicated as compared with an SC algorithm, SCL decoding or CRC aided SCL decoding has an advantage of excellent decoding performance. For more details of a list-X decoding algorithm of the polar codes, refer to 'I. Tal and A. Vardy, "List decoding of polar codes," in Proc. IEEE Int. Symp. Inf. Theory, pp. 1-5, July 2011'.

In the polar codes, code design is independent of a channel and hence is not versatile for mobile fading channels. In addition, the polar codes have a disadvantage of limited application because the codes have recently been introduced and have not grown yet. That is, polar coding proposed up to now has many parts that have not been defined to apply to a wireless communication system. Therefore, the present disclosure proposes a polar coding method suitable for the wireless communication system.

FIG. 10 illustrates the concept of selecting position(s) to which information bit(s) are to be allocated in polar codes.

In FIG. 10, it is assumed that the size N of mother codes is 8, i.e., the size N of polar codes is 8, and a code rate is 1/2.

In FIG. 10, $C(W_i)$ denotes the capacity of a channel $W_i$ and corresponds to the reliability of channels that input bits of a polar code experience. When channel capacities corresponding to input bit positions of the polar code are as illustrated in FIG. 10, reliabilities of the input bit positions are ranked as illustrated in FIG. 10. To transmit data at a code rate of 1/2, a transmitting device allocates 4 bits constituting the data to 4 input bit positions having high channel capacities among 8 input bit positions (i.e., input bit positions denoted as $u_4$, $u_6$, $u_7$, and $u_8$ among input bit positions $u_1$ to $u_8$ of FIG. 10) and freezes the other input bit positions. A generator matrix $G_8$ corresponding to the polar code of FIG. 10 is as follows. The generator matrix $G_8$ may be acquired based on Equation 6.

$$G_8 = \begin{bmatrix} 1 & 0 & 0 & 0 & 0 & 0 & 0 & 0 \\ 1 & 1 & 0 & 0 & 0 & 0 & 0 & 0 \\ 1 & 0 & 1 & 0 & 0 & 0 & 0 & 0 \\ 1 & 1 & 1 & 1 & 0 & 0 & 0 & 0 \\ 1 & 0 & 0 & 0 & 1 & 0 & 0 & 0 \\ 1 & 1 & 0 & 0 & 1 & 1 & 0 & 0 \\ 1 & 0 & 1 & 0 & 1 & 0 & 1 & 0 \\ 1 & 1 & 1 & 1 & 1 & 1 & 1 & 1 \end{bmatrix}$$ [Equation 12]

The input bit positions denoted as $u_1$ to $u_8$ of FIG. 10 correspond one by one to rows from the highest row to the lowest row of $G_8$. Referring to FIG. 10, it may be appreciated that the input bit corresponding to $u_8$ affects all output coded bits. On the other hand, it may be appreciated that the input bit corresponding to $u_1$ affects only $y_1$ among the output coded bits. Referring to Equation 12, when binary-input source bits $u_1$ to $u_8$ are multiplied by $G_8$, a row in which the input bits appear at all output bits is the lowest row [1, 1, 1, 1, 1, 1, 1, 1] in which all elements are 1, among rows of $G_8$. Meanwhile, a row in which the binary-input source bits appears at only one output bit is a row in which one element is 1 among the rows of $G_8$, i.e., a row [1, 0, 0, 0, 0, 0, 0, 0] in which a row weight is 1. Similarly, it may be appreciated that a row in which a row weight is 2 reflects input bits corresponding to the row in two output bits. Referring to FIG. 10 and Equation 12, $u_1$ to $u_8$ correspond one by one to the rows of $G_8$ and bit indexes for distinguishing between input positions of $u_1$ to $u_8$, i.e., bit indexes for distinguishing between the input positions, may be assigned to the rows of $G_8$.

Hereinafter, for Polar codes, it may be assumed that bit indexes from 0 to N−1 are sequentially allocated to rows of $G_N$ starting from the highest row having the smallest row weight with respect to N input bits. For example, referring to FIG. 10, a bit index 0 is allocated to the input position of $u_1$, i.e., the first row of $G_8$ and a bit index 7 is allocated to the input position of $u_8$, i.e., the last row of $G_8$. However, since the bit indexes are used to indicate input positions of the polar code, a scheme different from the above allocation scheme may be used. For example, bit indexes from 0 to N−1 may be allocated staring from the lowest row having the largest row weight.

In the case of output bit indexes, as illustrated in FIG. 10 and Equation 12, it may be assumed that bit indexes from 0 to N−1 or bit indexes from 1 to N are assigned to columns from the first column having the largest column weight to the last column having the smallest column weight among columns of $G_N$.

In Polar codes, setting of information bits and frozen bits is one of the most important elements in the configuration and performance of the polar code. That is, determination of ranks of input bit positions may be an important element in the performance and configuration of the polar code. For Polar codes, bit indexes may distinguish input or output positions of the polar code. In the present disclosure, a sequence obtained by enumerating reliabilities of bit positions in ascending or descending order are referred to as a bit index sequence or polar sequence. That is, the bit index sequence represents reliabilities of input or output bit positions of the polar code in ascending or descending order. A transmitting device inputs information bits to input bits having high reliabilities based on the input bit index sequence and performs encoding using the polar code. A receiving device may discern input positions to which information bits are allocated or input positions to which frozen bits are allocated, using the same or corresponding input bit index sequence. That is, the receiving device may perform polar decoding using an input bit index sequence which is identical to or corresponds to an input bit index sequence used by the transmitting device and using a corresponding polar code. In the following description, it may be assumed that an input bit index sequence is predetermined so that information bit(s) may be allocated to input bit position(s) having high reliabilities. In the present disclosure, the input bit index sequence is also called a Polar sequence.

Figure 11:
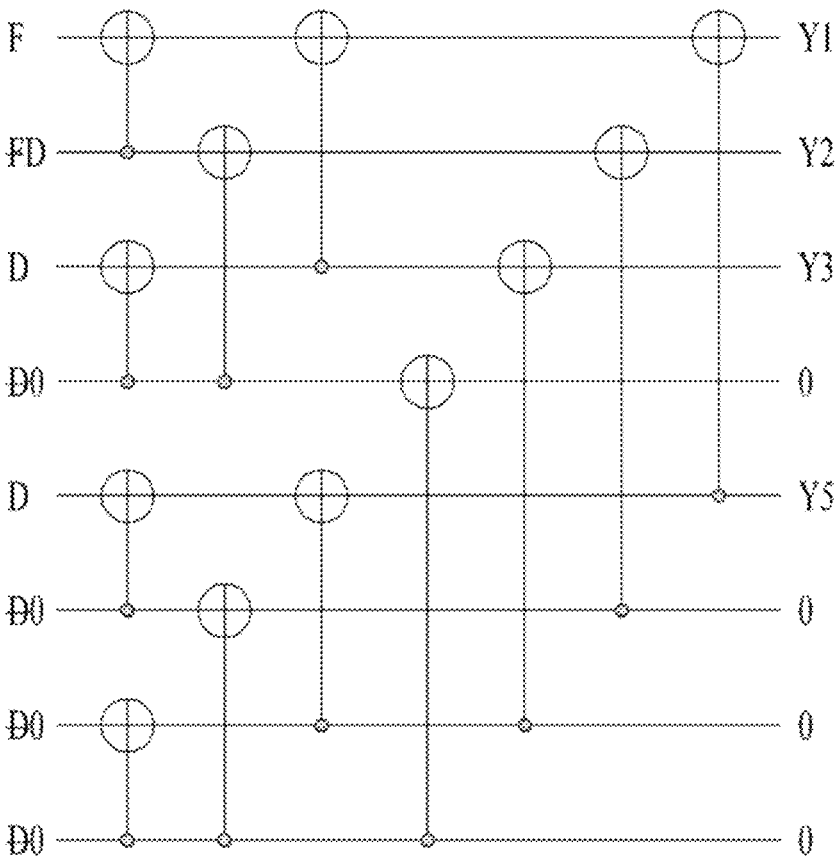
FIG. 11 illustrates puncturing and information bit allocation for Polar codes.

FIG. 11 illustrates puncturing and information bit allocation for polar codes. In FIG. 11, F denotes a frozen bit, D denotes an information bit, and 0 denotes a skipping bit.

Among coded bits, the case in which an information bit is changed to a frozen bit may occur according to an index or position of a punctured bit. For example, if output coded bits for a mother code of N=8 should be punctured in order of Y8, Y7, Y6, Y4, Y5, Y3, Y2, and Y1 and a target code rate is ½, then Y8, Y7, Y6, and Y4 are punctured, U8, U7, U6, and U4 connected only to Y8, Y7, Y6, and Y4 are frozen to 0, and these input bits are not transmitted, as illustrated in FIG. 9. An input bit changed to a frozen bit by puncturing of a coded bit is referred to as a skipping bit or a shortening bit and a corresponding input position is referred to as a skipping position or a shortening position. Shortening is a rate matching method of inserting a known bit into an input bit position connected to a position of an output bit desired to be transmitted while maintaining the size of input information (i.e., the size of information blocks). Shortening is possible starting from input corresponding to a column in which a column weight is 1 in a generator matrix $G_N$ and next shortening may be performed with respect to input corresponding to a column in which a column weight is 1 in a remaining matrix from which a column and row in which a column weight is 1 are removed. To prevent all information bits from being punctured, an information bit that should have been allocated to an information bit position may be reallocated in order of a high reliability within a set of frozen bit positions.

In the case of the polar code, decoding may be generally performed in the following order.

>1. Bit(s) having low reliabilities are recovered first. Although reliability differs according to the structure of a decoder, since an input index in an encoder (hereinafter, an encoder input bit index or bit index) having a low value usually has a low reliability, decoding is generally performed staring from a low encoder input bit index.

>2. When there is a known bit for a recovered bit, the known bit is used together with the recovered bit or the process of 1 is omitted and a known bit for a specific input bit position is immediately used, thereby recovering an information bit, which is an unknown bit. The information bit may be a source information bit (e.g., a bit of a transport block) or a CRC bit.

As described above, an equivalent channel is divided into a noisy channel and a noise free channel through a process of channel combining and channel splitting, and a data payload needs to be transmitted through the noise free channel. That is, the data payload needs to be transmitted over an equivalent noise free channel to obtain desired performance. In this case, the equivalent noise free channel may be determined by obtaining a value of the equivalent channel $Z(W)=\Sigma\sqrt{W(y|0)W(y|1)}$ for each input bit. Z (W) is called the Battacharyya parameter and may correspond to a value corresponding to an upper-bound of error probability when maximum a posteriori probability (MAP) decision is performed for transmission of binary input 0 or 1. Therefore, a transmission end may obtain a value Z(W), select equivalent channel(s) for the data payload in ascending order (e.g., small to large) of the value Z(W) to transmit the data payload, and use the equivalent channel(s) to transmit the data payload. Z(W) may be obtained by the following equation for a binary erasure channel (BEC).

$$Z\left(W_N^{(i)}\right) = Z\left(W_{(b_1,b_2,\ldots,b_{k-1})}\right) = \qquad \text{[Equation 13]}$$

$$\begin{cases} 2Z\left(W_{(b_1,b_2,\ldots,b_{k-1})}\right) - Z\left(W_{(b_1,b_2,\ldots,b_{k-1})}\right)^2, & \text{if } b_k = 0 \\ Z\left(W_{(b_1,b_2,\ldots,b_{k-1})}\right)^2, & \text{if } b_k = 1 \end{cases}$$

For example, when a size of a code block with binary probability 0.5 of a BEC channel is 8, a Z(W) value is calculated using Equation 13 to obtain Z(W)={1.00, 0.68, 0.81, 0.12, 0.88, 0.19, 0.32, 0.00}. Therefore, when a size of a data payload is 2, the data payload needs to be transmitted over equivalent channel 8 with value Z(W)=0.00 and equivalent channel 4 with value Z(W)=0.12.

As described above, reliability may be changed depending on input positions in a polar encoder, and thus the transmission end may perform encoding by assigning a data block to bit channel(s) in order of reliability depending on the size of the data block (i.e., information block before encoding) and setting all the remaining bit channels to frozen (e.g., value '0'). For example, when a mother code size of the polar encoder (i.e., the maximum size of the code block to be encoded by the polar encoder) is N, and a size of a data block input to the polar encoder is K, bits of the data block are arranged in K bit channels in order of reliability, and polar encoding is performed by setting the N−K bit channel(s) to 0.

The following shows a polar sequence used in NR systems (refer to the polar sequences defined in 3GPP TS 38.212 Rel-15).

<Polar Sequence>

| W | I |
|---|---|
| 0 | 0 |
| 1 | 1 |
| 2 | 2 |
| 3 | 4 |
| 4 | 8 |
| 5 | 16 |
| 6 | 32 |
| 7 | 3 |
| 8 | 5 |
| 9 | 64 |
| 10 | 9 |
| 11 | 6 |
| 12 | 17 |
| 13 | 10 |
| 14 | 18 |
| 15 | 128 |
| 16 | 12 |
| 17 | 33 |
| 18 | 65 |
| 19 | 20 |
| 20 | 256 |
| 21 | 34 |
| 22 | 24 |
| 23 | 36 |
| 24 | 7 |
| 25 | 129 |
| 26 | 66 |
| 27 | 512 |
| 28 | 11 |
| 29 | 40 |
| 30 | 68 |
| 31 | 130 |
| 32 | 19 |
| 33 | 13 |
| 34 | 48 |
| 35 | 14 |
| 36 | 72 |
| 37 | 257 |
| 38 | 21 |
| 39 | 132 |
| 40 | 35 |
| 41 | 258 |
| 42 | 26 |
| 43 | 513 |
| 44 | 80 |
| 45 | 37 |
| 46 | 25 |
| 47 | 22 |
| 48 | 136 |
| 49 | 260 |
| 50 | 264 |
| 51 | 38 |
| 52 | 514 |
| 53 | 96 |
| 54 | 67 |
| 55 | 41 |
| 56 | 144 |
| 57 | 28 |
| 58 | 69 |

28

-continued

| W | I |
|---|---|
| 59 | 42 |
| 60 | 516 |
| 61 | 49 |
| 62 | 74 |
| 63 | 272 |
| 64 | 160 |
| 65 | 520 |
| 66 | 288 |
| 67 | 528 |
| 68 | 192 |
| 69 | 544 |
| 70 | 70 |
| 71 | 44 |
| 72 | 131 |
| 73 | 81 |
| 74 | 50 |
| 75 | 73 |
| 76 | 15 |
| 77 | 320 |
| 78 | 133 |
| 79 | 52 |
| 80 | 23 |
| 81 | 134 |
| 82 | 384 |
| 83 | 76 |
| 84 | 137 |
| 85 | 82 |
| 86 | 56 |
| 87 | 27 |
| 88 | 97 |
| 89 | 39 |
| 90 | 259 |
| 91 | 84 |
| 92 | 138 |
| 93 | 145 |
| 94 | 261 |
| 95 | 29 |
| 96 | 43 |
| 97 | 98 |
| 98 | 515 |
| 99 | 88 |
| 100 | 140 |
| 101 | 30 |
| 102 | 146 |
| 103 | 71 |
| 104 | 262 |
| 105 | 265 |
| 106 | 161 |
| 107 | 576 |
| 108 | 45 |
| 109 | 100 |
| 110 | 640 |
| 111 | 51 |
| 112 | 148 |
| 113 | 46 |
| 114 | 75 |
| 115 | 266 |
| 116 | 273 |
| 117 | 517 |
| 118 | 104 |
| 119 | 162 |
| 120 | 53 |
| 121 | 193 |
| 122 | 152 |
| 123 | 77 |
| 124 | 164 |
| 125 | 768 |
| 126 | 268 |
| 127 | 274 |
| 128 | 518 |
| 129 | 54 |
| 130 | 83 |
| 131 | 57 |
| 132 | 521 |
| 133 | 112 |
| 134 | 135 |
| 135 | 78 |

29

-continued

30

-continued

| W | I | | W | I |
|---|---|---|---|---|
| 136 | 289 | | 213 | 156 |
| 137 | 194 | | 214 | 87 |
| 138 | 85 | | 215 | 197 |
| 139 | 276 | | 216 | 116 |
| 140 | 522 | | 217 | 170 |
| 141 | 58 | | 218 | 61 |
| 142 | 168 | | 219 | 531 |
| 143 | 139 | | 220 | 525 |
| 144 | 99 | | 221 | 642 |
| 145 | 86 | | 222 | 281 |
| 146 | 60 | | 223 | 278 |
| 147 | 280 | | 224 | 526 |
| 148 | 89 | | 225 | 177 |
| 149 | 290 | | 226 | 293 |
| 150 | 529 | | 227 | 388 |
| 151 | 524 | | 228 | 91 |
| 152 | 196 | | 229 | 584 |
| 153 | 141 | | 230 | 769 |
| 154 | 101 | | 231 | 198 |
| 155 | 147 | | 232 | 172 |
| 156 | 176 | | 233 | 120 |
| 157 | 142 | | 234 | 201 |
| 158 | 530 | | 235 | 336 |
| 159 | 321 | | 236 | 62 |
| 160 | 31 | | 237 | 282 |
| 161 | 200 | | 238 | 143 |
| 162 | 90 | | 239 | 103 |
| 163 | 545 | | 240 | 178 |
| 164 | 292 | | 241 | 294 |
| 165 | 322 | | 242 | 93 |
| 166 | 532 | | 243 | 644 |
| 167 | 263 | | 244 | 202 |
| 168 | 149 | | 245 | 592 |
| 169 | 102 | | 246 | 323 |
| 170 | 105 | | 247 | 392 |
| 171 | 304 | | 248 | 297 |
| 172 | 296 | | 249 | 770 |
| 173 | 163 | | 250 | 107 |
| 174 | 92 | | 251 | 180 |
| 175 | 47 | | 252 | 151 |
| 176 | 267 | | 253 | 209 |
| 177 | 385 | | 254 | 284 |
| 178 | 546 | | 255 | 648 |
| 179 | 324 | | 256 | 94 |
| 180 | 208 | | 257 | 204 |
| 181 | 386 | | 258 | 298 |
| 182 | 150 | | 259 | 400 |
| 183 | 153 | | 260 | 608 |
| 184 | 165 | | 261 | 352 |
| 185 | 106 | | 262 | 325 |
| 186 | 55 | | 263 | 533 |
| 187 | 328 | | 264 | 155 |
| 188 | 536 | | 265 | 210 |
| 189 | 577 | | 266 | 305 |
| 190 | 548 | | 267 | 547 |
| 191 | 113 | | 268 | 300 |
| 192 | 154 | | 269 | 109 |
| 193 | 79 | | 270 | 184 |
| 194 | 269 | | 271 | 534 |
| 195 | 108 | | 272 | 537 |
| 196 | 578 | | 273 | 115 |
| 197 | 224 | | 274 | 167 |
| 198 | 166 | | 275 | 225 |
| 199 | 519 | | 276 | 326 |
| 200 | 552 | | 277 | 306 |
| 201 | 195 | | 278 | 772 |
| 202 | 270 | | 279 | 157 |
| 203 | 641 | | 280 | 656 |
| 204 | 523 | | 281 | 329 |
| 205 | 275 | | 282 | 110 |
| 206 | 580 | | 283 | 117 |
| 207 | 291 | | 284 | 212 |
| 208 | 59 | | 285 | 171 |
| 209 | 169 | | 286 | 776 |
| 210 | 560 | | 287 | 330 |
| 211 | 114 | | 288 | 226 |
| 212 | 277 | | 289 | 549 |

-continued

-continued

| W | I |
| --- | --- |
| 290 | 538 |
| 291 | 387 |
| 292 | 308 |
| 293 | 216 |
| 294 | 416 |
| 295 | 271 |
| 296 | 279 |
| 297 | 158 |
| 298 | 337 |
| 299 | 550 |
| 300 | 672 |
| 301 | 118 |
| 302 | 332 |
| 303 | 579 |
| 304 | 540 |
| 305 | 389 |
| 306 | 173 |
| 307 | 121 |
| 308 | 553 |
| 309 | 199 |
| 310 | 784 |
| 311 | 179 |
| 312 | 228 |
| 313 | 338 |
| 314 | 312 |
| 315 | 704 |
| 316 | 390 |
| 317 | 174 |
| 318 | 554 |
| 319 | 581 |
| 320 | 393 |
| 321 | 283 |
| 322 | 122 |
| 323 | 448 |
| 324 | 353 |
| 325 | 561 |
| 326 | 203 |
| 327 | 63 |
| 328 | 340 |
| 329 | 394 |
| 330 | 527 |
| 331 | 582 |
| 332 | 556 |
| 333 | 181 |
| 334 | 295 |
| 335 | 285 |
| 336 | 232 |
| 337 | 124 |
| 338 | 205 |
| 339 | 182 |
| 340 | 643 |
| 341 | 562 |
| 342 | 286 |
| 343 | 585 |
| 344 | 299 |
| 345 | 354 |
| 346 | 211 |
| 347 | 401 |
| 348 | 185 |
| 349 | 396 |
| 350 | 344 |
| 351 | 586 |
| 352 | 645 |
| 353 | 593 |
| 354 | 535 |
| 355 | 240 |
| 356 | 206 |
| 357 | 95 |
| 358 | 327 |
| 359 | 564 |
| 360 | 800 |
| 361 | 402 |
| 362 | 356 |
| 363 | 307 |
| 364 | 301 |
| 365 | 417 |
| 366 | 213 |

| W | I |
| --- | --- |
| 367 | 568 |
| 368 | 832 |
| 369 | 588 |
| 370 | 186 |
| 371 | 646 |
| 372 | 404 |
| 373 | 227 |
| 374 | 896 |
| 375 | 594 |
| 376 | 418 |
| 377 | 302 |
| 378 | 649 |
| 379 | 771 |
| 380 | 360 |
| 381 | 539 |
| 382 | 111 |
| 383 | 331 |
| 384 | 214 |
| 385 | 309 |
| 386 | 188 |
| 387 | 449 |
| 388 | 217 |
| 389 | 408 |
| 390 | 609 |
| 391 | 596 |
| 392 | 551 |
| 393 | 650 |
| 394 | 229 |
| 395 | 159 |
| 396 | 420 |
| 397 | 310 |
| 398 | 541 |
| 399 | 773 |
| 400 | 610 |
| 401 | 657 |
| 402 | 333 |
| 403 | 119 |
| 404 | 600 |
| 405 | 339 |
| 406 | 218 |
| 407 | 368 |
| 408 | 652 |
| 409 | 230 |
| 410 | 391 |
| 411 | 313 |
| 412 | 450 |
| 413 | 542 |
| 414 | 334 |
| 415 | 233 |
| 416 | 555 |
| 417 | 774 |
| 418 | 175 |
| 419 | 123 |
| 420 | 658 |
| 421 | 612 |
| 422 | 341 |
| 423 | 777 |
| 424 | 220 |
| 425 | 314 |
| 426 | 424 |
| 427 | 395 |
| 428 | 673 |
| 429 | 583 |
| 430 | 355 |
| 431 | 287 |
| 432 | 183 |
| 433 | 234 |
| 434 | 125 |
| 435 | 557 |
| 436 | 660 |
| 437 | 616 |
| 438 | 342 |
| 439 | 316 |
| 440 | 241 |
| 441 | 778 |
| 442 | 563 |
| 443 | 345 |

-continued

| W | I |
| --- | --- |
| 444 | 452 |
| 445 | 397 |
| 446 | 403 |
| 447 | 207 |
| 448 | 674 |
| 449 | 558 |
| 450 | 785 |
| 451 | 432 |
| 452 | 357 |
| 453 | 187 |
| 454 | 236 |
| 455 | 664 |
| 456 | 624 |
| 457 | 587 |
| 458 | 780 |
| 459 | 705 |
| 460 | 126 |
| 461 | 242 |
| 462 | 565 |
| 463 | 398 |
| 464 | 346 |
| 465 | 456 |
| 466 | 358 |
| 467 | 405 |
| 468 | 303 |
| 469 | 569 |
| 470 | 244 |
| 471 | 595 |
| 472 | 189 |
| 473 | 566 |
| 474 | 676 |
| 475 | 361 |
| 476 | 706 |
| 477 | 589 |
| 478 | 215 |
| 479 | 786 |
| 480 | 647 |
| 481 | 348 |
| 482 | 419 |
| 483 | 406 |
| 484 | 464 |
| 485 | 680 |
| 486 | 801 |
| 487 | 362 |
| 488 | 590 |
| 489 | 409 |
| 490 | 570 |
| 491 | 788 |
| 492 | 597 |
| 493 | 572 |
| 494 | 219 |
| 495 | 311 |
| 496 | 708 |
| 497 | 598 |
| 498 | 601 |
| 499 | 651 |
| 500 | 421 |
| 501 | 792 |
| 502 | 802 |
| 503 | 611 |
| 504 | 602 |
| 505 | 410 |
| 506 | 231 |
| 507 | 688 |
| 508 | 653 |
| 509 | 248 |
| 510 | 369 |
| 511 | 190 |
| 512 | 364 |
| 513 | 654 |
| 514 | 659 |
| 515 | 335 |
| 516 | 480 |
| 517 | 315 |
| 518 | 221 |
| 519 | 370 |
| 520 | 613 |

-continued

| W | I |
| --- | --- |
| 521 | 422 |
| 522 | 425 |
| 523 | 451 |
| 524 | 614 |
| 525 | 543 |
| 526 | 235 |
| 527 | 412 |
| 528 | 343 |
| 529 | 372 |
| 530 | 775 |
| 531 | 317 |
| 532 | 222 |
| 533 | 426 |
| 534 | 453 |
| 535 | 237 |
| 536 | 559 |
| 537 | 833 |
| 538 | 804 |
| 539 | 712 |
| 540 | 834 |
| 541 | 661 |
| 542 | 808 |
| 543 | 779 |
| 544 | 617 |
| 545 | 604 |
| 546 | 433 |
| 547 | 720 |
| 548 | 816 |
| 549 | 836 |
| 550 | 347 |
| 551 | 897 |
| 552 | 243 |
| 553 | 662 |
| 554 | 454 |
| 555 | 318 |
| 556 | 675 |
| 557 | 618 |
| 558 | 898 |
| 559 | 781 |
| 560 | 376 |
| 561 | 428 |
| 562 | 665 |
| 563 | 736 |
| 564 | 567 |
| 565 | 840 |
| 566 | 625 |
| 567 | 238 |
| 568 | 359 |
| 569 | 457 |
| 570 | 399 |
| 571 | 787 |
| 572 | 591 |
| 573 | 678 |
| 574 | 434 |
| 575 | 677 |
| 576 | 349 |
| 577 | 245 |
| 578 | 458 |
| 579 | 666 |
| 580 | 620 |
| 581 | 363 |
| 582 | 127 |
| 583 | 191 |
| 584 | 782 |
| 585 | 407 |
| 586 | 436 |
| 587 | 626 |
| 588 | 571 |
| 589 | 465 |
| 590 | 681 |
| 591 | 246 |
| 592 | 707 |
| 593 | 350 |
| 594 | 599 |
| 595 | 668 |
| 596 | 790 |
| 597 | 460 |

| W | I |
| --- | --- |
| 598 | 249 |
| 599 | 682 |
| 600 | 573 |
| 601 | 411 |
| 602 | 803 |
| 603 | 789 |
| 604 | 709 |
| 605 | 365 |
| 606 | 440 |
| 607 | 628 |
| 608 | 689 |
| 609 | 374 |
| 610 | 423 |
| 611 | 466 |
| 612 | 793 |
| 613 | 250 |
| 614 | 371 |
| 615 | 481 |
| 616 | 574 |
| 617 | 413 |
| 618 | 603 |
| 619 | 366 |
| 620 | 468 |
| 621 | 655 |
| 622 | 900 |
| 623 | 805 |
| 624 | 615 |
| 625 | 684 |
| 626 | 710 |
| 627 | 429 |
| 628 | 794 |
| 629 | 252 |
| 630 | 373 |
| 631 | 605 |
| 632 | 848 |
| 633 | 690 |
| 634 | 713 |
| 635 | 632 |
| 636 | 482 |
| 637 | 806 |
| 638 | 427 |
| 639 | 904 |
| 640 | 414 |
| 641 | 223 |
| 642 | 663 |
| 643 | 692 |
| 644 | 835 |
| 645 | 619 |
| 646 | 472 |
| 647 | 455 |
| 648 | 796 |
| 649 | 809 |
| 650 | 714 |
| 651 | 721 |
| 652 | 837 |
| 653 | 716 |
| 654 | 864 |
| 655 | 810 |
| 656 | 606 |
| 657 | 912 |
| 658 | 722 |
| 659 | 696 |
| 660 | 377 |
| 661 | 435 |
| 662 | 817 |
| 663 | 319 |
| 664 | 621 |
| 665 | 812 |
| 666 | 484 |
| 667 | 430 |
| 668 | 838 |
| 669 | 667 |
| 670 | 488 |
| 671 | 239 |
| 672 | 378 |
| 673 | 459 |
| 674 | 622 |

| W | I |
| --- | --- |
| 675 | 627 |
| 676 | 437 |
| 677 | 380 |
| 678 | 818 |
| 679 | 461 |
| 680 | 496 |
| 681 | 669 |
| 682 | 679 |
| 683 | 724 |
| 684 | 841 |
| 685 | 629 |
| 686 | 351 |
| 687 | 467 |
| 688 | 438 |
| 689 | 737 |
| 690 | 251 |
| 691 | 462 |
| 692 | 442 |
| 693 | 441 |
| 694 | 469 |
| 695 | 247 |
| 696 | 683 |
| 697 | 842 |
| 698 | 738 |
| 699 | 899 |
| 700 | 670 |
| 701 | 783 |
| 702 | 849 |
| 703 | 820 |
| 704 | 728 |
| 705 | 928 |
| 706 | 791 |
| 707 | 367 |
| 708 | 901 |
| 709 | 630 |
| 710 | 685 |
| 711 | 844 |
| 712 | 633 |
| 713 | 711 |
| 714 | 253 |
| 715 | 691 |
| 716 | 824 |
| 717 | 902 |
| 718 | 686 |
| 719 | 740 |
| 720 | 850 |
| 721 | 375 |
| 722 | 444 |
| 723 | 470 |
| 724 | 483 |
| 725 | 415 |
| 726 | 485 |
| 727 | 905 |
| 728 | 795 |
| 729 | 473 |
| 730 | 634 |
| 731 | 744 |
| 732 | 852 |
| 733 | 960 |
| 734 | 865 |
| 735 | 693 |
| 736 | 797 |
| 737 | 906 |
| 738 | 715 |
| 739 | 807 |
| 740 | 474 |
| 741 | 636 |
| 742 | 694 |
| 743 | 254 |
| 744 | 717 |
| 745 | 575 |
| 746 | 913 |
| 747 | 798 |
| 748 | 811 |
| 749 | 379 |
| 750 | 697 |
| 751 | 431 |

-continued

-continued

| W | I |
| --- | --- |
| 752 | 607 |
| 753 | 489 |
| 754 | 866 |
| 755 | 723 |
| 756 | 486 |
| 757 | 908 |
| 758 | 718 |
| 759 | 813 |
| 760 | 476 |
| 761 | 856 |
| 762 | 839 |
| 763 | 725 |
| 764 | 698 |
| 765 | 914 |
| 766 | 752 |
| 767 | 868 |
| 768 | 819 |
| 769 | 814 |
| 770 | 439 |
| 771 | 929 |
| 772 | 490 |
| 773 | 623 |
| 774 | 671 |
| 775 | 739 |
| 776 | 916 |
| 777 | 463 |
| 778 | 843 |
| 779 | 381 |
| 780 | 497 |
| 781 | 930 |
| 782 | 821 |
| 783 | 726 |
| 784 | 961 |
| 785 | 872 |
| 786 | 492 |
| 787 | 631 |
| 788 | 729 |
| 789 | 700 |
| 790 | 443 |
| 791 | 741 |
| 792 | 845 |
| 793 | 920 |
| 794 | 382 |
| 795 | 822 |
| 796 | 851 |
| 797 | 730 |
| 798 | 498 |
| 799 | 880 |
| 800 | 742 |
| 801 | 445 |
| 802 | 471 |
| 803 | 635 |
| 804 | 932 |
| 805 | 687 |
| 806 | 903 |
| 807 | 825 |
| 808 | 500 |
| 809 | 846 |
| 810 | 745 |
| 811 | 826 |
| 812 | 732 |
| 813 | 446 |
| 814 | 962 |
| 815 | 936 |
| 816 | 475 |
| 817 | 853 |
| 818 | 867 |
| 819 | 637 |
| 820 | 907 |
| 821 | 487 |
| 822 | 695 |
| 823 | 746 |
| 824 | 828 |
| 825 | 753 |
| 826 | 854 |
| 827 | 857 |
| 828 | 504 |

| W | I |
| --- | --- |
| 829 | 799 |
| 830 | 255 |
| 831 | 964 |
| 832 | 909 |
| 833 | 719 |
| 834 | 477 |
| 835 | 915 |
| 836 | 638 |
| 837 | 748 |
| 838 | 944 |
| 839 | 869 |
| 840 | 491 |
| 841 | 699 |
| 842 | 754 |
| 843 | 858 |
| 844 | 478 |
| 845 | 968 |
| 846 | 383 |
| 847 | 910 |
| 848 | 815 |
| 849 | 976 |
| 850 | 870 |
| 851 | 917 |
| 852 | 727 |
| 853 | 493 |
| 854 | 873 |
| 855 | 701 |
| 856 | 931 |
| 857 | 756 |
| 858 | 860 |
| 859 | 499 |
| 860 | 731 |
| 861 | 823 |
| 862 | 922 |
| 863 | 874 |
| 864 | 918 |
| 865 | 502 |
| 866 | 933 |
| 867 | 743 |
| 868 | 760 |
| 869 | 881 |
| 870 | 494 |
| 871 | 702 |
| 872 | 921 |
| 873 | 501 |
| 874 | 876 |
| 875 | 847 |
| 876 | 992 |
| 877 | 447 |
| 878 | 733 |
| 879 | 827 |
| 880 | 934 |
| 881 | 882 |
| 882 | 937 |
| 883 | 963 |
| 884 | 747 |
| 885 | 505 |
| 886 | 855 |
| 887 | 924 |
| 888 | 734 |
| 889 | 829 |
| 890 | 965 |
| 891 | 938 |
| 892 | 884 |
| 893 | 506 |
| 894 | 749 |
| 895 | 945 |
| 896 | 966 |
| 897 | 755 |
| 898 | 859 |
| 899 | 940 |
| 900 | 830 |
| 901 | 911 |
| 902 | 871 |
| 903 | 639 |
| 904 | 888 |
| 905 | 479 |

39

-continued

| W | I |
|---|---|
| 906 | 946 |
| 907 | 750 |
| 908 | 969 |
| 909 | 508 |
| 910 | 861 |
| 911 | 757 |
| 912 | 970 |
| 913 | 919 |
| 914 | 875 |
| 915 | 862 |
| 916 | 758 |
| 917 | 948 |
| 918 | 977 |
| 919 | 923 |
| 920 | 972 |
| 921 | 761 |
| 922 | 877 |
| 923 | 952 |
| 924 | 495 |
| 925 | 703 |
| 926 | 935 |
| 927 | 978 |
| 928 | 883 |
| 929 | 762 |
| 930 | 503 |
| 931 | 925 |
| 932 | 878 |
| 933 | 735 |
| 934 | 993 |
| 935 | 885 |
| 936 | 939 |
| 937 | 994 |
| 938 | 980 |
| 939 | 926 |
| 940 | 764 |
| 941 | 941 |
| 942 | 967 |
| 943 | 886 |
| 944 | 831 |
| 945 | 947 |
| 946 | 507 |
| 947 | 889 |
| 948 | 984 |
| 949 | 751 |
| 950 | 942 |
| 951 | 996 |
| 952 | 971 |
| 953 | 890 |
| 954 | 509 |
| 955 | 949 |
| 956 | 973 |
| 957 | 1000 |
| 958 | 892 |
| 959 | 950 |
| 960 | 863 |
| 961 | 759 |
| 962 | 1008 |
| 963 | 510 |
| 964 | 979 |
| 965 | 953 |
| 966 | 763 |
| 967 | 974 |
| 968 | 954 |
| 969 | 879 |
| 970 | 981 |
| 971 | 982 |
| 972 | 927 |
| 973 | 995 |
| 974 | 765 |
| 975 | 956 |
| 976 | 887 |
| 977 | 985 |
| 978 | 997 |
| 979 | 986 |
| 980 | 943 |
| 981 | 891 |
| 982 | 998 |

40

-continued

| W | I |
|---|---|
| 983 | 766 |
| 984 | 511 |
| 985 | 988 |
| 986 | 1001 |
| 987 | 951 |
| 988 | 1002 |
| 989 | 893 |
| 990 | 975 |
| 991 | 894 |
| 992 | 1009 |
| 993 | 955 |
| 994 | 1004 |
| 995 | 1010 |
| 996 | 957 |
| 997 | 983 |
| 998 | 958 |
| 999 | 987 |
| 1000 | 1012 |
| 1001 | 999 |
| 1002 | 1016 |
| 1003 | 767 |
| 1004 | 989 |
| 1005 | 1003 |
| 1006 | 990 |
| 1007 | 1005 |
| 1008 | 959 |
| 1009 | 1011 |
| 1010 | 1013 |
| 1011 | 895 |
| 1012 | 1006 |
| 1013 | 1014 |
| 1014 | 1017 |
| 1015 | 1018 |
| 1016 | 991 |
| 1017 | 1020 |
| 1018 | 1007 |
| 1019 | 1015 |
| 1020 | 1019 |
| 1021 | 1021 |
| 1022 | 1022 |
| 1023 | 1023 |

The above table shows a Polar sequence $Q_0^{Nmax-1}$ and a reliability $W(Q_i^{Nmax})$ of the Polar sequence. In the above table, W denotes $W(Q_i^{Nmax})$ and I denotes $Q_i^{Nmax}$ Namely, the Polar sequence $Q_0^{Nmax-1}=\{Q_0^{Nmax}, Q_1^{Nmax}, \ldots, Q_{Nmax-1}^{Nmax}\}$ is given by the above table, where $0<=Q_i^{Nmax}<=$Nmax−1 denotes a bit index (i.e., bit channel index) before Polar encoding for i=0, 1, . . . , Nmax−1, and, for 3GPP TS 38.212 Rel-15, Nmax=1024. The Polar sequence $Q_0^{Nmax-1}$ is ascending order of reliability $W(Q_0^{Nmax})<W(Q_1^{Nmax})< \ldots <W(Q_{Nmax-1}^{Nmax})$, where $W(Q_i^{Nmax})$ denotes the reliability of bit index $Q_i^{Nmax}$ For example, referring to the above table, a reliability $W(Q_i^{Nmax})=3$ of a bit index $Q_i^{Nmax}=4$ is lower than a reliability $W(Q_i^{Nmax})=7$ of bit index $Q_i^{Nmax}=3$. That is, the above table lists, in ascending order of reliability, bit indexes 0 to 1023 which respectively indicate 1024 input positions of a Polar code of Nmax=1024. The polar sequence $Q_0^{Nmax-1}$ according to the above table may be expressed as follows: $Q_0^{Nmax-1}=\{Q_0^{Nmax}, Q_1^{Nmax}, \ldots, Q_{Nmax-1}^{Nmax}\}=\{$0, 1, 2, 4, 8, 16, 32, 3, 5, 64, 9, 6, 17, 10, 18, 128, 12, 33, 65, 20, 256, 34, 24, 36, 7, 129, 66, 512, 11, 40, 68, 130, 19, 13, 48, 14, 72, 257, 21, 132, 35, 258, 26, 513, 80, 37, 25, 22, 136, 260, 264, 38, 514, 96, 67, 41, 144, 28, 69, 42, 516, 49, 74, 272, 160, 520, 288, 528, 192, 544, 70, 44, 131, 81, 50, 73, 15, 320, 133, 52, 23, 134, 384, 76, 137, 82, 56, 27, 97, 39, 259, 84, 138, 145, 261, 29, 43, 98, 515, 88, 140, 30, 146, 71, 262, 265, 161, 576, 45, 100, 640, 51, 148, 46, 75, 266, 273, 517, 104, 162, 53, 193, 152, 77, 164, 768, 268, 274, 518, 54, 83, 57, 521, 112, 135, 78, 289, 194, 85, 276, 522, 58, 168, 139, 99, 86, 60, 280, 89, 290, 529, 524, 196, 141, 101,147, 176,
142, 530, 321, 31, 200, 90, 545, 292, 322, 532, 263, 149,
102, 105, 304, 296, 163, 92, 47, 267, 385, 546, 324, 208,
386, 150, 153, 165, 106, 55, 328, 536, 577, 548, 113, 154,
79, 269, 108, 578, 224, 166, 519, 552, 195, 270, 641, 523,
275, 580, 291, 59, 169, 560, 114,277, 156, 87, 197, 116, 170,
61, 531, 525, 642, 281, 278, 526, 177, 293, 388, 91, 584,
769, 198, 172, 120, 201, 336, 62, 282, 143, 103, 178, 294,
93, 644, 202, 592, 323, 392, 297, 770, 107, 180, 151, 209,
284, 648, 94, 204, 298, 400, 608, 352, 325, 533, 155, 210,
305, 547, 300, 109, 184, 534, 537, 115, 167, 225, 326, 306,
772, 157, 656, 329, 110, 117, 212, 171, 776, 330, 226, 549,
538, 387, 308, 216, 416, 271, 279, 158, 337, 550, 672, 118,
332, 579, 540, 389, 173, 121, 553, 199, 784, 179, 228, 338,
312, 704, 390, 174, 554, 581, 393, 283, 122, 448, 353, 561,
203, 63, 340, 394, 527, 582, 556, 181, 295, 285, 232, 124,
205, 182, 643, 562, 286, 585, 299, 354, 211, 401, 185, 396,
344, 586, 645, 593, 535, 240, 206, 95, 327, 564, 800, 402,
356, 307, 301, 417, 213, 568, 832, 588, 186, 646, 404, 227,
896, 594, 418, 302, 649, 771, 360, 539, 111, 331, 214, 309,
188, 449, 217, 408, 609, 596, 551, 650, 229, 159, 420, 310,
541, 773, 610, 657, 333, 119, 600, 339, 218, 368, 652, 230,
391, 313, 450, 542, 334, 233, 555, 774, 175, 123, 658, 612,
341, 777, 220, 314, 424, 395, 673, 583, 355, 287, 183, 234,
125, 557, 660, 616, 342, 316, 241, 778, 563, 345, 452, 397,
403, 207, 674, 558, 785, 432, 357, 187, 236, 664, 624, 587,
780, 705, 126, 242, 565, 398, 346, 456, 358, 405, 303, 569,
244, 595, 189, 566, 676, 361, 706, 589, 215, 786, 647, 348,
419, 406, 464, 680, 801, 362, 590, 409, 570, 788, 597, 572,
219, 311, 708, 598, 601, 651, 421, 792, 802, 611, 602, 410,
231, 688, 653, 248, 369, 190, 364, 654, 659, 335, 480, 315,
221, 370, 613, 422, 425, 451, 614, 543, 235, 412, 343, 372,
775, 317, 222, 426, 453, 237, 559, 833, 804, 712, 834, 661,
808, 779, 617, 604, 433, 720, 816, 836, 347, 897, 243, 662,
454, 318, 675, 618, 898, 781, 376, 428, 665, 736, 567, 840,
625, 238, 359, 457, 399, 787, 591, 678, 434, 677, 349, 245,
458, 666, 620, 363, 127, 191, 782, 407, 436, 626, 571, 465,
681, 246, 707, 350, 599, 668, 790, 460, 249, 682, 573, 411,
803, 789, 709, 365, 440, 628, 689, 374, 423, 466, 793, 250,
371, 481, 574, 413,603, 366, 468, 655, 900, 805, 615, 684,
710, 429, 794, 252, 373, 605, 848, 690, 713, 632, 482, 806,
427, 904, 414, 223, 663, 692, 835, 619, 472, 455, 796, 809,
714, 721, 837, 716, 864, 810, 606, 912, 722, 696, 377, 435,
817, 319, 621, 812, 484, 430, 838, 667, 488, 239, 378, 459,
622, 627, 437, 380, 818, 461, 496, 669, 679, 724, 841, 629,
351, 467, 438, 737, 251, 462, 442, 441, 469, 247, 683, 842,
738, 899, 670, 783, 849, 820, 728, 928, 791, 367, 901, 630,
685, 844, 633, 711, 253, 691, 824, 902, 686, 740, 850, 375,
444, 470, 483, 415, 485, 905, 795, 473, 634, 744, 852, 960,
865, 693, 797, 906, 715, 807, 474, 636, 694, 254, 717, 575,
913, 798, 811, 379, 697, 431, 607, 489, 866, 723, 486, 908,
718, 813, 476, 856, 839, 725, 698, 914, 752, 868, 819, 814,
439, 929, 490, 623, 671, 739, 916, 463, 843, 381, 497, 930,
821, 726, 961, 872, 492, 631, 729, 700, 443, 741, 845, 920,
382, 822, 851, 730, 498, 880, 742, 445, 471, 635, 932, 687,
903, 825, 500, 846, 745, 826, 732, 446, 962, 936, 475, 853,
867, 637, 907, 487, 695, 746, 828, 753, 854, 857, 504, 799,
255, 964, 909, 719, 477, 915, 638, 748, 944, 869, 491, 699,
754, 858, 478, 968, 383, 910, 815, 976, 870, 917, 727, 493,
873, 701, 931, 756, 860, 499, 731, 823, 922, 874, 918, 502,
933, 743, 760, 881, 494, 702, 921, 501, 876, 847, 992, 447,
733, 827, 934, 882, 937, 963, 747, 505, 855, 924, 734, 829,
965, 938, 884, 506, 749, 945, 966, 755, 859, 940, 830, 911,
871, 639, 888, 479, 946, 750, 969, 508, 861, 757, 970, 919,
875, 862, 758, 948, 977, 923, 972, 761, 877, 952, 495, 703,
935, 978, 883, 762, 503, 925, 878, 735, 993, 885, 939, 994,
980, 926, 764, 941, 967, 886, 831, 947, 507, 889, 984, 751, 942, 996, 971, 890, 509, 949, 973, 1000, 892, 950, 863, 759,
1008, 510, 979, 953, 763, 974, 954, 879, 981, 982, 927, 995,
765, 956, 887, 985, 997, 986, 943, 891, 998, 766, 511, 988,
1001, 951, 1002, 893, 975, 894, 1009, 955, 1004, 1010, 957,
983, 958, 987, 1012, 999, 1016, 767, 989, 1003, 990, 1005,
959, 1011, 1013, 895, 1006, 1014, 1017, 1018, 991, 1020,
1007, 1015, 1019, 1021, 1022, 1023}

For any information block encoded to N bits, a same Polar sequence $Q_0^{N-1}=\{Q_0^N, Q_1^N, Q_2^N, \ldots, Q_{N-1}^N\}$ is used. The Polar sequence $Q_0^{N-1}$ is a subset of Polar sequence $Q_0^{Nmax-1}$ with all elements $Q_i^{Nmax}$ of values less than N, ordered in ascending order of reliability $W(Q_0^N)<W(Q_1^N)<W(Q_2^N)< \ldots <W(Q_{N-1}^N)$. For example, when N=8, a Polar sequence $Q_0^7$ includes elements of $Q_i^{Nmax}<_8$ among elements of the Polar sequence $Q_0^{Nmax-1}$ and the elements of $Q_i^{Nmax}<_8$ are ordered in ascending order of reliability $W(0)<W(1)<W(2)<W(4)<W(3)<W(5)<W(6)$.

For example, Table 3 lists input bit positions for an information block of size K (=10) input to a Polar code in a Polar sequence of N=512.

TABLE 3

| | Polar sequence |
|---|---|
| 1 | 505 |
| 2 | 506 |
| 3 | 479 |
| 4 | 508 |
| 5 | 495 |
| 6 | 503 |
| 7 | 507 |
| 8 | 509 |
| 9 | 510 |
| 10 | 511 |

Table 3 shows 10 elements for K=10 among elements of the Polar sequence of N=512 in ascending order of reliability. Referring to the above-described table of <Polar sequence>, values of I having 10 reliabilities $W(Q_i^{Nmax})$ among values of I (=$Q_i^{Nmax}$) less than N=512 are {479, 495, 503, 505, 506, 507, 508, 509, 510, 511}. If {479, 495, 503, 505, 506, 507, 508, 509, 510, 511} are arranged in ascending order of reliability W, {505, 506, 479, 508, 495, 503, 507, 509, 510, 511}, which is a set of bit indexes for K=10 in the Polar sequence of N=512 shown in Table 7, may be obtained.

When a bit sequence input to channel coding is represented as bits $c_0, c_1, c_2, c_3, \ldots, c_{K-1}$, bits after encoding the bits are represented as $d_0, d_1, d_2, d_3, \ldots, d_{N-1}$, where K is the number of bits to be encoded and $N=2^n$. In $N=2^n$, the value of n may be determined by the following table.

TABLE 4

If $E \leq (9/8) \cdot 2^{(\lceil log_2 E \rceil - 1)}$ and $K/E < 9/16$
$\quad n_1 = \lceil log_2 E \rceil - 1$;
else
$\quad n_1 = \lceil log_2 E \rceil$;
end if
$R_{min} = 1/8$;
$n_2 = \lceil log_2(K / R_{min}) \rceil$;
$n = \max\{\min\{n_1, n_2, n_{max}\}, n_{min}\}$
where $n_{min} = 5$.

In Table 4, $n_{max}$ may be a value predetermined according to the type of a channel or control information and/or according to the number of information bits input to a channel coding block. For example, $n_{max}$ for a BCH may be predetermined as 9, $n_{max}$ for DCI may be predetermined as 9, and $n_{max}$ for UCI may be predetermined as 10.

In Table 4, E denotes a rate-matching output sequence length. The rate matching output sequence length E may be a value predetermined according to the type of a channel, according to the type of control information, according to the amount of resources to which the channel or the control information is mapped, and/or according to the number of code blocks used to transmit the control information. For example, the rate matching output sequence length for the BCH may be E=864, the rate matching output sequence length for the DCI may be E=864, the rate matching output sequence length E for the UCI may be a value predetermined through the number of OFDM symbols carrying the UCI, the number of RBs, a spreading factor, the number of code blocks for the UCI, and/or the type of the UCI included in a UCI payload (e.g., HARQ-ACK, a scheduling request (SR), channel state information (CSI), etc.

For any information block encoded to N bits, the same Polar sequence $Q_0^{N-1}=\{Q_0^N, Q_1^N, Q_2^N, \ldots, Q_{N-1}^N\}$ is used. The Polar sequence $Q_0^{N-1}$ is a subset of a Polar sequence $Q_0^{Nmax-1}$ with all elements $Q_i^{Nmax}$ of values less than N, ordered in ascending order of reliability $W(Q_0^N)<W(Q_1^N)<W(Q_2^N)<\ldots<W(Q_{N-1}^N)$.

In the NR system, under a specific condition, for example, when 18<=Polar code information size<=25, parity check bits for improving performance (e.g., block error rate (BLER)) in the case of using a Polar code are generated. Here, the Polar code information size K is the number of information bits encoded through Polar coding. For example, the total sum of code block+code block CRC bit(s) may be the Polar code information size.

In the NR standard, rate matching for polar codes is defined per code block and includes sub-block interleaving, bit collection, and bit interleaving. In the present disclosure, an input bit sequence to rate matching may be represented by $d_0, d_1, d_2, d_3, \ldots$, and $d_{N-1}$, and an output bit sequence after rate matching may be represented by $f_0, f_1, f_2, f_3, \ldots$, and $f_{E-1}$. Bits input to a sub-block interleaver are coded bits $d_0, d_1, d_2, d_3, \ldots$, and $d_{N-1}$. The coded bits $d_0, d_1, d_2, d_3, \ldots$, and $d_{N-1}$ may be divided into 32 sub-blocks. The bits output from the sub-block interleaver may be represented by $y_0, y_1, y_2, y_3, \ldots$, and $y_{N-1}$ and may be generated as follows: for n=to N−1: i=floor(32n/N); J(n)=P(i)*(N/32)+mod(n,N/32); $y_n=d_{J(n)}$. Here, the sub-block interleaver pattern P(i) is given by the following table.

TABLE 5

| i | P(i) |
| --- | --- |
| 0 | 0 |
| 1 | 1 |
| 2 | 2 |
| 3 | 4 |
| 4 | 3 |
| 5 | 5 |
| 6 | 6 |
| 7 | 7 |
| 8 | 8 |
| 9 | 16 |
| 10 | 9 |
| 11 | 17 |
| 12 | 10 |
| 13 | 18 |
| 14 | 11 |
| 15 | 19 |
| 16 | 12 |
| 17 | 20 |
| 18 | 13 |

TABLE 5-continued

| i | P(i) |
| --- | --- |
| 19 | 21 |
| 20 | 14 |
| 21 | 22 |
| 22 | 15 |
| 23 | 23 |
| 24 | 24 |
| 25 | 25 |
| 26 | 26 |
| 27 | 28 |
| 28 | 27 |
| 29 | 29 |
| 30 | 30 |
| 31 | 31 |

$G_N=(G_2)^{\otimes n}$ is an n-th Kronecker power of a matrix $G_2$, where $G_2$ is equal to the base matrix F illustrated in FIG. 6(b).

Puncturing or shortening is a scheme for not transmitting some of the encoded bits when the resources allocated for transmission are not large enough to accommodate all of the encoded bits. Repetition is a scheme for repeatedly transmitting some of the encoded bits when the resources allocated for transmission are large enough to accommodate the encoded bits.

A set of bit indices in the Polar sequence $Q_0^{N-1}$ is denoted as $\overline{Q}_I^N$ and a set of other bit indices in the Polar sequence $Q_0^{N-1}$ is denoted as $\overline{Q}_F^N$, where $|Q_I^N|=K+n_{PC}$, $|\overline{Q}_F^N|=\beta Q_F^N|$, and $n_{PC}$ is the number of parity check bits. In the present disclosure, |S| is the number of elements in a set S. $\overline{Q}_I^N$ and $\overline{Q}_F^N$ are given as follows.

TABLE 6

$\overline{Q}_{F,tmp}^N = \emptyset$
if E < N
  if K / E ≤ 7/16  -- puncturing
    for n = 0 to N − E − 1
      $\overline{QQ}_{F,tmp}^N = \overline{Q}_{F,tmp}^N \cup\{J(n)\}$;
    end for
    if E ≥ 3N/4
      $\overline{Q}_{F,tmp}^N = \overline{Q}_{F,tmp}^N \cup\{0,1,...,\lceil 3N/4-E/2\rceil -1\}$;
    else
      $\overline{Q}_{F,tmp}^N = \overline{Q}_{F,tmp}^N \cup\{0,1,...,\lceil 9N/16-E/4\rceil -1\}$;
    end if
  else  -- shortening
    for n = E to N − 1
      $\overline{Q}_{F,tmp}^N = \overline{Q}_{F,tmp}^N \cup\{J(n)\}$;
    end for
  end if
end if
$\overline{Q}_{I,tmp}^N = Q_0^{N-1}\backslash\overline{Q}_{F,tmp}^N$;
$\overline{Q}_I^N$ comprises (K + $n_{PC}$) most reliable bit indices in $\overline{Q}_{I,tmp}^N$;
$\overline{Q}_F^N = Q_0^{N-1}\backslash\overline{Q}_I^N$;

In the present disclosure, A\B denotes the difference of set B from set A, i.e., A-B, and is the set of elements of set A that are not in set B.

Figure 12:
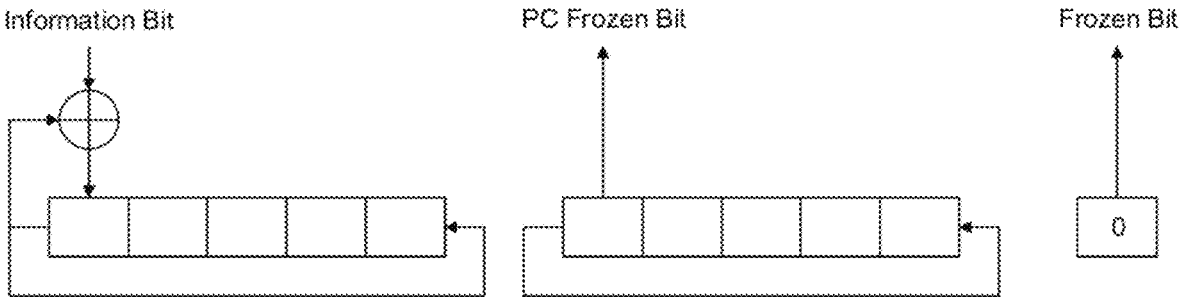
FIG. 12 illustrates a method of generating parity check bit(s) used in a polar code.

FIG. 12 illustrates a method of generating parity check bit(s) used in a polar code.

In some implementations, a parity check (PC) polar code, which is a polar code that arranges PC bits generated using a portion of a data block (i.e., information block) in an input of the polar encoder, may be used. In the NR standards published thus far, the PC polar code may be used when the data block size K is 18<=K<=25, the number of PC bits may be 3, and may be generated using a 5-bit shift register as shown in FIG. 12. In FIG. 12, 5-bit shift registers, y[0], . . . , [4], are all initialized to 0. That is, PC bit(s) may be generated for data block $[u_0, u_1, u_2, \ldots,$ and $u_{N-1}]$ as follows:

> cyclic left shift the register,
> If $u_i$ is an information bit, $y[0] = (u_i \text{ XOR } y[0])$ is set, and
> If $u_i$ is a PC bit, $u_i = y[0]$ is set.

The PC bit(s) generated as such are assigned to the input bit channels of the polar encoder (i.e., bit index of the polar code) as follows. Here, if E−K+3>192, $n^{wm}{}_{PC}$=1, and if E−K+3<=192, $n^{wm}{}_{PC}$=0. If a set of bit indices for parity check bits is denoted as $Q^N{}_{PC}$ and a set of bit indices for other parity check bits among $Q^N{}_{PC}$ is denoted as $Q^N{}_{PC\_wm}$, the size of the set $Q^N{}_{PC}$ is $|Q^N{}_{PC}|=n_{PC}$ and the size of the set $Q^N{}_{PC\_}$ is $|Q^N{}_{PC\_wm}|=n^{wm}{}_{PC}$. In the NR standard (e.g., 3GPP TS 38.212 Rel-15), a method of calculating $Q^N{}_{PC}$ and $Q^N{}_{PC\_wm\_}$is described as follows. For a bit index j where j=0, 1, . . . , N−1, the j-th row of $G_N$ is denoted as $g_j$ and the row weight of $g_j$ is denoted as $w(g_j)$, where $w(g_j)$ is the number of ones in $g_j$. A number of $(n_{PC}-n^{wm}{}_{PC})$ parity check bits are placed in $(n_{PC}-n^{wm}{}_{PC})$ least reliable bit indices in $\overline{Q}_I{}^N$. A number of $n^{wm}{}_{PC}$ other parity check bits are placed in bit indices of a minimum row weight in $\tilde{Q}_I{}^N$, where $\tilde{Q}_I{}^N$ denotes the $(|\overline{Q}_I{}^N|-n_{PC})$ most reliable bit indices in $\overline{Q}_I{}^N$. If there are more than $n^{wm}{}_{PC}$ bit indices of the same minimum row weight in $\tilde{Q}_I{}^N$, the $n^{wm}{}_{PC}$ other parity check bits are placed in the $n^{wm}{}_{PC}$ bit indices of the highest reliability and the minimum row weight in $\tilde{Q}_I{}^N$.

A polar sequence with a maximum length Nmax=1024 may not be used for channel coding for a large amount of information blocks, and is only used for channel coding for information blocks with a small number of input bits K, such as data of a broadcast channel (BCH) transmitted/received through a small physical broadcast channel (PBCH), downlink control information (PDCCH) transmitted/received through a physical downlink control channel (PDCCH), and uplink control information (UCI) transmitted/received through a physical uplink control channel (PUCCH) or a physical uplink shared channel (PUSCH).

As described above, the table <polar sequence> represents 1024 bit positions in ascending order of reliability to be considered when assigning information/frozen bit(s) to bit positions (i.e., bit channels) of a polar code with mother code size=1024. That is, an index of the most reliable bit channel (i.e., bit index) is 1023, which is located at the very end of the polar sequence, and an index of the worst bit channel is 0, which is located at the very beginning of the polar sequence. There are various methods for obtaining reliability orders for generating polar codes, and these methods may be broadly classified into two types. A first method is a method that compares the reliability of two bit channels from the characteristics of a polar encoder regardless of the characteristics of a transmission channel (i.e., a channel agnostic method), and a second method is a method that compares the reliability of bit channels by considering the characteristics of the transmission channel (i.e., a channel dependent method). Hereinafter, the channel agnostic and channel dependent methods for determining a polar code are briefly described.

Channel Agnostic Method for Polar Code Construction $W_1$ and $W_2$ may be uniform binary input channels, and a transmission system in which $X_1 \rightarrow Y_1$ through $W_1$ and $X_2 \rightarrow Y_2$ through $W_2$ may be assumed. In the transmission system, when there are probability distributions $p(y_1|y_2)$ satisfying a relationship $p(y_1|x)=\Sigma_{y_2}p(y_1|y_2)\,p(Y_2|x)$, $W_1$ is defined as stochastically degraded with respect to $W_2$ and is denoted as $W_1 \leq W_2$. When the relationship $W_1 \leq W_2$ is satisfied, $I(W_1)<=I(W_2)$, $P_e(W_1)>=P_e(W_2)$. That is, when information is transmitted through $W_2$, a low error rate or transmission of a larger amount of information may be obtained. Therefore, when the stochastic degradation relationship between bit channels of the polar code is obtained, the reliability order of the bit channels of the polar code may be obtained. The following are examples of methods of obtaining stochastic degradation relationships between bit channels. Binary representation of bit channels i and j is i=$(i_{n-1}, \ldots,$ and $i_0)$ and j=$(j_{n-1} \ldots,$ and $j_0)$.

Partial Order 1 (PO1)

When binary representation for bit channel j is to be obtained by swapping 1 in an upper position with 0 in a lower position in binary representation for bit channel i, bit channel j may be represented to be stochastically degraded with respect to bit channel i. For example, for a mother code size of 16, when a positions of the second 1 and the third 0 of '1100' are swapped, such as i=12=(1100) and j=10=(1010), the result is '1010'. Thus, 10 and 12 satisfy a relationship of $W_{16}{}^{(10)} \leq W_{16}{}^{(12)}$.

Partial Order 2 (PO2)

When bits at each position in the binary representation of bit channel i are greater than or equal to bits at each position in the binary representation of bit channel j, bit channel j may be expressed as being stochastically degraded with respect to bit channel i. For example, for mother code size 16, bits for each position of '1110' are greater than or equal to bits for each position of '1100' like i=14=(1110) and j=12=(1100). Thus, 12 and 14 satisfy a relationship of $W_{16}{}^{(12)} \leq \overline{W}_{16}{}^{(14)}$.

Combined Partial Order

The combined partial order is assumed as i>j for bit channels i and j and two sets P and M are defined as follows: P=$\{1<=k<=n|i_k=1$ and $j_k=0\}$, and M=$\{1<=k<=n|i_k=0$ and $j_k=1\}$. The number of elements of P and M is defined as p and m. In this case, when m=0, it may be expressed that bit channel j is stochastically degraded with respect to bit channel i by PO2. When a relationship of p>=m (m>0) and $P_1{}^m>M_1{}^m$ is satisfied, bit channel J may be expressed to stochastically degraded in bit channel i by PO1. Here, $P_1{}^m$ and $M_1{}^m$ are subsets containing the first to m-th elements of P and M, respectively, and $P_1{}^m>M_1{}^m$ means that the first to m-th elements of P are all greater than the first to m-th elements of M when compared (respectively).

General Partial Order (GPO)

GPO divides each of bit channels i and j into two parts, i=$(i_{Z_u}, i_{Z_l})$ and j=$(j_{Z_u},j_{Z_l})$. Here, $Z_u=\{n,n-1, \ldots, n-n_u+1\}$, $n_u=|Z_u|$, and $Z_l=\{n_l,n_l-1 \ldots, 1\}$, $n_1=|Z_1|$. In this case, if relationships of $W_{N_u}{}^{(i_u)} \geq W_{N_u}{}^{(j_u)}$ and $W_{N_l}{}^{(i_l)} \geq W_{N_l}{}^{(j_l)}$ are satisfied for new bit channels $i_{Z_u},j_{Z_u}$ and $i_{Z_l},j_{Z_l}$, then a relationship of $W_N{}^{(i)} \geq W_N{}^{(j)}$ is satisfied. In this case, various methods such as a channel agnostic method including PO1 and PO2 and/or a channel dependent method using a Battacharyya parameter may be used when whether $W_{N_u}{}^{(i_u)}$ and $W_{N_u}{}^{(j_u)}$ are stochastically degraded is determined, and a channel agnostic method such as PO1 and PO2 is used when whether $W_{N_l}{}^{(i_l)}$ and $W_{N_l}{}^{(j_l)}$ are stochastically degraded is determined.

When bit channels i and j are not to be expressed as being stochastically degraded using PO1, PO2, and GPO, if there exists a bit channel k satisfying relationships of $W_N{}^{(i)} \geq W_N{}^{(k)}$ and $W_N{}^{(k)} \geq W_N{}^{(f)}$, then a relationship $W_N{}^{(i)} \geq W_N{}^{(j)}$ is satisfied.

Channel Dependent Method for Polar Code Construction

The channel dependent method is a method of obtaining the reliability order of a bit channel by considering the characteristics of a transmitting channel. For example, assuming an AWGN channel, Gaussian approximation may be applied (see: P. Trifonov, "Efficient design and decoding of polar codes," IEEE Tr. COM, pp. 3221-3227, 2012), or assuming an erasure channel, a method of obtaining a reliability order of a bit channel by obtaining the Battacharyya parameter may be applied to construct a polar code (see: E. Arikan, "Channel polarization: a method for constructing capacity-achieving codes for symmetric binary memoryless channels," IEEE Tr. IT, pp. 3051-3073, 2009). The Battacharyya parameter may be obtained through recursive calculation using Equation 13 when an erasure probability is given.

However, when a size of a mother code increases, a limit of precision for expressing a value may cause problems in calculation. For convenience of explanation, Equation 13 is re-expressed as follows.

$$W_{2N}^{(2i-1)} = 2W_N^{(i)} - \left(W_N^{(i)}\right)^2 \qquad \text{[Equation 14]}$$

$$W_{2N}^{(2i)} = \left(W_N^{(i)}\right)^2$$

The maximum value of the mother code size of the polar code introduced in the NR-based communication system is 1024, as seen from <polar sequence> described above. This is because in current NR-based communication systems, polar codes are used only for transmitting control information. However, when polar codes are used to transmit user data (e.g., UL-SCH data or DL-SCH data), the payload size that the polar codes need to support may increase, and a polar code needs to be designed for a mother code size larger than the mother code size of 1024. In this case, when a polar code is constructed by applying the channel agnostic method or the channel dependent method described above, the following problems arise. When a channel agnostic method is used, there is a problem that PO1, PO2, and GPO relationships may not be derived for all combinations of bit channels. For example, when the mother code size is 16, bit channel 8=(1000) and bit channel 5=(0101) may not be expressed as one bit channel being probabilistically degraded in relation to another bit channel even if PO1, PO2, and GPO are used. When the channel dependent method, there may be limitations in using approximation functions.

Therefore, in the present disclosure, implementations are proposed to obtain the reliability order of bit channels for information/frozen bit(s) allocation when the mother code size is greater than 1024. Some implementations of the present disclosure for polar codes with mother code size greater than 1024 follow the following design principles.

>Principle 1: When the reliability order of bit channels is obtained, the reliability order specified in the existing NR standard (refer to Table <Polar Sequence> described above or Table 5.3.1.2-1 of 3GPP TS 38.212 Rel-15) up to mother code size 1024 may be followed.
>Principle 2: When the reliability order between two bit channels is obtained, the channel agnostic method is applied first, and when the reliability order may not be determined using the channel agnostic method, the channel dependent method is applied. When a polar code is determined using the channel dependent method, the performance of the polar code may be degraded if the channel used to determine the polar code is different from the channel experienced by the wireless signal during an actual communication process. Therefore, in some implementations of the present disclosure, the channel agnostic method which ensures optimal performance regardless of the channel may be first used. In some implementations of the present disclosure, when the channel dependent method is used, the reliability order of bit channels (i.e., bit indices) may be determined, for example, using the Battacharyya parameter.

The following table shows the Battacharyya parameter values calculated for mother code sizes N=16 and N=32 assuming an erasure probability of 0.01.

TABLE 7

| Bit index | N = 16 | Bit index | N = 32 |
|---|---|---|---|
| 0 | 0.814697981 | 0 | 0.965663162 |
| 1 | 0.324367599 | 1 | 0.6637328 |
| 2 | 0.222547287 | 2 | 0.543520859 |
| 3 | 0.013987133 | 3 | 0.105214339 |
| 4 | 0.136767225 | 4 | 0.395567279 |
| 5 | 0.005026355 | 5 | 0.049527295 |
| 6 | 0.002604722 | 6 | 0.027778626 |
| 7 | $1.69836*10^{-6}$ | 7 | 0.00019564 |
| 8 | 0.077255306 | 8 | 0.254829176 |
| 9 | 0.001552674 | 9 | 0.018705274 |
| 10 | 0.000791863 | 10 | 0.010027445 |
| 11 | $1.56824*10^{-7}$ | 11 | $2.52642*10^{-5}$ |
| 12 | 0.00039994 | 12 | 0.005202659 |
| 13 | $3.9996*10^{-8}$ | 13 | $6.78457*10^{-6}$ |
| 14 | $2*10^{-8}$ | 14 | $3.39671*10^{-6}$ |
| 15 | $1*10^{-16}$ | 15 | $2.88441*10^{-12}$ |
| | | 16 | 0.148542229 |
| | | 17 | 0.005968382 |
| | | 18 | 0.003102938 |
| | | 19 | $2.4108*10^{-6}$ |
| | | 20 | 0.001583099 |
| | | 21 | $6.27047*10^{-7}$ |
| | | 22 | $3.13648*10^{-7}$ |
| | | 23 | $2.45937*10^{-14}$ |
| | | 24 | 0.00079972 |
| | | 25 | $1.59952*10^{-7}$ |
| | | 26 | $7.9992*10^{-8}$ |
| | | 27 | $1.59968*10^{-15}$ |
| | | 28 | $4*10^{-8}$ |
| | | 29 | $4*10^{-16}$ |
| | | 30 | $2*10^{-16}$ |
| | | 31 | $1*10^{-32}$ |

In some implementations of the present disclosure, when the reliability order is determined using the Battacharyya parameter, computation may be performed in the log domain to resolve a numerical problem. For example, when a logarithmic function is applied to Equation 14, it may be expressed using the following equation.

$$\log W_{2N}^{(2i-1)} = \log\left(2W_N^{(i)} - \left(W_N^{(i)}\right)^2\right) = \log W_N^{(i)} + \log\left(2 - W_N^{(i)}\right) \qquad \text{[Equation 15]}$$

$$\log W_{2N}^{(2i)} = 2\log\left(W_N^{(i)}\right)$$

Here, Equation 15 may be expressed using the following Equation by substituting $Z_N^{(i)} = \log W_N^{(i)}$.

$$Z_{2N}^{(2i-1)} = Z_N^{(i)} + \log\left(2 - 10^{Z_N^{(i)}}\right) \qquad \text{[Equation 16]}$$

$$Z_{2N}^{(2i)} = 2Z_N^{(i)}$$

In the above equation, when $W_N^{(i)} << 1$, $\log(2-10^{Z_N^{(i)}}) \approx \log 2$ may be approximated, and thus the numerical problem may be resolved as follows.

$$Z_{2N}^{(2i-1)} = \begin{cases} Z_N^{(i)} + \log\left(2 - 10^{Z_N^{(i)}}\right) \\ Z_N^{(i)} + \log 2, \ W_N^{(i)} \ll 1 \end{cases}$$ [Equation 17]

$$Z_{2N}^{(2i)} = 2Z_N^{(i)}$$

In some implementations of the present disclosure, when $n=n_u+n_l$ is expressed in a mother code size of $2^n$, 2 may be used as a value corresponding to $n_l$ to obtain a reliability order using GPO. For example, when the mother code size is $2048=2^{11}$, which is to be expressed as $n=11=n_u+n_l=9+2$, in some implementations of the present disclosure, the reliability using GPO may be determined using $n_l=2$. Because when $n_l=2$, all combinations of bit channels may be expressed as PO1 or PO2. For example, for bit channels $0=(00)$, $1=(01)$, $2=(10)$, $3=(11)$, if $n_l=2$ is used, a stochastically degraded relationship may be determined for all combinations of the bit channels, as shown in the following table.

TABLE 8

| Bit index i | Bit index j | Relationship | Note |
|---|---|---|---|
| 0 = (00) | 1 = (01) | $W_4^{(1)} \geq W_4^{(0)}$ | PO1/PO2 |
| | 2 = (10) | $W_4^{(2)} \geq W_4^{(0)}$ | PO2 |
| | 3 = (11) | $W_4^{(3)} \geq W_4^{(0)}$ | PO2 |
| 1 = (01) | 2 = (10) | $W_4^{(2)} \geq W_4^{(1)}$ | PO1 |
| | 3 = (11) | $W_4^{(3)} \geq W_4^{(1)}$ | PO2 |
| 2 = (10) | 3 = (11) | $W_4^{(3)} \geq W_4^{(2)}$ | PO2 |

Assuming a size of an intended mother code $N_T=2^n$, $n_u=n-n_l$. In other words, in some implementation of the present disclosure, when the number of bit indexes of an upper part in the polar code in the polar code is $n_u<=10$ to use the most of the reliability order of the current NR standard, the reliability order defined in the current NR standard may be used to determine whether $W_{N_u}^{(i_u)}$ and $W_{N_u}^{(j_u)}$ are stochastically degraded. For $n>12$, in some implementations of the present disclosure, the following method may be applied.

>Method 1: $n_u=10$ is fixed and $n_l=n-n_u=n-10$ is used in determination. In this case, when whether $W_{N_l}^{(i_l)}$ and $W_{N_l}^{(j_l)}$ are stochastically degraded is determined, a combination that is not determined using PO1 and PO2 may occur.

>Method 2: $n_l=2$ is fixed and $n_u=n-n_l$ is used in determination. In this case, whether $W_{N_u}^{(i_u)}$ and $W_{N_u}^{(j_u)}$ are stochastically degraded may be determined using a reliability order of a mother code size $2^n_u$, which is less than the mother code size $N_T$ and greater than 1024.

Tables 9 and 10 show a procedure of obtaining a reliability order of a polar code of a target mother code size, i.e., a polar sequence of the target mother code size based on a reliability order of the polar code of the reference mother code size, i.e., a polar sequence of the reference mother code size. For example, when a reliability order for a mother code size N given, the reliability order for mother code sizes $N_T=2^{n0}*N$ bit channels (where n0>1) may be obtained according to Table 9 or Table 10. Table 9 shows an example of applying PO1, PO2, and GPO from among the channel agnostic methods, and Table 10 shows an example of applying PO1 and PO2 from among the channel agnostic methods.

TABLE 9

| 1: Initialize | $N_T$: target mother code size |
|---|---|
| | N: reference mother code size |
| | RO ={$R_{N-1},R_{N-2},...,R_0$}: Set of bit channel indexes arranged in the order of reliability for mother code size N |
| 2: | Set k=N and j=N−1 |
| 3: | $B_k$ and $B_{R_j}$: binary representation of k and $R_j$ |
| | If PO1, PO2, or GPO are applicable, use one of them |
| |   If $B_k \geq B_{R_j}$ |
| |     Update RO = {$R_{N_T-N+k},...,R_{j+1},k,R_j,...,R_0$} |
| |     Set j = $N_T$ − N + k |
| |     Increment k by 1 when k< $N_T$−1 |
| |     Go to step 3 |
| |   else |
| |     Increment j by 1 |
| |     Go to step 3 |
| |   else use Battacharyya parameter |
| |     If bit channel k is more reliable than bit channel $R_j$ |
| |       Update RO = {$R_{N_T-N+k},...,R_{j+1},k,R_j,...,R_0$} |
| |       Set j = $N_T$ − N + k |
| |       Increment k by 1 when k < $N_T$−1 |
| |       Go to step 3 |
| |     else |
| |     Increment j by 1 |
| |       Go to step 3 |
| 4: | RO={$R_{N_T-1},R_{N_T-2},...,R_0$}: Set of bit channel indexes arranged in the order of reliability for mother code size $N_T$ |

TABLE 10

| 1: Initialize | $N_T$: target mother code size |
|---|---|
| | N: reference mother code size |
| | RO ={$R_{N-1},R_{N-2},...,R_0$}: Set of bit channel indexes arranged in the order of reliability for mother code size N |
| 2: | Set k=N and j=N−1 |

TABLE 10-continued

| | |
|---|---|
| 3: | $B_k$ and $B_{R_j}$: binary representation of k and $R_j$<br>If PO1 or PO2 are applicable, use one of them<br>    If $B_k \geq B_{R_j}$<br>        Update RO = $\{R_{N_T-N+k},...,R_{j+1},k,R_j,...,R_0\}$<br>        Set j = $N_T - N + k$<br>        Increment k by 1 when k< $N_T-1$<br>      Go to step 3<br>    else<br>        Increment j by 1<br>        Go to step 3<br>    else use Battacharyya parameter<br>      If bit channel k is more reliable than bit channel $R_j$<br>        Update RO = $\{R_{N_T-N+k},...,R_{j+1},k,R_j,...,R_0\}$<br>        Set j = $N_T - N + k$<br>        Increment k by 1 when k < $N_T-1$<br>        Go to step 3<br>      else<br>    Increment j by 1<br>        Go to step 3 |
| 4: | RO=$\{R_{N_T-1},R_{N_T-2},...,R_0\}$: Set of bit channel indexes arranged in the<br>order of reliability for mother code size NT |

Figure 13:
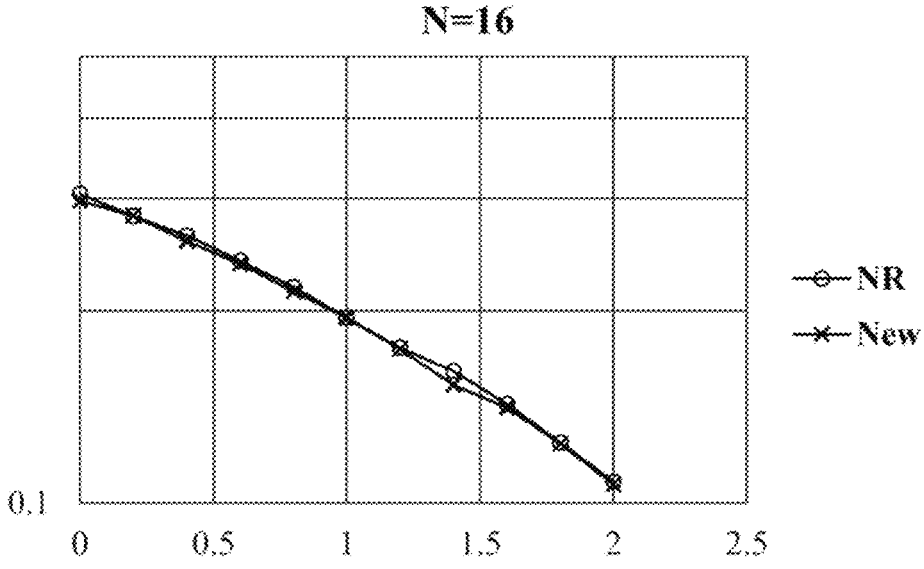
FIG. 13 illustrates the performance of a polar sequence specified in 3GPP TS 38.212 Rel-15 for mother code size $N=16$ and the performance of a polar sequence according to some implementations of the present disclosure.

The following table shows an example of a process of obtaining a reliability order of a target mother code size $N_T=16$ from reference mother code size N=8. In examples in the following table, the reliability order of the reference mother code size is the order defined in 3GPP TS 38.212 Rel-15 (refer to <Polar Sequence> described above), $n_u=n_j=2$ is assumed when a GPO relationship is obtained, and the erasure probability is assumed to be 0.01 when the Battachrayya parameter is calculated. In the following table, R(k)>R(j) indicates that the reliability of bit channel k is belier than that of bit channel j. For reference mother code size, RO=$\{7, 6, 5, 3, 4, 2, 1, 0\}$.

obtained when polar encoded bits are passed through an AWGN channel by using a polar sequence of the existing NR standard for N=16 with the performance obtained when polar encoded bits are passed through an AWGN channel by using a polar sequence obtained according to some implementations of the present specification. In the existing NR standard, bit channel 6 is more reliable than bit channel 9, but in some implementations of the present disclosure, considering that bit channel 9 is less reliable than bit channel 6, an information size of 8 at which performance difference may occur due to such reliability difference in an example of FIG. 13. In FIG. 13, "NR" indicates the performance of the

TABLE 11

| Bit index k | Bit index j | Reliability order | Note | Update RO |
|---|---|---|---|---|
| 8 = (1000) | 7 = (0111) | R(8) < R(7) | Battacharayya | $\{7, 6, 5, 3, 8, 4, 2,$ |
| | 6 = (0110) | R(8) < R(6) | Battacharayya | $1, 0\}$ |
| | 5 = (0101) | R(8) < R(5) | Battacharayya | |
| | 3 = (0011) | R(8) < R(3) | Battacharayya | |
| | 4 = (0100) | R(8) > R(4) | PO1 | |
| 9 = (1001) | 7 = (0111) | R(9) < R(7) | Battacharayya | $\{7, 9, 6, 5, 3, 8, 4, 2,$ |
| | 6 = (0110) | R(9) > R(6) | Battacharayya | $1, 0\}$ |
| 10 = (1010) | 7 = (0111) | R(10) < R(7) | Battacharayya | $\{7, 10, 9, 6, 5, 3, 8, 4,$ |
| | 9 = (1001) | R(10) > R(9) | PO1 | $2, 1, 0\}$ |
| 11 = (1011) | 7 = (0111) | R(11) > R(7) | PO1 | $\{11, 7, 10, 9, 6, 5, 3, 8,$<br>$4, 2, 1, 0\}$ |
| 12 = (1100) | 11 = (1011) | R(12) < R(11) | Battacharayya | $\{11, 7, 12, 10, 9, 6, 5, 3,$ |
| | 7 = (0111) | R(12) < R(7) | Battacharayya | $8, 4, 2, 1, 0\}$ |
| | 10 = (1010) | R(12) > R(10) | PO1 | |
| 13 = (1101) | 11 = (1011) | R(13) > R(11) | PO1 | $\{13, 11, 7, 12, 10, 9, 6, 5,$<br>$3, 8, 4, 2, 1, 0\}$ |
| 14 = (1110) | 13 = (1101) | R(14) > R(13) | PO1 | $\{14, 13, 11, 7, 12, 10, 9, 6,$<br>$5, 3, 8, 4, 2, 1, 0\}$ |
| 15 = (1111) | 14 = (1110) | R(15) > R(14) | PO1 | $\{15, 14, 13, 11, 7, 12, 10,$<br>$9, 6, 5, 3, 8, 4, 2, 1, 0\}$ |

As seen in Table above, the reliability order of the bit channel of mother code size 16 is $\{15, 14, 13, 11, 7, 12, 10, 9, 6, 5, 3, 8, 4, 2, 1, 0\}$. For reference, the reliability order of bit channels for mother code size 16 in the current NR standard (refer to 3GPP TS 38.212) is $\{15, 14, 13, 11, 7, 12, 10, 6, 9, 5, 3, 8, 4, 2, 1, 0\}$.

FIG. 13 illustrates the performance of a polar sequence specified in 3GPP TS 38.212 Rel-15 for mother code size N=16 and the performance of a polar sequence according to some implementations of the present disclosure. In other words, FIG. 13 shows a comparison of the performance reliability order according to the existing NR standard, and "New" indicates the performance of the reliability order according to some implementations of the present disclosure.

As another example, a reliability order of a target mother code size 32 is obtained from a reliability order of a mother code size 16 in the method of Table 9 and is $\{31, 30, 29, 27, 23, 15, 28, 26, 25, 22, 21, 19, 14, 13, 11, 7, 24, 20, 18, 12, 17, 10, 6, 9, 5, 3, 16, 8, 4, 2, 1, 0\}$. In this case, $n_u=3$, $n_j=2$ and erasure probability=0.01 are assumed. For reference, the reliability order of the bit channel of the existing NR standard with mother code size 32 is {31, 30, 29, 27, 23, 15, 28, 22, 25, 26, 21, 14, 13, 19, 11, 7, 24, 20, 12, 18, 10, 17, 6, 9, 5, 3, 16, 8, 4, 2, 1, 0}.

Figure 14:
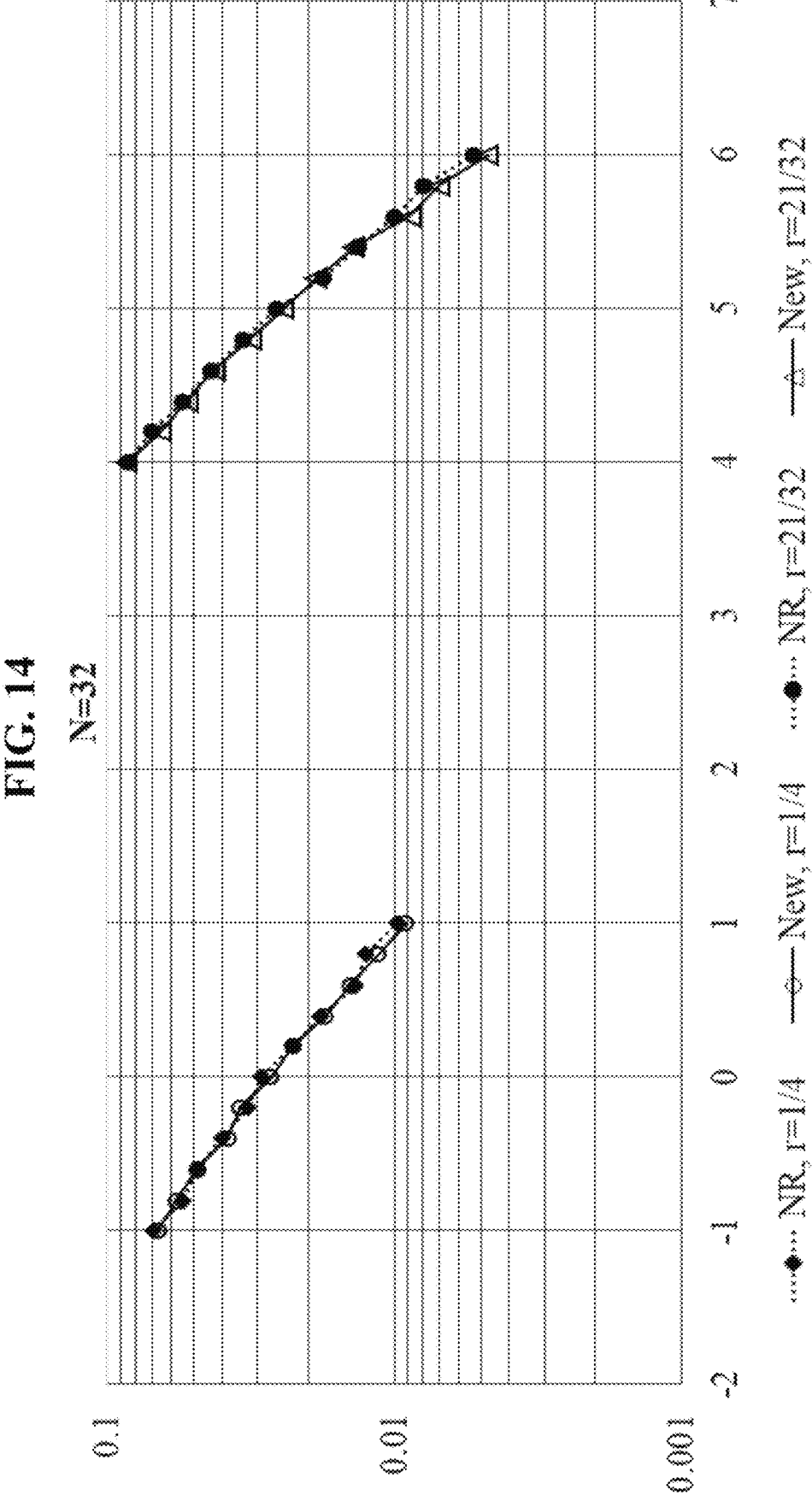
FIG. 14 illustrates the performance of a polar sequence specified in 3GPP TS 38.212 Rel-15 for mother code size $N=32$ and the performance of a polar sequence according to some implementations of the present disclosure.

FIG. 14 illustrates the performance of a polar sequence specified in 3GPP TS 38.212 Rel-15 for mother code size N=16 and the performance of a polar sequence according to some implementations of the present disclosure. In other words, FIG. 14 shows a comparison of the performance obtained when polar encoded bits are passed through an AWGN channel by using a polar sequence of the existing NR standard for N=32 with the performance obtained when polar encoded bits are passed through an AWGN channel by using a polar sequence obtained according to some implementations of the present specification. In this case, information sizes are assumed to be 8 and 21. In FIG. 13, "NR" represents the performance of a reliability order according to the existing NR standard, "New" represents the performance of a reliability order according to some implementations of the present disclosure, and "r" is a ratio of an information size K to a mother code size N, i.e., a code rate. For example, r=(information size)/(coded bit size), where the coded bit size may be equal to a mother code size.

As seen from FIGS. 13 and 14, there is no significant difference in performance between polar codes based on a polar sequence defined in the current standard and a polar code based on a reliability order of bit indices according to some implementations of the present disclosure. Therefore, the performance of the polar code may be maintained even if the reliability order of the polar code is determined according to some implementations of the present disclosure.

The following illustrates a reliability order of bit channels of mother code size N=4096, obtained according to some implementations of the present disclosure. The polar code may satisfy a nested structure. This is because, when the polar code is not the nested structure, a polar sequence needs to be defined by information size, which increases the memory requirement for polar encoding/decoding. Therefore, in some implementations of the present disclosure, the reliability order of a bit channel of mother code size N=2048 may be obtained by removing bit channels greater than or equal to 2048 from the following. A polar sequence of $N_{max}$=1024 defined in the existing NR standard may be obtained by removing the bit channels, i.e., bit indices, greater than or equal to 1024 in the following sequence.

$W_{4096}$={0, 1, 2, 4, 8, 16, 32, 3, 5, 64, 9, 6, 17, 10, 18, 128, 12, 33, 65, 20, 256, 34, 24, 36, 7, 129, 66, 512, 11, 40, 68, 130, 19, 13, 48, 14, 72, 257, 21, 132, 35, 258, 26, 513, 80, 37, 25, 22, 136, 260, 1024, 264, 38, 514, 96, 67, 41, 144, 28, 69, 42, 516, 49, 74, 272, 160, 520, 288, 528, 192, 544, 70, 44, 131, 81, 50, 73, 15, 2048, 320, 133, 52, 23, 134, 384, 76, 137, 82, 56, 27, 97, 39, 259, 84, 138, 145, 261, 1025, 29, 43, 98, 515, 88, 140, 30, 146, 71, 262, 1026, 1028, 1032, 265, 161, 576, 45, 100, 640, 51, 148, 46, 75, 266, 273, 517, 2049, 104, 1040, 1056, 162, 53, 193, 152, 77, 164, 768, 268, 274, 518, 2050, 2052, 2056, 54, 83, 57, 521, 112, 135, 78, 289, 194, 85, 276, 522, 58, 168, 2064, 139, 99, 86, 60, 280, 89, 290, 529, 524, 196, 141, 101, 147, 176, 142, 530, 321, 31, 200, 90, 545, 292, 322, 532, 263, 1027, 1029, 149, 102, 105, 304, 296, 1088, 2080, 1152, 2112, 2176, 163, 92, 47, 267, 385, 546, 324, 1280, 208, 1030, 386, 150, 153, 165, 106, 55, 328, 536, 1536, 577, 548, 113, 154, 79, 269, 108, 578, 224, 1033, 1034, 1041, 166, 519, 2051, 2053, 552, 195, 270, 641, 523, 275, 580, 291, 59, 169, 560, 114, 277, 156, 87, 197, 116, 170, 61, 531, 525, 642, 281, 278, 526, 177, 293, 388, 1036, 91, 584, 769, 198, 172, 120, 201, 336, 2054, 1042, 1044, 62, 282, 143, 103, 178, 294, 93, 644, 202, 592, 323, 392, 297, 770, 107, 180, 151, 209, 284, 648, 94, 204, 298, 400, 608, 352, 1057, 2057, 1058, 2058, 2060, 1048, 1060, 2304, 2560, 325, 533, 155, 210, 305, 547, 300, 109, 184, 1064, 534, 537, 115, 167, 225, 326, 306, 772, 157, 656, 329, 110, 117, 212, 171, 776, 330, 226, 549, 538, 387, 308, 216, 416, 2065, 1089, 1072, 271, 279, 158, 337, 550, 672, 118, 332, 579, 540, 389, 173, 121, 553, 199, 784, 179, 228, 338, 312, 704, 390, 174, 554, 581, 393, 283, 122, 448, 2066, 1090, 2081, 1153, 1092, 2068, 3072, 2082, 1154, 1096, 2072, 2113, 2084, 1281, 1156, 353, 561, 203, 63, 340, 1104, 2114, 2088, 1282, 394, 527, 582, 556, 181, 295, 285, 232, 124, 205, 182, 643, 562, 286, 585, 299, 354, 211, 401, 185, 396, 344, 586, 645, 593, 535, 240, 1120, 206, 95, 327, 564, 800, 402, 356, 1160, 2177, 2116, 2096, 1537, 307, 301, 417, 213, 568, 832, 588, 186, 646, 404, 2120, 1284, 227, 896, 1031, 1035, 1037, 1038, 1043, 1045, 1046, 594, 418, 302, 649, 771, 360, 1168, 2178, 1538, 2180, 1288, 2128, 1059, 1049, 539, 111, 331, 214, 309, 188, 449, 217, 408, 609, 596, 551, 650, 229, 159, 420, 310, 541, 773, 610, 657, 333, 119, 600, 339, 218, 368, 1050, 1061, 1052, 1184, 1216, 1062, 652, 230, 391, 313, 450, 542, 334, 233, 555, 774, 175, 123, 658, 612, 341, 777, 220, 314, 424, 1091, 1065, 395, 673, 583, 355, 287, 183, 234, 125, 557, 660, 616, 342, 316, 241, 778, 563, 345, 452, 397, 403, 207, 674, 558, 785, 432, 1066, 1068, 1540, 2184, 1296, 1544, 1312, 2144, 2192, 357, 187, 236, 664, 624, 587, 780, 705, 126, 242, 565, 398, 346, 456, 1093, 1073, 358, 405, 303, 569, 244, 595, 189, 566, 676, 361, 706, 589, 215, 786, 647, 348, 419, 406, 464, 1094, 1074, 1076, 1080, 680, 801, 362, 590, 409, 570, 788, 597, 572, 219, 311, 708, 598, 601, 651, 421, 792, 802, 611, 602, 410, 231, 688, 653, 248, 369, 190, 364, 654, 659, 335, 480, 1155, 1097, 1098, 1157, 1105, 1100, 1158, 1106, 1283, 1121, 1161, 1108, 1122, 1162, 1164, 1124, 1112, 315, 221, 370, 613, 422, 425, 451, 614, 543, 235, 412, 343, 372, 775, 317, 222, 426, 453, 237, 559, 833, 804, 1128, 712, 1285, 1169, 834, 661, 808, 779, 617, 604, 433, 720, 1286, 1170, 1172, 1552, 1344, 816, 836, 347, 897, 1176, 243, 662, 454, 318, 675, 618, 898, 781, 376, 428, 1136, 665, 736, 1289, 567, 840, 625, 238, 359, 457, 399, 787, 591, 678, 434, 677, 349, 245, 458, 666, 620, 363, 127, 191, 782, 407, 436, 626, 571, 465, 681, 246, 707, 350, 599, 668, 790, 460, 249, 682, 573, 411, 803, 789, 709, 365, 440, 628, 689, 374, 423, 466, 793, 250, 371, 481, 574, 413, 603, 366, 468, 655, 900, 805, 615, 684, 710, 429, 794, 252, 373, 605, 848, 690, 713, 632, 482, 806, 427, 904, 414, 223, 663, 692, 835, 619, 472, 455, 796, 809, 714, 721, 837, 716, 864, 810, 606, 912, 722, 696, 377, 435, 817, 319, 621, 812, 484, 430, 838, 667, 488, 239, 378, 459, 622, 627, 437, 380, 818, 461, 496, 669, 679, 724, 841, 629, 351, 467, 438, 737, 251, 462, 442, 441, 469, 247, 683, 842, 738, 899, 670, 783, 849, 820, 728, 928, 791, 367, 901, 630, 685, 844, 633, 711, 253, 691, 824, 902, 686, 740, 850, 375, 444, 470, 483, 415, 485, 905, 795, 473, 634, 744, 852, 960, 1039, 1047, 1051, 1053, 1185, 1290, 1217, 1054, 1186, 1292, 1568, 1188, 1218, 1192, 1600, 1408, 1539, 1220, 1200, 1224, 1232, 1063, 1067, 1069, 1541, 1297, 1070, 1542, 1298, 1545, 1313, 1300, 1546, 1314, 1304, 1316, 1320, 1548, 1664, 1095, 1075, 1077, 1078, 1099, 1081, 1082, 1101, 1084, 1102, 1159, 1107, 1109, 1110, 1123, 1163, 1165, 1125, 1113, 1114, 1116, 1328, 1248, 1166, 1126, 1287, 1171, 1173, 1553, 1345, 1129, 1130, 1137, 1132, 1174, 1554, 1346, 1348, 1556, 1352, 1360, 1177, 1138, 1291, 1140, 1144, 865, 693, 797, 906, 715, 807, 474, 636, 694, 254, 717, 575, 913, 798, 811, 379, 697, 431, 607, 489, 866, 723, 486, 908, 718, 813, 476, 856, 839, 725, 698, 914, 752, 1178, 1180, 868, 819, 814, 439, 929, 490, 623, 671, 739, 916, 463, 843, 381, 497, 930, 821, 726, 961, 872, 492, 631, 729, 700, 443, 741, 845, 920, 382, 822, 851, 730, 498, 880, 742, 445, 471, 635, 932, 687, 903, 825, 500, 846, 745, 826, 732, 446, 962, 936, 475, 853, 867, 637, 907, 487, 695, 746, 828, 753, 854, 857, 504, 799, 255, 964, 909, 719, 477, 915, 638, 748, 944, 869, 491, 699, 754, 858, 478, 968, 383, 910, 815, 976, 870, 917, 727, 493, 873, 701, 931, 756, 860, 499, 731, 823, 922, 874, 918, 502, 933, 743, 760, 881, 494, 702, 921, 501, 876, 847, 992, 1055, 1187, 1293, 1569, 1189, 1294, 1190, 1219, 1193, 1409, 1570, 1560, 1601, 1194, 1410, 1572, 1792, 2055, 2059, 2061, 2305, 2062, 2306, 2561, 2308, 2562, 2312, 2067, 2069, 2070, 2083, 2073, 2074, 2085, 2076, 2208, 3073, 2564, 2086, 2115, 2089, 2090, 2117, 2097, 2092, 2320, 2240, 3074, 2118, 2098, 2179, 2121, 2100, 2122, 2124, 2568, 2104, 2336, 3076, 2576, 2368, 3080, 2592, 2432, 2181, 2129, 2182, 2130, 2185, 2145, 2132, 2186, 2146, 2188, 2136, 2193, 2148, 3088, 2624, 3104, 2194, 2196, 2152, 2200, 2688, 2160, 1412, 1602, 1576, 1221, 1201, 1196, 1416, 1604, 1584, 1376, 1222, 1202, 1225, 1204, 1226, 1228, 1208, 1233, 1234, 1236, 1240, 1071, 1299, 1301, 1302, 1315, 1305, 1306, 1317, 1308, 1608, 1424, 1616, 1440, 1318, 1321, 1079, 1083, 1085, 1086, 1103, 1111, 1115, 1117, 1249, 1322, 1329, 1118, 1250, 1324, 1632, 1252, 1330, 1332, 1336, 1256, 1167, 1127, 1131, 1133, 1134, 1175, 1347, 1349, 1350, 1353, 1139, 1141, 1142, 1179, 1181, 1145, 1146, 1148, 1264, 1354, 1361, 1356, 1472, 1543, 1547, 1549, 1665, 1550, 1666, 1668, 1672, 1680, 1555, 1557, 1558, 1561, 1362, 1364, 1368, 1182, 1295, 1571, 1191, 1195, 1411, 1562, 1573, 1793, 1564, 1696, 1413, 1574, 1794, 1796, 1800, 1414, 1603, 1577, 1197, 1417, 1377, 1578, 1198, 1418, 1605, 1585, 1378, 1580, 1420, 1380, 1808, 1384, 1303, 1223, 1203, 1205, 1206, 1209, 447, 733, 827, 934, 882, 1307, 1227, 937, 963, 747, 505, 855, 924, 734, 829, 965, 938, 884, 1210, 1212, 1392, 506, 749, 945, 966, 755, 859, 940, 830, 911, 871, 639, 888, 1309, 1425, 1606, 1586, 1609, 1229, 1310, 1426, 1588, 1441, 1428, 1610, 1592, 1432, 1617, 1230, 1442, 1612, 1728, 1824, 1444, 1448, 1319, 1235, 1237, 1238, 1241, 479, 946, 1323, 750, 969, 508, 861, 757, 970, 919, 875, 862, 758, 948, 1242, 1244, 1456, 977, 923, 972, 761, 877, 952, 495, 703, 935, 978, 883, 762, 503, 925, 878, 735, 993, 885, 939, 994, 980, 926, 764, 941, 967, 886, 831, 947, 507, 889, 984, 751, 942, 996, 971, 890, 509, 949, 973, 1000, 892, 950, 863, 759, 1008, 1087, 1119, 1251, 1325, 1253, 1326, 1254, 1351, 1331, 1333, 1257, 1258, 1260, 1135, 1143, 1147, 1149, 1265, 1334, 1337, 1150, 1266, 1355, 1268, 1338, 1340, 1272, 1357, 1473, 1618, 1633, 1358, 1474, 1620, 1624, 1476, 1634, 1636, 1640, 1480, 1648, 1415, 1363, 1365, 1366, 1369, 1370, 1372, 1488, 1183, 1199, 1419, 1379, 1421, 1381, 1422, 1382, 1385, 1386, 1388, 1504, 1551, 1667, 1669, 1670, 1673, 1674, 1681, 1676, 1856, 1682, 1684, 1920, 2063, 2307, 2309, 2310, 2563, 2313, 2071, 2075, 2077, 2209, 2314, 2078, 2210, 2565, 2316, 2212, 3136, 2816, 2216, 2087, 2091, 2093, 2321, 2241, 2566, 2094, 2322, 2242, 3075, 2324, 2244, 2119, 2099, 2101, 2102, 2123, 2125, 2569, 2105, 2337, 2106, 2108, 2328, 2224, 2248, 2126, 2570, 2338, 3077, 2577, 2572, 2369, 2340, 2344, 2183, 2131, 2133, 2134, 2187, 2147, 2189, 2137, 2138, 2149, 2140, 2256, 3078, 2578, 2370, 2580, 2372, 3200, 2272, 3328, 3081, 2593, 2433, 2352, 3082, 2594, 2584, 3584, 2434, 2376, 3089, 2625, 2596, 3084, 2190, 2150, 2311, 2195, 2197, 2153, 2154, 2161, 2156, 2436, 2384, 3090, 2626, 2198, 2201, 2162, 2315, 2164, 2202, 2204, 2600, 3092, 2440, 2628, 2400, 3105, 2689, 2608, 2168, 1688, 1559, 1563, 1565, 1697, 1566, 1698, 1700, 1704, 1712, 1575, 1795, 1797, 1798, 1801, 1802, 1804, 1579, 1581, 1809, 1582, 1607, 1587, 1207, 1211, 1213, 1393, 1214, 1394, 1396, 1400, 1311, 1427, 1589, 1429, 1590, 1430, 1611, 1593, 1433, 1434, 1436, 1231, 1443, 1613, 1729, 1810, 1594, 1596, 1445, 1614, 1730, 1825, 1812, 1732, 1826, 1816, 1828, 1736, 1832, 1446, 1671, 1619, 1449, 1450, 1452, 1239, 1243, 1245, 1457, 510, 979, 953, 1246, 1458, 1460, 1464, 763, 974, 954, 879, 981, 982, 927, 995, 765, 956, 1327, 1255, 1259, 1261, 887, 985, 1262, 997, 986, 943, 891, 998, 766, 511, 988, 1335, 1001, 951, 1002, 893, 975, 894, 1009, 955, 1004, 1010, 957, 983, 958, 987, 1012, 999, 1016, 1151, 1267, 1269, 1270, 1339, 1341, 1273, 1274, 1276, 1342, 1359, 1475, 1621, 1477, 1622, 1625, 1478, 1675, 1635, 1677, 1857, 1481, 1626, 1637, 1482, 1628, 1744, 1840, 1484, 1367, 1371, 1373, 1489, 1678, 1858, 1860, 1638, 1641, 1374, 1490, 1683, 1492, 1496, 1685, 1423, 1383, 1387, 1389, 1505, 1642, 1390, 1506, 1644, 1760, 1921, 1799, 1649, 1508, 1686, 1922, 1650, 1652, 1656, 1512, 1689, 1520, 1690, 1692, 1864, 1924, 1872, 1567, 1803, 1699, 1701, 1805, 1702, 1806, 1705, 1706, 1708, 1713, 1714, 1716, 1928, 1888, 1720, 1583, 1811, 1591, 1431, 767, 989, 1003, 990, 1005, 959, 1011, 1013, 895, 1006, 1014, 1017, 1018, 991, 1020, 1007, 1015, 1019, 1021, 1022, 1215, 1395, 1397, 1398, 1595, 1435, 1437, 1597, 1401, 1402, 1404, 1438, 1598, 1615, 1731, 1813, 1733, 1814, 1734, 1827, 1817, 1737, 1818, 1829, 1738, 1820, 1740, 1936, 1952, 1447, 1451, 1453, 1454, 1623, 1247, 1479, 1459, 1461, 1462, 1627, 1465, 1466, 1468, 1263, 1271, 1275, 1277, 1278, 1343, 1483, 1629, 1745, 1830, 1833, 1485, 1630, 1746, 1748, 1752, 1486, 1679, 1859, 1639, 1375, 1491, 1493, 1497, 1494, 1643, 1498, 1500, 1391, 1507, 1645, 1761, 1834, 1861, 1509, 1646, 1762, 1836, 1841, 1764, 1862, 1842, 1844, 1984, 2079, 2211, 2317, 2213, 2318, 2214, 2217, 2218, 2220, 3096, 2632, 2448, 3106, 2690, 3108, 2692, 2095, 2323, 2243, 2325, 2245, 2103, 2107, 2109, 2225, 2326, 2246, 2329, 2110, 2226, 2249, 2228, 2330, 2250, 2332, 2640, 2464, 3137, 2817, 3112, 2252, 2696, 2232, 2656, 2496, 3138, 2818, 3140, 2567, 2127, 2571, 2339, 2573, 2341, 2135, 2139, 2141, 2257, 2574, 2342, 2345, 2142, 2258, 2579, 2371, 2273, 2260, 2346, 2274, 2348, 3120, 2820, 2276, 2264, 2581, 2373, 3201, 2353, 2582, 2374, 2354, 2356, 2360, 2280, 2595, 2585, 2435, 2377, 2288, 2586, 2378, 2597, 2380, 2704, 3202, 2824, 3144, 2588, 2720, 3329, 3204, 3152, 2191, 2151, 2155, 2157, 2437, 2385, 2598, 2158, 2438, 2386, 2627, 2388, 2832, 2392, 2199, 2163, 2165, 2166, 2203, 2205, 2601, 2441, 2401, 2169, 2170, 2172, 2206, 2602, 2442, 2629, 2402, 2609, 2404, 2604, 3168, 3208, 2444, 2408, 2752, 3330, 2319, 2215, 2219, 2221, 2449, 2630, 2610, 2633, 2222, 2450, 2691, 2612, 2452, 2456, 2327, 2247, 1848, 1768, 1776, 1510, 1687, 1923, 1651, 1653, 1513, 1514, 1516, 1521, 1654, 1657, 1522, 1691, 1524, 1658, 1660, 1528, 1693, 1865, 1694, 1866, 1925, 1868, 1873, 1926, 1874, 1876, 1880, 1703, 1807, 1707, 1709, 1710, 1815, 1735, 1715, 1717, 1929, 1889, 1718, 1930, 1890, 1932, 1892, 1896, 1819, 1721, 1722, 1724, 1904, 1399, 1403, 1279, 1405, 1406, 1439, 1455, 1463, 1467, 1407, 1469, 1470, 1487, 1495, 1499, 1471, 1501, 1502, 1511, 1515, 1503, 1517, 1518, 1523, 1519, 1525, 1526, 1527, 1529, 1530, 1531, 1023, 1532, 1533, 1534, 1599, 1739, 1821, 1741, 1937, 1822, 1742, 1938, 1940, 1953, 1944, 1954, 1956, 1831, 1631, 1747, 1749, 1750, 1835, 1753, 1754, 1756, 1960, 1647, 1763, 1837, 1765, 1838, 1769, 1766, 1863, 1843, 1845, 1985, 1770, 1772, 1777, 1846, 1986, 1849, 1778, 1780, 1850, 1852, 1988, 1968, 1992, 1784, 1655, 1659, 1661, 1662, 1695, 1867, 1869, 1870, 1927, 1875, 1877, 1878, 1881, 1882, 1884, 2000, 1711, 1719, 1931, 1891, 1933, 1893, 1934, 1894, 1897, 1898, 1900, 1723, 1663, 1725, 1905, 1726, 1906, 1908, 1912, 1743, 1751, 1755, 1727, 1757, 1758, 1767, 1771, 1759, 1773, 1774, 1779, 1775,
1781, 1782, 1783, 1785, 1786, 1787, 1535, 1788, 1789,
1790, 1823, 1939, 1941, 1942, 1945, 1955, 1946, 1948,
2016, 2111, 2227, 2229, 2230, 2331, 2251, 2333, 2465,
2616, 2253, 2233, 2234, 2236, 2416, 2634, 2693, 2641,
2334, 2466, 2636, 2848, 3585, 2497, 2468, 2694, 2642,
2472, 2697, 2657, 2254, 2498, 2819, 2644, 2880, 2648,
2343, 2143, 2259, 2261, 2262, 2347, 2275, 2349, 2277,
2265, 2266, 2268, 2500, 2350, 2278, 2375, 2355, 2357,
2281, 2282, 2284, 2289, 2358, 2361, 2290, 2379, 2292,
2362, 2364, 2480, 2698, 2658, 2700, 2660, 2944, 3079,
3083, 3085, 3086, 3091, 3093, 3094, 3107, 3097, 3098,
3109, 3100, 3332, 3216, 3586, 3336, 3232, 3110, 3139,
3113, 3114, 3116, 3264, 3344, 3588, 3592, 2664, 2504,
3141, 3121, 2821, 2296, 2381, 2705, 2382, 2159, 2439,
2387, 2389, 2390, 2393, 2394, 2396, 2672, 2512, 3142,
3122, 2822, 2706, 3124, 3360, 2708, 2712, 2167, 2171,
2173, 2174, 2207, 2443, 2403, 2405, 2445, 2406, 2446,
2409, 2410, 2412, 2223, 2451, 2453, 2231, 2235, 2237,
2417, 2454, 2457, 2238, 2418, 2420, 2458, 2460, 2528,
2825, 3145, 2575, 2583, 3203, 2587, 2589, 2721, 3128,
2826, 3146, 2590, 2722, 3205, 3153, 3148, 2833, 2724,
2828, 2728, 2599, 2603, 2605, 2753, 3206, 3154, 2834,
3169, 3209, 2606, 2754, 3331, 3156, 2836, 2756, 2631,
2611, 2613, 2614, 2635, 2617, 2424, 2335, 2467, 2618,
2637, 2849, 3160, 2620, 2736, 3170, 3210, 2840, 2760,
2469, 2638, 2850, 3212, 3172, 3600, 2852, 2470, 2695,
2643, 2473, 2474, 2476, 2255, 2499, 2645, 2881, 3176,
2263, 2267, 2269, 2501, 2270, 2351, 2279, 2283, 2285,
2286, 2359, 2291, 2293, 2294, 2363, 2365, 2481, 2646,
2649, 2502, 2297, 2298, 2300, 2366, 2482, 2699, 2659,
2505, 2484, 2650, 2506, 2652, 2768, 2882, 3184, 2856,
2884, 2864, 2888, 2784, 2488, 2701, 2661, 2945, 2508,
2383, 2391, 2395, 2397, 2513, 2702, 2662, 2946, 2665,
2398, 2514, 2823, 2707, 2516, 2520, 2709, 2407, 2447,
2411, 2413, 2414, 2455, 1957, 1958, 1961, 1962, 1964,
1839, 1847, 1987, 1851, 1853, 1989, 1969, 1854, 1990,
1970, 1972, 1993, 1976, 1994, 1996, 1871, 1879, 1883,
1855, 1885, 2001, 1886, 2002, 2004, 2008, 1895, 1899,
1887, 1901, 1902, 1907, 1903, 1909, 1910, 1911, 1913,
1914, 1915, 1791, 1916, 1917, 1918, 1935, 1943, 1947,
1949, 2017, 1950, 2018, 2020, 2024, 2032, 1959, 1963,
1951, 1965, 1966, 1971, 1967, 1973, 1974, 1975, 1977,
1978, 1979, 1919, 1980, 1981, 1982, 1991, 1995, 1997,
1998, 2003, 1999, 2005, 2009, 2006, 2010, 2007, 2011,
1983, 2012, 2013, 2014, 2019, 2021, 2022, 2023, 2025,
2026, 2027, 2015, 2028, 2033, 2029, 2034, 2030, 2035,
2031, 2036, 2037, 2038, 2039, 2040, 2041, 2042, 2043,
2044, 2045, 2046, 2175, 2239, 2419, 2421, 2422, 2459,
2461, 2529, 2666, 2425, 2426, 2428, 2462, 2530, 2668,
2673, 2532, 2710, 2674, 2676, 2680, 2536, 2827, 2713,
2544, 2714, 2716, 2896, 2948, 2591, 2723, 2725, 2829,
2726, 2830, 2835, 2729, 2730, 2732, 2952, 2912, 2607,
2755, 2837, 2757, 2615, 2619, 2621, 2737, 2838, 2758,
2622, 2738, 2841, 2761, 2740, 2842, 2762, 2844, 2764,
2744, 2960, 2976, 2639, 2851, 2853, 2471, 2475, 2477,
2478, 2647, 2271, 2503, 2287, 2295, 2299, 2301, 2302,
2367, 2483, 2485, 2486, 2651, 2507, 2653, 2769, 2854,
2489, 2490, 2509, 2492, 2654, 2770, 2883, 2857, 2772,
2785, 2858, 2776, 2885, 2786, 2860, 2865, 2788, 2886,
2866, 2868, 2872, 2792, 2889, 2510, 2703, 2663, 2947,
2399, 2515, 2517, 2518, 2667, 2521, 2522, 2524, 2415,
2423, 2427, 2303, 2429, 2430, 2463, 2531, 2669, 2533,
2670, 2534, 2711, 2675, 2677, 2537, 2538, 2540, 2545,
2678, 2681, 2546, 2715, 2548, 2682, 2684, 2800, 2890,
2892, 2552, 2717, 2897, 2949, 2718, 2898, 2950, 2900,
3008, 3087, 3095, 3099, 3101, 3333, 3217, 3102, 3334, 3218, 3337, 3233, 3220, 3392, 3338, 3234, 3224, 3616,
3340, 3236, 3240, 3248, 3111, 3115, 3117, 3265, 3345,
3118, 3266, 3346, 3348, 3456, 3648, 3587, 3589, 3590,
3593, 3268, 3352, 3272, 3143, 3123, 3125, 3361, 3594,
3126, 3362, 3364, 3368, 3596, 3147, 3149, 3129, 3130,
3132, 3280, 3150, 3207, 3155, 3157, 3161, 3158, 3171,
3211, 3162, 3213, 3173, 3601, 3164, 3376, 3296, 3214,
3174, 3177, 3178, 3180, 3185, 3186, 3188, 3192, 2904,
2727, 2831, 2731, 2733, 2953, 2913, 2734, 2954, 2914,
2956, 2916, 2920, 2839, 2759, 2479, 2487, 2491, 2431,
2493, 2494, 2511, 2519, 2523, 2495, 2525, 2526, 2535,
2539, 2527, 2541, 2542, 2547, 2543, 2549, 2550, 2551,
2553, 2554, 2555, 2556, 2557, 2558, 2623, 2739, 2741,
2742, 2843, 2763, 2845, 2765, 2745, 2961, 2746, 2748,
2928, 2846, 2766, 2962, 2964, 2977, 2968, 2978, 2980,
2855, 2655, 2771, 2773, 2774, 2859, 2777, 2787, 2861,
2778, 2780, 2984, 2789, 2862, 2790, 2887, 2867, 2869,
2793, 2794, 2796, 2671, 2679, 2683, 2685, 2801, 2870,
2873, 2686, 2802, 2891, 2804, 2874, 2876, 2992, 2808,
2893, 2894, 2719, 2899, 2951, 2901, 3009, 2902, 3010,
3012, 3016, 2905, 2906, 2908, 3024, 2735, 2955, 2915,
2957, 2917, 2958, 2918, 2921, 2922, 2924, 2743, 2747,
2687, 2749, 2929, 2750, 2930, 2932, 2936, 2767, 2775,
2779, 2751, 2781, 2782, 2791, 2795, 2783, 2797, 2798,
2803, 2799, 2805, 2806, 2807, 2809, 2810, 2811, 2559,
2812, 2813, 2814, 2847, 2963, 2965, 2966, 2969, 2979,
2970, 2972, 3040, 3103, 3335, 3219, 3221, 3393, 3602,
3222, 3394, 3396, 3712, 3604, 3400, 3408, 3339, 3235,
3225, 3617, 3226, 3341, 3237, 3228, 3342, 3238, 3241,
3242, 3244, 3249, 3250, 3252, 3424, 3256, 3119, 3267,
3347, 3349, 3457, 3618, 3608, 3269, 3350, 3458, 3649,
3620, 3840, 3460, 3650, 3624, 3652, 3464, 3632, 3270,
3353, 3273, 3354, 3274, 3356, 3656, 3472, 3276, 3664,
3127, 3363, 3365, 3131, 3133, 3281, 3366, 3369, 3134,
3282, 3284, 3288, 3151, 3159, 3163, 3165, 3297, 3370,
3166, 3298, 3372, 3488, 3377, 3300, 3378, 3380, 3680,
3384, 3304, 3312, 3215, 3175, 3179, 3181, 3182, 3223,
3395, 3397, 3398, 3401, 3402, 3404, 3520, 3591, 3595,
3597, 3713, 3598, 3714, 3716, 3720, 3728, 3603, 3605,
3606, 3609, 3409, 3410, 3412, 3416, 3187, 3189, 3190,
3227, 3619, 3229, 3193, 3194, 3196, 3230, 3343, 3239,
3243, 3245, 3246, 3351, 3459, 3610, 3621, 3841, 3612,
3744, 3461, 3622, 3842, 3844, 3848, 3462, 3651, 3625,
3465, 3271, 3251, 3253, 3425, 3626, 3653, 3466, 3254,
3426, 3468, 3628, 3633, 3428, 3856, 3432, 3355, 3275,
3357, 3473, 3654, 3634, 3657, 3277, 3257, 3258, 3260,
3440, 2981, 3358, 3474, 3636, 3476, 3480, 3278, 2982,
3367, 2985, 2986, 2988, 2863, 2871, 2875, 2877, 2993,
2878, 2994, 2996, 3000, 2895, 2903, 3011, 3013, 3014,
3017, 3018, 3020, 2907, 2879, 2909, 3025, 2910, 3026,
3028, 3032, 2919, 2923, 2911, 2925, 2926, 2931, 2927,
2933, 2934, 2935, 2937, 2938, 2939, 2815, 2940, 2941,
2942, 2959, 2967, 2971, 2973, 3041, 2974, 3042, 3044,
3048, 3056, 2983, 2987, 2975, 2989, 2990, 2995, 2991,
2997, 2998, 2999, 3001, 3002, 3003, 2943, 3004, 3005,
3006, 3015, 3019, 3021, 3022, 3027, 3023, 3029, 3030,
3031, 3033, 3034, 3035, 3007, 3036, 3037, 3038, 3043,
3045, 3046, 3047, 3049, 3050, 3051, 3039, 3052, 3057,
3053, 3058, 3054, 3059, 3055, 3060, 3061, 3062, 3063,
3064, 3065, 3066, 3067, 2047, 3068, 3069, 3070, 3135,
3283, 3285, 3286, 3371, 3289, 3290, 3292, 3167, 3299,
3373, 3489, 3658, 3640, 3301, 3374, 3490, 3660, 3776,
3872, 3904, 3665, 3492, 3496, 3504, 3302, 3399, 3379,
3381, 3305, 3306, 3308, 3313, 3382, 3385, 3314, 3403,
3316, 3386, 3388, 3320, 3405, 3521, 3666, 3406, 3522,
3668, 3681, 3672, 3524, 3682, 3684, 3688, 3528, 3183,
3411, 3463, 3413, 3414, 3417, 3418, 3420, 3696, 3536, 3191, 3195, 3197, 3198, 3231, 3247, 3467, 3255, 3427,
3469, 3429, 3470, 3430, 3433, 3434, 3436, 3259, 3199,
3261, 3441, 3262, 3442, 3444, 3448, 3279, 3287, 3291,
3263, 3293, 3294, 3303, 3307, 3295, 3309, 3310, 3315,
3311, 3317, 3318, 3319, 3321, 3322, 3323, 3324, 3325,
3326, 3359, 3475, 3477, 3478, 3481, 3482, 3484, 3552,
3599, 3715, 3717, 3718, 3721, 3722, 3724, 3729, 3730,
3732, 3968, 3736, 3607, 3611, 3613, 3745, 3614, 3746,
3748, 3752, 3760, 3623, 3843, 3845, 3846, 3849, 3850,
3627, 3629, 3630, 3655, 3635, 3637, 3638, 3659, 3641,
3375, 3491, 3661, 3777, 3852, 3857, 3858, 3642, 3644,
3493, 3662, 3778, 3860, 3780, 3873, 3864, 3784, 3874,
3876, 3880, 3494, 3719, 3667, 3497, 3498, 3500, 3505,
3506, 3508, 3512, 3383, 3387, 3389, 3390, 3407, 3523,
3669, 3525, 3670, 3673, 3526, 3723, 3683, 3725, 3529,
3674, 3530, 3676, 3792, 3905, 3685, 3532, 3689, 3415,
3419, 3391, 3421, 3537, 3726, 3686, 3422, 3538, 3731,
3540, 3544, 3431, 3435, 3423, 3437, 3438, 3443, 3439,
3445, 3446, 3447, 3449, 3450, 3451, 3327, 3452, 3453,
3454, 3471, 3479, 3483, 3485, 3553, 3690, 3733, 3486,
3554, 3692, 3888, 3808, 3906, 3908, 3969, 3847, 3697,
3556, 3734, 3698, 3700, 3704, 3560, 3737, 3568, 3738,
3740, 3912, 3970, 3972, 3495, 3499, 3487, 3501, 3502,
3507, 3503, 3509, 3510, 3511, 3513, 3514, 3515, 3455,
3516, 3517, 3518, 3527, 3531, 3533, 3534, 3539, 3535,
3541, 3542, 3543, 3545, 3546, 3547, 3519, 3548, 3549,
3550, 3555, 3557, 3558, 3559, 3561, 3562, 3563, 3551,
3564, 3569, 3565, 3570, 3566, 3571, 3567, 3572, 3573,
3574, 3575, 3576, 3577, 3578, 3579, 3071, 3580, 3581,
3582, 3615, 3851, 3747, 3749, 3853, 3750, 3854, 3753,
3754, 3756, 3976, 3920, 3761, 3762, 3764, 3768, 3631,
3859, 3639, 3643, 3645, 3646, 3663, 3779, 3861, 3781,
3862, 3782, 3865, 3785, 3875, 3866, 3786, 3788, 3671,
3675, 3647, 3677, 3793, 3868, 3936, 3984, 3877, 3878,
3678, 3794, 3796, 3881, 3800, 3687, 3691, 3679, 3693,
3809, 3907, 3882, 3694, 3810, 3884, 3812, 3909, 3889,
3816, 3910, 3890, 3892, 4000, 4032, 3896, 3699, 3695,
3701, 3702, 3703, 3705, 3706, 3707, 3708, 3824, 3709,
3710, 3727, 3735, 3739, 3741, 3913, 3971, 3742, 3914,
3916, 3973, 3751, 3755, 3743, 3757, 3921, 3974, 3758,
3922, 3924, 3977, 3928, 3763, 3759, 3765, 3766, 3767,
3769, 3770, 3771, 3711, 3772, 3773, 3774, 3783, 3787,
3789, 3790, 3795, 3791, 3797, 3798, 3799, 3801, 3802,
3803, 3775, 3804, 3805, 3806, 3811, 3813, 3814, 3815,
3817, 3818, 3819, 3807, 3820, 3825, 3821, 3826, 3822,
3827, 3823, 3828, 3829, 3830, 3831, 3832, 3833, 3834,
3835, 3836, 3837, 3838, 3855, 3863, 3867, 3869, 3937,
3978, 3870, 3938, 3980, 3940, 3985, 3944, 3986, 3988,
3992, 3952, 3879, 3883, 3871, 3885, 3886, 3891, 3887,
3893, 4001, 3894, 4002, 4004, 4033, 4008, 4034, 3895,
3897, 3898, 3899, 3900, 4036, 4016, 4040, 3901, 3902,
3911, 3915, 3917, 3918, 3923, 3919, 3925, 3926, 3927,
3929, 3930, 3931, 3903, 3932, 3933, 3934, 3939, 3941,
3942, 3943, 3945, 3946, 3947, 3935, 3948, 4048, 3953,
3949, 3954, 3950, 3955, 3951, 3956, 3957, 3958, 3959,
3960, 3961, 3962, 3963, 3583, 3839, 3964, 3965, 3966,
3975, 3979, 3981, 3982, 3987, 3983, 3989, 3990, 3991,
3993, 3994, 3995, 3996, 4064, 3997, 3998, 4003, 4005,
4006, 4007, 4009, 4010, 4011, 3999, 4012, 4017, 4013,
4018, 4014, 4019, 4015, 4020, 4021, 4022, 4023, 4024,
4025, 4026, 4027, 3967, 4028, 4029, 4030, 4035, 4037,
4038, 4039, 4041, 4042, 4043, 4044, 4049, 4045, 4050,
4046, 4051, 4047, 4052, 4053, 4054, 4055, 4056, 4057,
4058, 4059, 4031, 4060, 4065, 4061, 4066, 4062, 4067,
4068, 4069, 4070, 4071, 4072, 4073, 4074, 4075, 4080, 4063, 4076, 4081, 4077, 4082, 4078, 4083, 4079, 4084,
4085, 4086, 4087, 4088, 4089, 4090, 4091, 4092, 4093,
4094, 4095}

The exemplified $W_{4096}$ is only an example, and a different sequence than the exemplified $W_{4096}$ may be obtained when values of $n_u$ used in GPO, algorithms used in the channel dependent manner (e.g., when an algorithm other than the Battacharyya parameter is used), and/or parameter value(s) of the algorithm used in the channel dependent method (e.g., erasure probability) are different. However, regardless of whether GPO is used, a value of $n_u$ for GPO, or an algorithm in a channel dependent method, in some implementations of the present disclosure, partial order, in particular, the bit indices for which the PO1 and PO2 relations are to be evaluated from among the bit channels (i.e., bit indices) from 1024 to N−1 in a polar sequence of size N may satisfy $W(Q^N_x) < W(Q^N_y)$ for $Q^N_x < Q^N_y$. For example, in some implementations of the present disclosure, a reliability order of bit channels of a polar code with N>1024, i.e., a reliability order among bit channels 0 to 1023 (i.e., bit indices 0 to 1023) in a polar sequence with N>1024, may be identical to a reliability order of bit channels 0 to 1023 of a predefined polar sequence for $N_{max}=1024$ (e.g., a polar sequence according to some implementations of the present disclosure include a polar sequence with $N_{max}=1024$ specified in 38.2123 Rel-15 as a nested structure, i.e., a predefined polar sequence with $N_{max}=1024$ may be a subset of a polar sequence $Q^{N-1}_0$ with N>1024 according to some implementations of the present specification), and the bit indices for which a partial order is to be evaluated from among bit indices greater than or equal to 1024 may satisfy $W(Q^N_x) < W(Q^N_y)$ for $Q^N_x < Q^N_y$.

Figure 15:
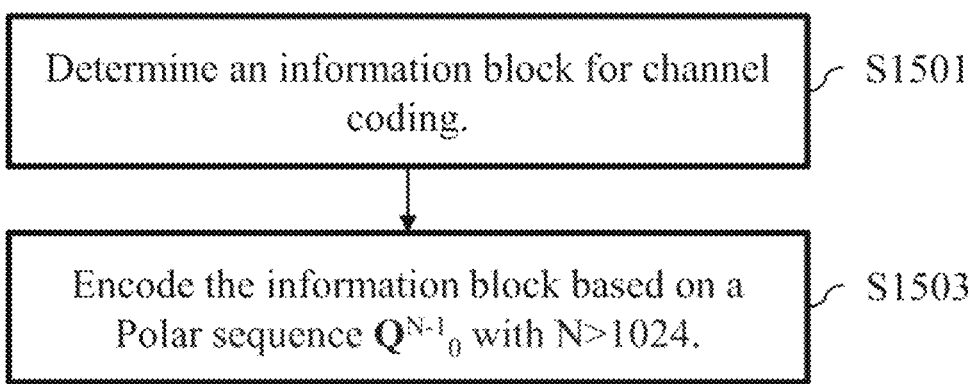
FIG. 15 illustrates an encoding process of an information block according to some implementations of the present disclosure.

FIG. 15 illustrates an encoding process of an information block according to some implementations of the present disclosure. In FIG. 15, the information block may be TB+CRC or CB+CRC.

A communications device or an encoder may perform operations according to some implementations of the present disclosure in relation to channel decoding. The communication device may include at least one transceiver, at least one processor, and at least one computer memory operably connected to the at least one processor and configured to store instructions that, when executed, cause the at least one processor to perform operations according to some implementations of the present disclosure. The communication device or a processing an encoder may include at least one transceiver, at least one processor, and at least one computer memory operably connected to the at least one processor and configured to store instructions that, when executed, cause the at least one processor to perform operations according to some implementations of the present disclosure. A computer-readable (non-volatile) storage medium may store at least one computer program including instructions that, when executed by at least one processor, cause the at least one processor to perform operations according to some implementations of the present disclosure. A computer program or a computer program product may be recorded on at least one computer-readable (non-volatile) storage medium and may include instructions that, when executed, cause (at least one processor) to perform operations according to some implementations of the present disclosure. In the communication device, the decoder, the processing device, the computer-readable (non-volatile) storage medium, and/or the computer program product, the operations may include determining a bit sequence input to channel coding, i.e., an information block (S1501), and generating N encoding bits by encoding the information block based on a polar sequence $Q^{N-1}_0 = \{Q_0, Q_1, \ldots, Q_{N-1}\}$ with N>1024 according to some implementations of the present disclosure by the communication or the polar encoder (S1503). Here, $0 <= Q^N_i <= N-1$ is a bit index for position i=0, 1, . . . , and N−1 in the polar sequence $Q^{N-1}_0$, and the polar sequence $Q^{N-1}_0$ is defined in ascending order of reliability $W(Q^N_0) < W(Q^N_1) < \ldots < W(Q^N_{N-1})$, where $W(Q^N_i)$ is the reliability of bit index $Q^N_i$. That is, $W(Q^N_i)$ is the reliability of a bit index $Q^N_i$ in the i-th (here, i=0, 1, . . . , and N−1) in a polar sequence $Q^{N-1}_0$, and the polar sequence $Q^{N-1}_0$ is defined in ascending order of reliability, and thus the reliability of the bit index $Q^N_i$ may mean the i-th (here, i=0, 1, . . . , and N−1) from among the N bit indices of the polar code. The operations may further include transmitting all or some of the encoded bits to another communication device or a peer decoder. The operations may include determining all or some of the encoded bits to be transmitted over the physical channel through rate matching for the N encoded bits. The operations may include transmitting all or some of the encoded bits to the other communication device or the peer decoder through a data channel. In some implementations, the data channel may be a PUSCH. In some implementations, the data channel may be a PDSCH.

Figure 16:
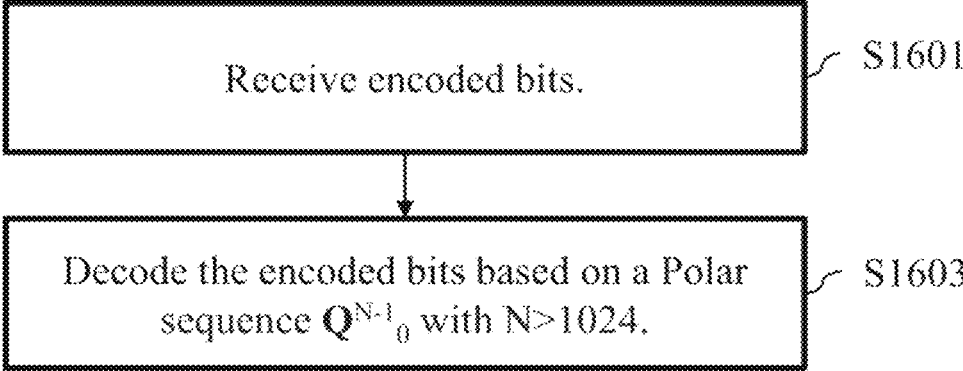
FIG. 16 shows an example of a decoding process of encoded bits according to some implementations of the present disclosure.

FIG. 16 shows an example of a decoding process of encoded bits according to some implementations of the present disclosure.

A communication device or decoder may perform operations according to some implementations of the present disclosure. The communication device may include: at least one transceiver; at least one processor; and at least one computer memory operably connected to the at least one processor and configured to store instructions that, when executed, cause the at least one processor to perform the operations according to some implementations of the present disclosure. The communication device or a processing device for the decoder may include: at least one processor; and at least one computer memory operably connected to the at least one processor and configured to store instructions that, when executed, cause the at least one processor to perform the operations according to some implementations of the present disclosure. A computer-readable (non-transitory) storage medium may store at least one computer program including instructions that, when executed by at least one processor, cause the at least one processor to perform the operations according to some implementations of the present disclosure. A computer program or computer program product may include instructions stored on at least one computer-readable (non-volatile) storage medium and, when executed, cause (at least one processor) to perform the operations according to some implementations of the present disclosure. In the communication device, the decoder, the processing device, the computer-readable (non-volatile) storage medium, and/or the computer program product, the operations may include receiving encoded bits from another communication device or a peer encoder (S1601), and determining an information block by decoding the encoded bits based on a polar sequence $Q^{N-1}_0 = \{Q_0, Q_1, \ldots, Q_{N-1}\}$ where N>1024 according to some implementations of the present disclosure (S1603). In FIG. 16, the information block may include TB+CRC or CB+CRC. The operations may include receiving the encoded bits from the other communication device or the peer decoder through a data channel. In some implementations, the data channel may be a PUSCH. In some implementations, the data channel may be a PDSCH.

In FIG. 15 or 16, $0 <= Q^N_i <= N-1$ is a bit index for i=0, 1, . . . , (N−1), and the polar sequence is an ascending order of reliability $W(Q^N_0) < W(Q^N_1) < \ldots < W(Q^N_{N-1})$, where $W(Q^N_i)$ is the reliability of a bit index $Q^N_i$. In some implementations of the present disclosure, a reliability order between bit indices 0 to 1023 of the polar sequence $Q^{N-1}_0$ where N>1024 may be the same as a reliability order between bit indices 0 to 1023 of a predefined polar sequence $Q_0^{Nmax-1}$ where Nmax=1024 (refer to Table <Polar Sequences> above). That is, the predefined polar sequence for Nmax=1024 may be a subset of the polar sequence $Q^{N-1}_0$ for N>1024 according to some implementations of the present disclosure. From among the bit indices greater than or equal to 1024 in the polar sequence $Q^{N-1}_0$, bit indices for which a partial order is to be evaluated satisfy $W(Q^N_x) < W(Q^N_y)$ for at least $Q^N_x < Q^N_y$. For example, in a polar sequence $Q^{N-1}_0$ with N=4096, a partial order relation may be evaluated from among bit indices $1024 <= Q^N_i < 4096$, and a sequence of bit indices satisfying $W(Q^N_x) < W(Q^N_y)$ for $Q^N_x < Q^N_y$ may include the following sequence.

W_PO={1024, 1025, 1026, 1027, 1029, 1030, 1031, 1035, 1037, 1038, 1039, 1047, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1028, 1029, 1030, 1031, 1035, 1037, 1038, 1039, 1047, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1032, 1033, 1034, 1035, 1037, 1038, 1039, 1047, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1036, 1037, 1038, 1039, 1047, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1040, 1041, 1042, 1043, 1045, 1046, 1047, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1044, 1045, 1046, 1047, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1048, 1049, 1050, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1052, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1056, 1057, 1058, 1059, 1061, 1062, 1063, 1067, 1069, 1070, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1060, 1061, 1062, 1063, 1067, 1069, 1070, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1064, 1065, 1066, 1067, 1069, 1070, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1068, 1069, 1070, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1072, 1073, 1074, 1075, 1077, 1078, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1076, 1077, 1078, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1080, 1081, 1082, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1084, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1088, 1089, 1090, 1091, 1093, 1094, 1095, 1099, 1101, 1102, 1103, 1111, 1115, 1117, 1118, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1092, 1093, 1094, 1095, 1099, 1101, 1102, 1103, 1111, 1115, 1117, 1118, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1096, 1097, 1098, 1099, 1101, 1102, 1103, 1111, 1115, 1117, 1118, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1100, 1101, 1102, 1103, 1111, 1115, 1117, 1118, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1104, 1105, 1106, 1107, 1109, 1110, 1111, 1115, 1117, 1118, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1108, 1109, 1110, 1111, 1115, 1117, 1118, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1112, 1113, 1114, 1115, 1117, 1118, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1116, 1117, 1118, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1120, 1121, 1122, 1123, 1125, 1126, 1127, 1131, 1133, 1134, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1124, 1125, 1126, 1127, 1131, 1133, 1134, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1128, 1129, 1130, 1131, 1133, 1134, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1132, 1133, 1134, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1136, 1137, 1138, 1139, 1141, 1142, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1140, 1141, 1142, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1144, 1145, 1146, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1148, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1152, 1153, 1154, 1155, 1157, 1158, 1159, 1163, 1165, 1166, 1167, 1175, 1179, 1181, 1182, 1183, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1156, 1157, 1158, 1159, 1163, 1165, 1166, 1167, 1175, 1179, 1181, 1182, 1183, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1160, 1161, 1162, 1163, 1165, 1166, 1167, 1175, 1179, 1181, 1182, 1183, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1164, 1165, 1166, 1167, 1175, 1179, 1181, 1182, 1183, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1168, 1169, 1170, 1171, 1173, 1174, 1175, 1179, 1181, 1182, 1183, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1172, 1173, 1174, 1175, 1179, 1181, 1182, 1183, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1176, 1177, 1178, 1179, 1181, 1182, 1183, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1180, 1181, 1182, 1183, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1184, 1185, 1186, 1187, 1189, 1190, 1191, 1195, 1197, 1198, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1188, 1189, 1190, 1191, 1195, 1197, 1198, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1192, 1193, 1194, 1195, 1197, 1198, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1196, 1197, 1198, 1199, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1200, 1201, 1202, 1203, 1205, 1206, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1204, 1205, 1206, 1207, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1208, 1209, 1210, 1211, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1212, 1213, 1214, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1216, 1217, 1218, 1219, 1221, 1222, 1223, 1227, 1229, 1230, 1231, 1239, 1243, 1245, 1246, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1220, 1221, 1222, 1223, 1227, 1229, 1230, 1231, 1239, 1243, 1245, 1246, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1224, 1225, 1226, 1227, 1229, 1230, 1231, 1239, 1243, 1245, 1246, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1228, 1229, 1230, 1231, 1239, 1243, 1245, 1246, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1232, 1233, 1234, 1235, 1237, 1238, 1239, 1243, 1245, 1246, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1236, 1237, 1238, 1239, 1243, 1245, 1246, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1240, 1241, 1242, 1243, 1245, 1246, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1244, 1245, 1246, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1248, 1249, 1250, 1251, 1253, 1254, 1255, 1259, 1261, 1262, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1252, 1253, 1254, 1255, 1259, 1261, 1262, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1256, 1257, 1258, 1259, 1261, 1262, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1260, 1261, 1262, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1264, 1265, 1266, 1267, 1269, 1270, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1268, 1269, 1270, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1272, 1273, 1274, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1276, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1280, 1281, 1282, 1283, 1285, 1286, 1287, 1291, 1293, 1294, 1295, 1303, 1307, 1309, 1310, 1311, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1284, 1285, 1286, 1287, 1291, 1293, 1294, 1295, 1303, 1307, 1309, 1310, 1311, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1288, 1289, 1290, 1291, 1293, 1294, 1295, 1303, 1307, 1309, 1310, 1311, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1292, 1293, 1294, 1295, 1303, 1307, 1309, 1310, 1311, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1296, 1297, 1298, 1299, 1301, 1302, 1303, 1307, 1309, 1310, 1311, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1300, 1301, 1302, 1303, 1307, 1309, 1310, 1311, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1304, 1305, 1306, 1307, 1309, 1310, 1311, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1308, 1309, 1310, 1311, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1312, 1313, 1314, 1315, 1317, 1318, 1319, 1323, 1325, 1326, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1316, 1317, 1318, 1319, 1323, 1325, 1326, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1320, 1321, 1322, 1323, 1325, 1326, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1324, 1325, 1326, 1327, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1328, 1329, 1330, 1331, 1333, 1334, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1332, 1333, 1334, 1335, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1336, 1337, 1338, 1339, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1340, 1341, 1342, 1343, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1344, 1345, 1346, 1347, 1349, 1350, 1351, 1355, 1357, 1358, 1359, 1367, 1371, 1373, 1374, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1348, 1349, 1350, 1351, 1355, 1357, 1358, 1359, 1367, 1371, 1373, 1374, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1352, 1353, 1354, 1355, 1357, 1358, 1359, 1367, 1371, 1373, 1374, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1356, 1357, 1358, 1359, 1367, 1371, 1373, 1374, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1360, 1361, 1362, 1363, 1365, 1366, 1367, 1371, 1373, 1374, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1364, 1365, 1366, 1367, 1371, 1373, 1374, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1368, 1369, 1370, 1371, 1373, 1374, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1372, 1373, 1374, 1375, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1376, 1377, 1378, 1379, 1381, 1382, 1383, 1387, 1389, 1390, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1380, 1381, 1382, 1383, 1387, 1389, 1390, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1384, 1385, 1386, 1387, 1389, 1390, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1388, 1389, 1390, 1391, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1392, 1393, 1394, 1395, 1397, 1398, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1396, 1397, 1398, 1399, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1400, 1401, 1402, 1403, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1404, 1405, 1406, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1408, 1409, 1410, 1411, 1413, 1414, 1415, 1419, 1421, 1422, 1423, 1431, 1435, 1437, 1438, 1439, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1412, 1413, 1414, 1415, 1419, 1421, 1422, 1423, 1431, 1435, 1437, 1438, 1439, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1416, 1417, 1418, 1419, 1421, 1422, 1423, 1431, 1435, 1437, 1438, 1439, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1420, 1421, 1422, 1423, 1431, 1435, 1437, 1438, 1439, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1424, 1425, 1426, 1427, 1429, 1430, 1431, 1435, 1437, 1438, 1439, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1428, 1429, 1430, 1431, 1435, 1437, 1438, 1439, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1432, 1433, 1434, 1435, 1437, 1438, 1439, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1436, 1437, 1438, 1439, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1440, 1441, 1442, 1443, 1445, 1446, 1447, 1451, 1453, 1454, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1444, 1445, 1446, 1447, 1451, 1453, 1454, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1448, 1449, 1450, 1451, 1453, 1454, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1452, 1453, 1454, 1455, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1456, 1457, 1458, 1459, 1461, 1462, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1460, 1461, 1462, 1463, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1464, 1465, 1466, 1467, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1468, 1469, 1470, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1472, 1473, 1474, 1475, 1477, 1478, 1479, 1483, 1485, 1486, 1487, 1495, 1499, 1501, 1502, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1476, 1477, 1478, 1479, 1483, 1485, 1486, 1487, 1495, 1499, 1501, 1502, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1480, 1481, 1482, 1483, 1485, 1486, 1487, 1495, 1499, 1501, 1502, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1484, 1485, 1486, 1487, 1495, 1499, 1501, 1502, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1488, 1489, 1490, 1491, 1493, 1494, 1495, 1499, 1501, 1502, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1492, 1493, 1494, 1495, 1499, 1501, 1502, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1496, 1497, 1498, 1499, 1501, 1502, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1500, 1501, 1502, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1504, 1505, 1506, 1507, 1509, 1510, 1511, 1515, 1517, 1518, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1508, 1509, 1510, 1511, 1515, 1517, 1518, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1512, 1513, 1514, 1515, 1517, 1518, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1516, 1517, 1518, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1520, 1521, 1522, 1523, 1525, 1526, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1524, 1525, 1526, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1528, 1529, 1530, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1532, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1536, 1537, 1538, 1539, 1541, 1542, 1543, 1547, 1549, 1550, 1551, 1559, 1563, 1565, 1566, 1567, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1540, 1541, 1542, 1543, 1547, 1549, 1550, 1551, 1559, 1563, 1565, 1566, 1567, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1544, 1545, 1546, 1547, 1549, 1550, 1551, 1559, 1563, 1565, 1566, 1567, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1548, 1549, 1550, 1551, 1559, 1563, 1565, 1566, 1567, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1552, 1553, 1554, 1555, 1557, 1558, 1559, 1563, 1565, 1566, 1567, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1556, 1557, 1558, 1559, 1563, 1565, 1566, 1567, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1560, 1561, 1562, 1563, 1565, 1566, 1567, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1564, 1565, 1566, 1567, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1568, 1569, 1570, 1571, 1573, 1574, 1575, 1579, 1581, 1582, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1572, 1573, 1574, 1575, 1579, 1581, 1582, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1576, 1577, 1578, 1579, 1581, 1582, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1580, 1581, 1582, 1583, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1584, 1585, 1586, 1587, 1589, 1590, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1588, 1589, 1590, 1591, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1592, 1593, 1594, 1595, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1596, 1597, 1598, 1599, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1600, 1601, 1602, 1603, 1605, 1606, 1607, 1611, 1613, 1614, 1615, 1623, 1627, 1629, 1630, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1604, 1605, 1606, 1607, 1611, 1613, 1614, 1615, 1623, 1627, 1629, 1630, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1608, 1609, 1610, 1611, 1613, 1614, 1615, 1623, 1627, 1629, 1630, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1612, 1613, 1614, 1615, 1623, 1627, 1629, 1630, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1616, 1617, 1618, 1619, 1621, 1622, 1623, 1627, 1629, 1630, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1620, 1621, 1622, 1623, 1627, 1629, 1630, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1624, 1625, 1626, 1627, 1629, 1630, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1628, 1629, 1630, 1631, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1632, 1633, 1634, 1635, 1637, 1638, 1639, 1643, 1645, 1646, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1636, 1637, 1638, 1639, 1643, 1645, 1646, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1640, 1641, 1642, 1643, 1645, 1646, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1644, 1645, 1646, 1647, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1648, 1649, 1650, 1651, 1653, 1654, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1652, 1653, 1654, 1655, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1656, 1657, 1658, 1659, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1660, 1661, 1662, 1663, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1664, 1665, 1666, 1667, 1669, 1670, 1671, 1675, 1677, 1678, 1679, 1687, 1691, 1693, 1694, 1695, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1668, 1669, 1670, 1671, 1675, 1677, 1678, 1679, 1687, 1691, 1693, 1694, 1695, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1672, 1673, 1674, 1675, 1677, 1678, 1679, 1687, 1691, 1693, 1694, 1695, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1676, 1677, 1678, 1679, 1687, 1691, 1693, 1694, 1695, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1680, 1681, 1682, 1683, 1685, 1686, 1687, 1691, 1693, 1694, 1695, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1684, 1685, 1686, 1687, 1691, 1693, 1694, 1695, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1688, 1689, 1690, 1691, 1693, 1694, 1695, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1692, 1693, 1694, 1695, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1696, 1697, 1698, 1699, 1701, 1702, 1703, 1707, 1709, 1710, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1700, 1701, 1702, 1703, 1707, 1709, 1710, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1704, 1705, 1706, 1707, 1709, 1710, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1708, 1709, 1710, 1711, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1712, 1713, 1714, 1715, 1717, 1718, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1716, 1717, 1718, 1719, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1720, 1721, 1722, 1723, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1724, 1725, 1726, 1727, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1728, 1729, 1730, 1731, 1733, 1734, 1735, 1739, 1741, 1742, 1743, 1751, 1755, 1757, 1758, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1732, 1733, 1734, 1735, 1739, 1741, 1742, 1743, 1751, 1755, 1757, 1758, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1736, 1737, 1738, 1739, 1741, 1742, 1743, 1751, 1755, 1757, 1758, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1740, 1741, 1742, 1743, 1751, 1755, 1757, 1758, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1744, 1745, 1746, 1747, 1749, 1750, 1751, 1755, 1757, 1758, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1748, 1749, 1750, 1751, 1755, 1757, 1758, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1752, 1753, 1754, 1755, 1757, 1758, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1756, 1757, 1758, 1759, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1760, 1761, 1762, 1763, 1765, 1766, 1767, 1771, 1773, 1774, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1764, 1765, 1766, 1767, 1771, 1773, 1774, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1768, 1769, 1770, 1771, 1773, 1774, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1772, 1773, 1774, 1775, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1776, 1777, 1778, 1779, 1781, 1782, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1780, 1781, 1782, 1783, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1784, 1785, 1786, 1787, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1788, 1789, 1790, 1791, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1792, 1793, 1794, 1795, 1797, 1798, 1799, 1803, 1805, 1806, 1807, 1815, 1819, 1821, 1822, 1823, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1796, 1797, 1798, 1799, 1803, 1805, 1806, 1807, 1815, 1819, 1821, 1822, 1823, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1800, 1801, 1802, 1803, 1805, 1806, 1807, 1815, 1819, 1821, 1822, 1823, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1804, 1805, 1806, 1807, 1815, 1819, 1821, 1822, 1823, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1808, 1809, 1810, 1811, 1813, 1814, 1815, 1819, 1821, 1822, 1823, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1812, 1813, 1814, 1815, 1819, 1821, 1822, 1823, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1816, 1817, 1818, 1819, 1821, 1822, 1823, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1820, 1821, 1822, 1823, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1824, 1825, 1826, 1827, 1829, 1830, 1831, 1835, 1837, 1838, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1828, 1829, 1830, 1831, 1835, 1837, 1838, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1832, 1833, 1834, 1835, 1837, 1838, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1836, 1837, 1838, 1839, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1840, 1841, 1842, 1843, 1845, 1846, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1844, 1845, 1846, 1847, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1848, 1849, 1850, 1851, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1852, 1853, 1854, 1855, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1856, 1857, 1858, 1859, 1861, 1862, 1863, 1867, 1869, 1870, 1871, 1879, 1883, 1885, 1886, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1860, 1861, 1862, 1863, 1867, 1869, 1870, 1871, 1879, 1883, 1885, 1886, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1864, 1865, 1866, 1867, 1869, 1870, 1871, 1879, 1883, 1885, 1886, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1868, 1869, 1870, 1871, 1879, 1883, 1885, 1886, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1872, 1873, 1874, 1875, 1877, 1878, 1879, 1883, 1885, 1886, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1876, 1877, 1878, 1879, 1883, 1885, 1886, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1880, 1881, 1882, 1883, 1885, 1886, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1884, 1885, 1886, 1887, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1888, 1889, 1890, 1891, 1893, 1894, 1895, 1899, 1901, 1902, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1892, 1893, 1894, 1895, 1899, 1901, 1902, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1896, 1897, 1898, 1899, 1901, 1902, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1900, 1901, 1902, 1903, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1904, 1905, 1906, 1907, 1909, 1910, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1908, 1909, 1910, 1911, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1912, 1913, 1914, 1915, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1916, 1917, 1918, 1919, 1983, 2015, 2031, 2039, 2043, 2045, 2046, 2047, 3071, 3583, 3839, 3967, 4031, 4063, 4079, 4087, 4091, 4093, 4094, 4095},

W_PO={1920, 1921, 1922, 1923, 1925, 1926, 1927, 1931, 1933, 1934, 1935, 1943, 1947, 1949, 1950, 1951, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1924, 1925, 1926, 1927, 1931, 1933, 1934, 1935, 1943, 1947, 1949, 1950, 1951, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1928, 1929, 1930, 1931, 1933, 1934, 1935, 1943, 1947, 1949, 1950, 1951, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1932, 1933, 1934, 1935, 1943, 1947, 1949, 1950, 1951, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1936, 1937, 1938, 1939, 1941, 1942, 1943, 1947, 1949, 1950, 1951, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1940, 1941, 1942, 1943, 1947, 1949, 1950, 1951, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1944, 1945, 1946, 1947, 1949, 1950, 1951, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1948, 1949, 1950, 1951, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1952, 1953, 1954, 1955, 1957, 1958, 1959, 1963, 1965, 1966, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1956, 1957, 1958, 1959, 1963, 1965, 1966, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1960, 1961, 1962, 1963, 1965, 1966, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1964, 1965, 1966, 1967, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1968, 1969, 1970, 1971, 1973, 1974, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1972, 1973, 1974, 1975, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1976, 1977, 1978, 1979, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1980, 1981, 1982, 1983, 2015, 2031, 2039, 2043, 2045, 2046, 2047, 3071, 3583, 3839, 3967, 4031, 4063, 4079, 4087, 4091, 4093, 4094, 4095},

W_PO={1984, 1985, 1986, 1987, 1989, 1990, 1991, 1995, 1997, 1998, 1999, 2007, 2011, 2013, 2014, 2015, 2031, 2039, 2043, 2045, 2046, 2047, 3071, 3583, 3839, 3967, 4031, 4063, 4079, 4087, 4091, 4093, 4094, 4095},

W_PO={1988, 1989, 1990, 1991, 1995, 1997, 1998, 1999, 2007, 2011, 2013, 2014, 2015, 2031, 2039, 2043, 2045, 2046, 2047, 3071, 3583, 3839, 3967, 4031, 4063, 4079, 4087, 4091, 4093, 4094, 4095},

W_PO={1992, 1993, 1994, 1995, 1997, 1998, 1999, 2007, 2011, 2013, 2014, 2015, 2031, 2039, 2043, 2045, 2046, 2047, 3071, 3583, 3839, 3967, 4031, 4063, 4079, 4087, 4091, 4093, 4094, 4095},

W_PO={1996, 1997, 1998, 1999, 2007, 2011, 2013, 2014, 2015, 2031, 2039, 2043, 2045, 2046, 2047, 3071, 3583, 3839, 3967, 4031, 4063, 4079, 4087, 4091, 4093, 4094, 4095},

W_PO={2000, 2001, 2002, 2003, 2005, 2006, 2007, 2011, 2013, 2014, 2015, 2031, 2039, 2043, 2045, 2046, 2047, 3071, 3583, 3839, 3967, 4031, 4063, 4079, 4087, 4091, 4093, 4094, 4095},

W_PO={2004, 2005, 2006, 2007, 2011, 2013, 2014, 2015, 2031, 2039, 2043, 2045, 2046, 2047, 3071, 3583, 3839, 3967, 4031, 4063, 4079, 4087, 4091, 4093, 4094, 4095},

W_PO={2008, 2009, 2010, 2011, 2013, 2014, 2015, 2031, 2039, 2043, 2045, 2046, 2047, 3071, 3583, 3839, 3967, 4031, 4063, 4079, 4087, 4091, 4093, 4094, 4095},

W_PO={2012, 2013, 2014, 2015, 2031, 2039, 2043, 2045, 2046, 2047, 3071, 3583, 3839, 3967, 4031, 4063, 4079, 4087, 4091, 4093, 4094, 4095},

W_PO={2016, 2017, 2018, 2019, 2021, 2022, 2023, 2027, 2029, 2030, 2031, 2039, 2043, 2045, 2046, 2047, 3071, 3583, 3839, 3967, 4031, 4063, 4079, 4087, 4091, 4093, 4094, 4095},

W_PO={2020, 2021, 2022, 2023, 2027, 2029, 2030, 2031, 2039, 2043, 2045, 2046, 2047, 3071, 3583, 3839, 3967, 4031, 4063, 4079, 4087, 4091, 4093, 4094, 4095},

W_PO={2024, 2025, 2026, 2027, 2029, 2030, 2031, 2039, 2043, 2045, 2046, 2047, 3071, 3583, 3839, 3967, 4031, 4063, 4079, 4087, 4091, 4093, 4094, 4095},

W_PO={2028, 2029, 2030, 2031, 2039, 2043, 2045, 2046, 2047, 3071, 3583, 3839, 3967, 4031, 4063, 4079, 4087, 4091, 4093, 4094, 4095},

W_PO={2032, 2033, 2034, 2035, 2037, 2038, 2039, 2043, 2045, 2046, 2047, 3071, 3583, 3839, 3967, 4031, 4063, 4079, 4087, 4091, 4093, 4094, 4095},

W_PO={2036, 2037, 2038, 2039, 2043, 2045, 2046, 2047, 3071, 3583, 3839, 3967, 4031, 4063, 4079, 4087, 4091, 4093, 4094, 4095},

W_PO={2040, 2041, 2042, 2043, 2045, 2046, 2047, 3071, 3583, 3839, 3967, 4031, 4063, 4079, 4087, 4091, 4093, 4094, 4095},

W_PO={2044, 2045, 2046, 2047, 3071, 3583, 3839, 3967, 4031, 4063, 4079, 4087, 4091, 4093, 4094, 4095},

W_PO={2048, 2049, 2050, 2051, 2053, 2054, 2055, 2059, 2061, 2062, 2063, 2071, 2075, 2077, 2078, 2079, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2052, 2053, 2054, 2055, 2059, 2061, 2062, 2063, 2071, 2075, 2077, 2078, 2079, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2056, 2057, 2058, 2059, 2061, 2062, 2063, 2071, 2075, 2077, 2078, 2079, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2060, 2061, 2062, 2063, 2071, 2075, 2077, 2078, 2079, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2064, 2065, 2066, 2067, 2069, 2070, 2071, 2075, 2077, 2078, 2079, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2068, 2069, 2070, 2071, 2075, 2077, 2078, 2079, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2072, 2073, 2074, 2075, 2077, 2078, 2079, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2076, 2077, 2078, 2079, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2080, 2081, 2082, 2083, 2085, 2086, 2087, 2091, 2093, 2094, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2084, 2085, 2086, 2087, 2091, 2093, 2094, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2088, 2089, 2090, 2091, 2093, 2094, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2092, 2093, 2094, 2095, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2096, 2097, 2098, 2099, 2101, 2102, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2100, 2101, 2102, 2103, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2104, 2105, 2106, 2107, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2108, 2109, 2110, 2111, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2112, 2113, 2114, 2115, 2117, 2118, 2119, 2123, 2125, 2126, 2127, 2135, 2139, 2141, 2142, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2116, 2117, 2118, 2119, 2123, 2125, 2126, 2127, 2135, 2139, 2141, 2142, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2120, 2121, 2122, 2123, 2125, 2126, 2127, 2135, 2139, 2141, 2142, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2124, 2125, 2126, 2127, 2135, 2139, 2141, 2142, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2128, 2129, 2130, 2131, 2133, 2134, 2135, 2139, 2141, 2142, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2132, 2133, 2134, 2135, 2139, 2141, 2142, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2136, 2137, 2138, 2139, 2141, 2142, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2140, 2141, 2142, 2143, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2144, 2145, 2146, 2147, 2149, 2150, 2151, 2155, 2157, 2158, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2148, 2149, 2150, 2151, 2155, 2157, 2158, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2152, 2153, 2154, 2155, 2157, 2158, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2156, 2157, 2158, 2159, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2160, 2161, 2162, 2163, 2165, 2166, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2164, 2165, 2166, 2167, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2168, 2169, 2170, 2171, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2172, 2173, 2174, 2175, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2176, 2177, 2178, 2179, 2181, 2182, 2183, 2187, 2189, 2190, 2191, 2199, 2203, 2205, 2206, 2207, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2180, 2181, 2182, 2183, 2187, 2189, 2190, 2191, 2199, 2203, 2205, 2206, 2207, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2184, 2185, 2186, 2187, 2189, 2190, 2191, 2199, 2203, 2205, 2206, 2207, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2188, 2189, 2190, 2191, 2199, 2203, 2205, 2206, 2207, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2192, 2193, 2194, 2195, 2197, 2198, 2199, 2203, 2205, 2206, 2207, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2196, 2197, 2198, 2199, 2203, 2205, 2206, 2207, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2200, 2201, 2202, 2203, 2205, 2206, 2207, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2204, 2205, 2206, 2207, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2208, 2209, 2210, 2211, 2213, 2214, 2215, 2219, 2221, 2222, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2212, 2213, 2214, 2215, 2219, 2221, 2222, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2216, 2217, 2218, 2219, 2221, 2222, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2220, 2221, 2222, 2223, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2224, 2225, 2226, 2227, 2229, 2230, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2228, 2229, 2230, 2231, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2232, 2233, 2234, 2235, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2236, 2237, 2238, 2239, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2240, 2241, 2242, 2243, 2245, 2246, 2247, 2251, 2253, 2254, 2255, 2263, 2267, 2269, 2270, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2244, 2245, 2246, 2247, 2251, 2253, 2254, 2255, 2263, 2267, 2269, 2270, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2248, 2249, 2250, 2251, 2253, 2254, 2255, 2263, 2267, 2269, 2270, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2252, 2253, 2254, 2255, 2263, 2267, 2269, 2270, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2256, 2257, 2258, 2259, 2261, 2262, 2263, 2267, 2269, 2270, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2260, 2261, 2262, 2263, 2267, 2269, 2270, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2264, 2265, 2266, 2267, 2269, 2270, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2268, 2269, 2270, 2271, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2272, 2273, 2274, 2275, 2277, 2278, 2279, 2283, 2285, 2286, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2276, 2277, 2278, 2279, 2283, 2285, 2286, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2280, 2281, 2282, 2283, 2285, 2286, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2284, 2285, 2286, 2287, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2288, 2289, 2290, 2291, 2293, 2294, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2292, 2293, 2294, 2295, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2296, 2297, 2298, 2299, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2300, 2301, 2302, 2303, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2304, 2305, 2306, 2307, 2309, 2310, 2311, 2315, 2317, 2318, 2319, 2327, 2331, 2333, 2334, 2335, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2308, 2309, 2310, 2311, 2315, 2317, 2318, 2319, 2327, 2331, 2333, 2334, 2335, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2312, 2313, 2314, 2315, 2317, 2318, 2319, 2327, 2331, 2333, 2334, 2335, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2316, 2317, 2318, 2319, 2327, 2331, 2333, 2334, 2335, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2320, 2321, 2322, 2323, 2325, 2326, 2327, 2331, 2333, 2334, 2335, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2324, 2325, 2326, 2327, 2331, 2333, 2334, 2335, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2328, 2329, 2330, 2331, 2333, 2334, 2335, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2332, 2333, 2334, 2335, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2336, 2337, 2338, 2339, 2341, 2342, 2343, 2347, 2349, 2350, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2340, 2341, 2342, 2343, 2347, 2349, 2350, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2344, 2345, 2346, 2347, 2349, 2350, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2348, 2349, 2350, 2351, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2352, 2353, 2354, 2355, 2357, 2358, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2356, 2357, 2358, 2359, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2360, 2361, 2362, 2363, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2364, 2365, 2366, 2367, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2368, 2369, 2370, 2371, 2373, 2374, 2375, 2379, 2381, 2382, 2383, 2391, 2395, 2397, 2398, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2372, 2373, 2374, 2375, 2379, 2381, 2382, 2383, 2391, 2395, 2397, 2398, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2376, 2377, 2378, 2379, 2381, 2382, 2383, 2391, 2395, 2397, 2398, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2380, 2381, 2382, 2383, 2391, 2395, 2397, 2398, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2384, 2385, 2386, 2387, 2389, 2390, 2391, 2395, 2397, 2398, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2388, 2389, 2390, 2391, 2395, 2397, 2398, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2392, 2393, 2394, 2395, 2397, 2398, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2396, 2397, 2398, 2399, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2400, 2401, 2402, 2403, 2405, 2406, 2407, 2411, 2413, 2414, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2404, 2405, 2406, 2407, 2411, 2413, 2414, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2408, 2409, 2410, 2411, 2413, 2414, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2412, 2413, 2414, 2415, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2416, 2417, 2418, 2419, 2421, 2422, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2420, 2421, 2422, 2423, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2424, 2425, 2426, 2427, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2428, 2429, 2430, 2431, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2432, 2433, 2434, 2435, 2437, 2438, 2439, 2443, 2445, 2446, 2447, 2455, 2459, 2461, 2462, 2463, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2436, 2437, 2438, 2439, 2443, 2445, 2446, 2447, 2455, 2459, 2461, 2462, 2463, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2440, 2441, 2442, 2443, 2445, 2446, 2447, 2455, 2459, 2461, 2462, 2463, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2444, 2445, 2446, 2447, 2455, 2459, 2461, 2462, 2463, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2448, 2449, 2450, 2451, 2453, 2454, 2455, 2459, 2461, 2462, 2463, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2452, 2453, 2454, 2455, 2459, 2461, 2462, 2463, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2456, 2457, 2458, 2459, 2461, 2462, 2463, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2460, 2461, 2462, 2463, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2464, 2465, 2466, 2467, 2469, 2470, 2471, 2475, 2477, 2478, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2468, 2469, 2470, 2471, 2475, 2477, 2478, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2472, 2473, 2474, 2475, 2477, 2478, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2476, 2477, 2478, 2479, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2480, 2481, 2482, 2483, 2485, 2486, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2484, 2485, 2486, 2487, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2488, 2489, 2490, 2491, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2492, 2493, 2494, 2495, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2496, 2497, 2498, 2499, 2501, 2502, 2503, 2507, 2509, 2510, 2511, 2519, 2523, 2525, 2526, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2500, 2501, 2502, 2503, 2507, 2509, 2510, 2511, 2519, 2523, 2525, 2526, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2504, 2505, 2506, 2507, 2509, 2510, 2511, 2519, 2523, 2525, 2526, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2508, 2509, 2510, 2511, 2519, 2523, 2525, 2526, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2512, 2513, 2514, 2515, 2517, 2518, 2519, 2523, 2525, 2526, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2516, 2517, 2518, 2519, 2523, 2525, 2526, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2520, 2521, 2522, 2523, 2525, 2526, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2524, 2525, 2526, 2527, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2528, 2529, 2530, 2531, 2533, 2534, 2535, 2539, 2541, 2542, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2532, 2533, 2534, 2535, 2539, 2541, 2542, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2536, 2537, 2538, 2539, 2541, 2542, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2540, 2541, 2542, 2543, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2544, 2545, 2546, 2547, 2549, 2550, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2548, 2549, 2550, 2551, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2552, 2553, 2554, 2555, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2556, 2557, 2558, 2559, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2560, 2561, 2562, 2563, 2565, 2566, 2567, 2571, 2573, 2574, 2575, 2583, 2587, 2589, 2590, 2591, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2564, 2565, 2566, 2567, 2571, 2573, 2574, 2575, 2583, 2587, 2589, 2590, 2591, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2568, 2569, 2570, 2571, 2573, 2574, 2575, 2583, 2587, 2589, 2590, 2591, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2572, 2573, 2574, 2575, 2583, 2587, 2589, 2590, 2591, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2576, 2577, 2578, 2579, 2581, 2582, 2583, 2587, 2589, 2590, 2591, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2580, 2581, 2582, 2583, 2587, 2589, 2590, 2591, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2584, 2585, 2586, 2587, 2589, 2590, 2591, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2588, 2589, 2590, 2591, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2592, 2593, 2594, 2595, 2597, 2598, 2599, 2603, 2605, 2606, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2596, 2597, 2598, 2599, 2603, 2605, 2606, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2600, 2601, 2602, 2603, 2605, 2606, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2604, 2605, 2606, 2607, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2608, 2609, 2610, 2611, 2613, 2614, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2612, 2613, 2614, 2615, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2616, 2617, 2618, 2619, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2620, 2621, 2622, 2623, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2624, 2625, 2626, 2627, 2629, 2630, 2631, 2635, 2637, 2638, 2639, 2647, 2651, 2653, 2654, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2628, 2629, 2630, 2631, 2635, 2637, 2638, 2639, 2647, 2651, 2653, 2654, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2632, 2633, 2634, 2635, 2637, 2638, 2639, 2647, 2651, 2653, 2654, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2636, 2637, 2638, 2639, 2647, 2651, 2653, 2654, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2640, 2641, 2642, 2643, 2645, 2646, 2647, 2651, 2653, 2654, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2644, 2645, 2646, 2647, 2651, 2653, 2654, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2648, 2649, 2650, 2651, 2653, 2654, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2652, 2653, 2654, 2655, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2656, 2657, 2658, 2659, 2661, 2662, 2663, 2667, 2669, 2670, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2660, 2661, 2662, 2663, 2667, 2669, 2670, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2664, 2665, 2666, 2667, 2669, 2670, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2668, 2669, 2670, 2671, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2672, 2673, 2674, 2675, 2677, 2678, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2676, 2677, 2678, 2679, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2680, 2681, 2682, 2683, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2684, 2685, 2686, 2687, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2688, 2689, 2690, 2691, 2693, 2694, 2695, 2699, 2701, 2702, 2703, 2711, 2715, 2717, 2718, 2719, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2692, 2693, 2694, 2695, 2699, 2701, 2702, 2703, 2711, 2715, 2717, 2718, 2719, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2696, 2697, 2698, 2699, 2701, 2702, 2703, 2711, 2715, 2717, 2718, 2719, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2700, 2701, 2702, 2703, 2711, 2715, 2717, 2718, 2719, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2704, 2705, 2706, 2707, 2709, 2710, 2711, 2715, 2717, 2718, 2719, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2708, 2709, 2710, 2711, 2715, 2717, 2718, 2719, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2712, 2713, 2714, 2715, 2717, 2718, 2719, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2716, 2717, 2718, 2719, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2720, 2721, 2722, 2723, 2725, 2726, 2727, 2731, 2733, 2734, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2724, 2725, 2726, 2727, 2731, 2733, 2734, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2728, 2729, 2730, 2731, 2733, 2734, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2732, 2733, 2734, 2735, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2736, 2737, 2738, 2739, 2741, 2742, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2740, 2741, 2742, 2743, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2744, 2745, 2746, 2747, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2748, 2749, 2750, 2751, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2752, 2753, 2754, 2755, 2757, 2758, 2759, 2763, 2765, 2766, 2767, 2775, 2779, 2781, 2782, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2756, 2757, 2758, 2759, 2763, 2765, 2766, 2767, 2775, 2779, 2781, 2782, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2760, 2761, 2762, 2763, 2765, 2766, 2767, 2775, 2779, 2781, 2782, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2764, 2765, 2766, 2767, 2775, 2779, 2781, 2782, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2768, 2769, 2770, 2771, 2773, 2774, 2775, 2779, 2781, 2782, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2772, 2773, 2774, 2775, 2779, 2781, 2782, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2776, 2777, 2778, 2779, 2781, 2782, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2780, 2781, 2782, 2783, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2784, 2785, 2786, 2787, 2789, 2790, 2791, 2795, 2797, 2798, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2788, 2789, 2790, 2791, 2795, 2797, 2798, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2792, 2793, 2794, 2795, 2797, 2798, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2796, 2797, 2798, 2799, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2800, 2801, 2802, 2803, 2805, 2806, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2804, 2805, 2806, 2807, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2808, 2809, 2810, 2811, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2812, 2813, 2814, 2815, 2943, 3007, 3039, 3055, 3063, 3067, 3069, 3070, 3071, 3583, 3839, 3967, 4031, 4063, 4079, 4087, 4091, 4093, 4094, 4095},

W_PO={2816, 2817, 2818, 2819, 2821, 2822, 2823, 2827, 2829, 2830, 2831, 2839, 2843, 2845, 2846, 2847, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2820, 2821, 2822, 2823, 2827, 2829, 2830, 2831, 2839, 2843, 2845, 2846, 2847, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2824, 2825, 2826, 2827, 2829, 2830, 2831, 2839, 2843, 2845, 2846, 2847, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2828, 2829, 2830, 2831, 2839, 2843, 2845, 2846, 2847, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2832, 2833, 2834, 2835, 2837, 2838, 2839, 2843, 2845, 2846, 2847, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2836, 2837, 2838, 2839, 2843, 2845, 2846, 2847, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2840, 2841, 2842, 2843, 2845, 2846, 2847, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2844, 2845, 2846, 2847, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2848, 2849, 2850, 2851, 2853, 2854, 2855, 2859, 2861, 2862, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2852, 2853, 2854, 2855, 2859, 2861, 2862, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2856, 2857, 2858, 2859, 2861, 2862, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2860, 2861, 2862, 2863, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2864, 2865, 2866, 2867, 2869, 2870, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2868, 2869, 2870, 2871, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2872, 2873, 2874, 2875, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2876, 2877, 2878, 2879, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2880, 2881, 2882, 2883, 2885, 2886, 2887, 2891, 2893, 2894, 2895, 2903, 2907, 2909, 2910, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2884, 2885, 2886, 2887, 2891, 2893, 2894, 2895, 2903, 2907, 2909, 2910, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2888, 2889, 2890, 2891, 2893, 2894, 2895, 2903, 2907, 2909, 2910, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2892, 2893, 2894, 2895, 2903, 2907, 2909, 2910, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2896, 2897, 2898, 2899, 2901, 2902, 2903, 2907, 2909, 2910, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2900, 2901, 2902, 2903, 2907, 2909, 2910, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2904, 2905, 2906, 2907, 2909, 2910, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2908, 2909, 2910, 2911, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2912, 2913, 2914, 2915, 2917, 2918, 2919, 2923, 2925, 2926, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2916, 2917, 2918, 2919, 2923, 2925, 2926, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2920, 2921, 2922, 2923, 2925, 2926, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2924, 2925, 2926, 2927, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2928, 2929, 2930, 2931, 2933, 2934, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2932, 2933, 2934, 2935, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2936, 2937, 2938, 2939, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2940, 2941, 2942, 2943, 3007, 3039, 3055, 3063, 3067, 3069, 3070, 3071, 3583, 3839, 3967, 4031, 4063, 4079, 4087, 4091, 4093, 4094, 4095},

W_PO={2944, 2945, 2946, 2947, 2949, 2950, 2951, 2955, 2957, 2958, 2959, 2967, 2971, 2973, 2974, 2975, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2948, 2949, 2950, 2951, 2955, 2957, 2958, 2959, 2967, 2971, 2973, 2974, 2975, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2952, 2953, 2954, 2955, 2957, 2958, 2959, 2967, 2971, 2973, 2974, 2975, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2956, 2957, 2958, 2959, 2967, 2971, 2973, 2974, 2975, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2960, 2961, 2962, 2963, 2965, 2966, 2967, 2971, 2973, 2974, 2975, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2964, 2965, 2966, 2967, 2971, 2973, 2974, 2975, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2968, 2969, 2970, 2971, 2973, 2974, 2975, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2972, 2973, 2974, 2975, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2976, 2977, 2978, 2979, 2981, 2982, 2983, 2987, 2989, 2990, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2980, 2981, 2982, 2983, 2987, 2989, 2990, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2984, 2985, 2986, 2987, 2989, 2990, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2988, 2989, 2990, 2991, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2992, 2993, 2994, 2995, 2997, 2998, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={2996, 2997, 2998, 2999, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={3000, 3001, 3002, 3003, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={3004, 3005, 3006, 3007, 3039, 3055, 3063, 3067, 3069, 3070, 3071, 3583, 3839, 3967, 4031, 4063, 4079, 4087, 4091, 4093, 4094, 4095},

W_PO={3008, 3009, 3010, 3011, 3013, 3014, 3015, 3019, 3021, 3022, 3023, 3031, 3035, 3037, 3038, 3039, 3055, 3063, 3067, 3069, 3070, 3071, 3583, 3839, 3967, 4031, 4063, 4079, 4087, 4091, 4093, 4094, 4095},

W_PO={3012, 3013, 3014, 3015, 3019, 3021, 3022, 3023, 3031, 3035, 3037, 3038, 3039, 3055, 3063, 3067, 3069, 3070, 3071, 3583, 3839, 3967, 4031, 4063, 4079, 4087, 4091, 4093, 4094, 4095},

W_PO={3016, 3017, 3018, 3019, 3021, 3022, 3023, 3031, 3035, 3037, 3038, 3039, 3055, 3063, 3067, 3069, 3070, 3071, 3583, 3839, 3967, 4031, 4063, 4079, 4087, 4091, 4093, 4094, 4095},

W_PO={3020, 3021, 3022, 3023, 3031, 3035, 3037, 3038, 3039, 3055, 3063, 3067, 3069, 3070, 3071, 3583, 3839, 3967, 4031, 4063, 4079, 4087, 4091, 4093, 4094, 4095},

W_PO={3024, 3025, 3026, 3027, 3029, 3030, 3031, 3035, 3037, 3038, 3039, 3055, 3063, 3067, 3069, 3070, 3071, 3583, 3839, 3967, 4031, 4063, 4079, 4087, 4091, 4093, 4094, 4095},

W_PO={3028, 3029, 3030, 3031, 3035, 3037, 3038, 3039, 3055, 3063, 3067, 3069, 3070, 3071, 3583, 3839, 3967, 4031, 4063, 4079, 4087, 4091, 4093, 4094, 4095},

W_PO={3032, 3033, 3034, 3035, 3037, 3038, 3039, 3055, 3063, 3067, 3069, 3070, 3071, 3583, 3839, 3967, 4031, 4063, 4079, 4087, 4091, 4093, 4094, 4095},

W_PO={3036, 3037, 3038, 3039, 3055, 3063, 3067, 3069, 3070, 3071, 3583, 3839, 3967, 4031, 4063, 4079, 4087, 4091, 4093, 4094, 4095},

W_PO={3040, 3041, 3042, 3043, 3045, 3046, 3047, 3051, 3053, 3054, 3055, 3063, 3067, 3069, 3070, 3071, 3583, 3839, 3967, 4031, 4063, 4079, 4087, 4091, 4093, 4094, 4095},

W_PO={3044, 3045, 3046, 3047, 3051, 3053, 3054, 3055, 3063, 3067, 3069, 3070, 3071, 3583, 3839, 3967, 4031, 4063, 4079, 4087, 4091, 4093, 4094, 4095},

W_PO={3048, 3049, 3050, 3051, 3053, 3054, 3055, 3063, 3067, 3069, 3070, 3071, 3583, 3839, 3967, 4031, 4063, 4079, 4087, 4091, 4093, 4094, 4095},

W_PO={3052, 3053, 3054, 3055, 3063, 3067, 3069, 3070, 3071, 3583, 3839, 3967, 4031, 4063, 4079, 4087, 4091, 4093, 4094, 4095},

W_PO={3056, 3057, 3058, 3059, 3061, 3062, 3063, 3067, 3069, 3070, 3071, 3583, 3839, 3967, 4031, 4063, 4079, 4087, 4091, 4093, 4094, 4095},

W_PO={3060, 3061, 3062, 3063, 3067, 3069, 3070, 3071, 3583, 3839, 3967, 4031, 4063, 4079, 4087, 4091, 4093, 4094, 4095},

W_PO={3064, 3065, 3066, 3067, 3069, 3070, 3071, 3583, 3839, 3967, 4031, 4063, 4079, 4087, 4091, 4093, 4094, 4095},

W_PO={3068, 3069, 3070, 3071, 3583, 3839, 3967, 4031, 4063, 4079, 4087, 4091, 4093, 4094, 4095},

W_PO={3072, 3073, 3074, 3075, 3077, 3078, 3079, 3083, 3085, 3086, 3087, 3095, 3099, 3101, 3102, 3103, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3076, 3077, 3078, 3079, 3083, 3085, 3086, 3087, 3095, 3099, 3101, 3102, 3103, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3080, 3081, 3082, 3083, 3085, 3086, 3087, 3095, 3099, 3101, 3102, 3103, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3084, 3085, 3086, 3087, 3095, 3099, 3101, 3102, 3103, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3088, 3089, 3090, 3091, 3093, 3094, 3095, 3099, 3101, 3102, 3103, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3092, 3093, 3094, 3095, 3099, 3101, 3102, 3103, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3096, 3097, 3098, 3099, 3101, 3102, 3103, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3100, 3101, 3102, 3103, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3104, 3105, 3106, 3107, 3109, 3110, 3111, 3115, 3117, 3118, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3108, 3109, 3110, 3111, 3115, 3117, 3118, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3112, 3113, 3114, 3115, 3117, 3118, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3116, 3117, 3118, 3119, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3120, 3121, 3122, 3123, 3125, 3126, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3124, 3125, 3126, 3127, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3128, 3129, 3130, 3131, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3132, 3133, 3134, 3135, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3136, 3137, 3138, 3139, 3141, 3142, 3143, 3147, 3149, 3150, 3151, 3159, 3163, 3165, 3166, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3140, 3141, 3142, 3143, 3147, 3149, 3150, 3151, 3159, 3163, 3165, 3166, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3144, 3145, 3146, 3147, 3149, 3150, 3151, 3159, 3163, 3165, 3166, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3148, 3149, 3150, 3151, 3159, 3163, 3165, 3166, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3152, 3153, 3154, 3155, 3157, 3158, 3159, 3163, 3165, 3166, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3156, 3157, 3158, 3159, 3163, 3165, 3166, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3160, 3161, 3162, 3163, 3165, 3166, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3164, 316 5, 3166, 3167, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3168, 316 9, 3170, 3171, 3173, 3174, 3175, 3179, 3181, 3182, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3172, 317 3, 3174, 3175, 3179, 3181, 3182, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3176, 3177, 3178, 3179, 3181, 3182, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3180, 3181, 3182, 3183, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3184, 3185, 3186, 3187, 3189, 3190, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3188, 3189, 3190, 3191, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3192, 319 3, 3194, 3195, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3196, 3197, 3198, 3199, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3200, 3201, 3202, 3203, 3205, 3206, 3207, 3211, 3213, 3214, 3215, 3223, 3227, 3229, 3230, 3231, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3204, 3205, 3206, 3207, 3211, 3213, 3214, 3215, 3223, 3227, 3229, 3230, 3231, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3208, 3209, 3210, 3211, 3213, 3214, 3215, 3223, 3227, 3229, 3230, 3231, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3212, 3213, 3214, 3215, 3223, 3227, 3229, 3230, 3231, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3216, 3217, 3218, 3219, 3221, 3222, 3223, 3227, 3229, 3230, 3231, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3220, 3221, 3222, 3223, 3227, 3229, 3230, 3231, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3224, 3225, 3226, 3227, 3229, 3230, 3231, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3228, 3229, 3230, 3231, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3232, 3233, 3234, 3235, 3237, 3238, 3239, 3243, 3245, 3246, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3236, 3237, 3238, 3239, 3243, 3245, 3246, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3240, 3241, 3242, 3243, 3245, 3246, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3244, 3245, 3246, 3247, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3248, 3249, 3250, 3251, 3253, 3254, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3252, 3253, 3254, 3255, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3256, 3257, 3258, 3259, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3260, 3261, 3262, 3263, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3264, 3265, 3266, 3267, 3269, 3270, 3271, 3275, 3277, 3278, 3279, 3287, 3291, 3293, 3294, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3268, 3269, 3270, 3271, 3275, 3277, 3278, 3279, 3287, 3291, 3293, 3294, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3272, 3273, 3274, 3275, 3277, 3278, 3279, 3287, 3291, 3293, 3294, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3276, 3277, 3278, 3279, 3287, 3291, 3293, 3294, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3280, 3281, 3282, 3283, 3285, 3286, 3287, 3291, 3293, 3294, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3284, 3285, 3286, 3287, 3291, 3293, 3294, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3288, 3289, 3290, 3291, 3293, 3294, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3292, 3293, 3294, 3295, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3296, 3297, 3298, 3299, 3301, 3302, 3303, 3307, 3309, 3310, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3300, 3301, 3302, 3303, 3307, 3309, 3310, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3304, 3305, 3306, 3307, 3309, 3310, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3308, 3309, 3310, 3311, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3312, 3313, 3314, 3315, 3317, 3318, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3316, 3317, 3318, 3319, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3320, 3321, 3322, 3323, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3324, 3325, 3326, 3327, 3455, 3519, 3551, 3567, 3575, 3579, 3581, 3582, 3583, 3839, 3967, 4031, 4063, 4079, 4087, 4091, 4093, 4094, 4095},

W_PO={3328, 3329, 3330, 3331, 3333, 3334, 3335, 3339, 3341, 3342, 3343, 3351, 3355, 3357, 3358, 3359, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3332, 3333, 3334, 3335, 3339, 3341, 3342, 3343, 3351, 3355, 3357, 3358, 3359, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3336, 3337, 3338, 3339, 3341, 3342, 3343, 3351, 3355, 3357, 3358, 3359, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3340, 3341, 3342, 3343, 3351, 3355, 3357, 3358, 3359, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3344, 3345, 3346, 3347, 3349, 3350, 3351, 3355, 3357, 3358, 3359, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3348, 3349, 3350, 3351, 3355, 3357, 3358, 3359, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3352, 3353, 3354, 3355, 3357, 3358, 3359, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3356, 3357, 3358, 3359, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3360, 3361, 3362, 3363, 3365, 3366, 3367, 3371, 3373, 3374, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3364, 3365, 3366, 3367, 3371, 3373, 3374, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3368, 3369, 3370, 3371, 3373, 3374, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3372, 3373, 3374, 3375, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3376, 3377, 3378, 3379, 3381, 3382, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3380, 3381, 3382, 3383, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3384, 3385, 3386, 3387, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3388, 3389, 3390, 3391, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3392, 3393, 3394, 3395, 3397, 3398, 3399, 3403, 3405, 3406, 3407, 3415, 3419, 3421, 3422, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3396, 3397, 3398, 3399, 3403, 3405, 3406, 3407, 3415, 3419, 3421, 3422, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3400, 3401, 3402, 3403, 3405, 3406, 3407, 3415, 3419, 3421, 3422, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3404, 3405, 3406, 3407, 3415, 3419, 3421, 3422, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3408, 3409, 3410, 3411, 3413, 3414, 3415, 3419, 3421, 3422, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3412, 3413, 3414, 3415, 3419, 3421, 3422, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3416, 3417, 3418, 3419, 3421, 3422, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3420, 3421, 3422, 3423, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3424, 3425, 3426, 3427, 3429, 3430, 3431, 3435, 3437, 3438, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3428, 3429, 3430, 3431, 3435, 3437, 3438, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3432, 3433, 3434, 3435, 3437, 3438, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3436, 3437, 3438, 3439, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3440, 3441, 3442, 3443, 3445, 3446, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3444, 3445, 3446, 3447, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3448, 3449, 3450, 3451, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3452, 3453, 3454, 3455, 3519, 3551, 3567, 3575, 3579, 3581, 3582, 3583, 3839, 3967, 4031, 4063, 4079, 4087, 4091, 4093, 4094, 4095},

W_PO={3456, 3457, 3458, 3459, 3461, 3462, 3463, 3467, 3469, 3470, 3471, 3479, 3483, 3485, 3486, 3487, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3460, 3461, 3462, 3463, 3467, 3469, 3470, 3471, 3479, 3483, 3485, 3486, 3487, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3464, 3465, 3466, 3467, 3469, 3470, 3471, 3479, 3483, 3485, 3486, 3487, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3468, 3469, 3470, 3471, 3479, 3483, 3485, 3486, 3487, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3472, 3473, 3474, 3475, 3477, 3478, 3479, 3483, 3485, 3486, 3487, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3476, 3477, 3478, 3479, 3483, 3485, 3486, 3487, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3480, 3481, 3482, 3483, 3485, 3486, 3487, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3484, 3485, 3486, 3487, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3488, 3489, 3490, 3491, 3493, 3494, 3495, 3499, 3501, 3502, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3492, 3493, 3494, 3495, 3499, 3501, 3502, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3496, 3497, 3498, 3499, 3501, 3502, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3500, 3501, 3502, 3503, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3504, 3505, 3506, 3507, 3509, 3510, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3508, 3509, 3510, 3511, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3512, 3513, 3514, 3515, 3517, 3518, 3519, 3551, 3567, 3575, 3579, 3581, 3582, 3583, 3839, 3967, 4031, 4063, 4079, 4087, 4091, 4093, 4094, 4095},

W_PO={3516, 3517, 3518, 3519, 3551, 3567, 3575, 3579, 3581, 3582, 3583, 3839, 3967, 4031, 4063, 4079, 4087, 4091, 4093, 4094, 4095},

W_PO={3520, 3521, 3522, 3523, 3525, 3526, 3527, 3531, 3533, 3534, 3535, 3543, 3547, 3549, 3550, 3551, 3567, 3575, 3579, 3581, 3582, 3583, 3839, 3967, 4031, 4063, 4079, 4087, 4091, 4093, 4094, 4095},

W_PO={3524, 3525, 3526, 3527, 3531, 3533, 3534, 3535, 3543, 3547, 3549, 3550, 3551, 3567, 3575, 3579, 3581, 3582, 3583, 3839, 3967, 4031, 4063, 4079, 4087, 4091, 4093, 4094, 4095},

W_PO={3528, 3529, 3530, 3531, 3533, 3534, 3535, 3543, 3547, 3549, 3550, 3551, 3567, 3575, 3579, 3581, 3582, 3583, 3839, 3967, 4031, 4063, 4079, 4087, 4091, 4093, 4094, 4095},

W_PO={3532, 3533, 3534, 3535, 3543, 3547, 3549, 3550, 3551, 3567, 3575, 3579, 3581, 3582, 3583, 3839, 3967, 4031, 4063, 4079, 4087, 4091, 4093, 4094, 4095},

W_PO={3536, 3537, 3538, 3539, 3541, 3542, 3543, 3547, 3549, 3550, 3551, 3567, 3575, 3579, 3581, 3582, 3583, 3839, 3967, 4031, 4063, 4079, 4087, 4091, 4093, 4094, 4095},

W_PO={3540, 3541, 3542, 3543, 3547, 3549, 3550, 3551, 3567, 3575, 3579, 3581, 3582, 3583, 3839, 3967, 4031, 4063, 4079, 4087, 4091, 4093, 4094, 4095},

W_PO={3544, 3545, 3546, 3547, 3549, 3550, 3551, 3567, 3575, 3579, 3581, 3582, 3583, 3839, 3967, 4031, 4063, 4079, 4087, 4091, 4093, 4094, 4095},

W_PO={3548, 3549, 3550, 3551, 3567, 3575, 3579, 3581, 3582, 3583, 3839, 3967, 4031, 4063, 4079, 4087, 4091, 4093, 4094, 4095},

W_PO={3552, 3553, 3554, 3555, 3557, 3558, 3559, 3563, 3565, 3566, 3567, 3575, 3579, 3581, 3582, 3583, 3839, 3967, 4031, 4063, 4079, 4087, 4091, 4093, 4094, 4095},

W_PO={3556, 3557, 3558, 3559, 3563, 3565, 3566, 3567, 3575, 3579, 3581, 3582, 3583, 3839, 3967, 4031, 4063, 4079, 4087, 4091, 4093, 4094, 4095},

W_PO={3560, 3561, 3562, 3563, 3565, 3566, 3567, 3575, 3579, 3581, 3582, 3583, 3839, 3967, 4031, 4063, 4079, 4087, 4091, 4093, 4094, 4095},

W_PO={3564, 3565, 3566, 3567, 3575, 3579, 3581, 3582, 3583, 3839, 3967, 4031, 4063, 4079, 4087, 4091, 4093, 4094, 4095},

W_PO={3568, 3569, 3570, 3571, 3573, 3574, 3575, 3579, 3581, 3582, 3583, 3839, 3967, 4031, 4063, 4079, 4087, 4091, 4093, 4094, 4095},

W_PO={3572, 3573, 3574, 3575, 3579, 3581, 3582, 3583, 3839, 3967, 4031, 4063, 4079, 4087, 4091, 4093, 4094, 4095},

W_PO={3576, 3577, 3578, 3579, 3581, 3582, 3583, 3839, 3967, 4031, 4063, 4079, 4087, 4091, 4093, 4094, 4095},

W_PO={3580, 3581, 3582, 3583, 3839, 3967, 4031, 4063, 4079, 4087, 4091, 4093, 4094, 4095},

W_PO={3584, 3585, 3586, 3587, 3589, 3590, 3591, 3595, 3597, 3598, 3599, 3607, 3611, 3613, 3614, 3615, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3588, 3589, 3590, 3591, 3595, 3597, 3598, 3599, 3607, 3611, 3613, 3614, 3615, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3592, 3593, 3594, 3595, 3597, 3598, 3599, 3607, 3611, 3613, 3614, 3615, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3596, 3597, 3598, 3599, 3607, 3611, 3613, 3614, 3615, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3600, 3601, 3602, 3603, 3605, 3606, 3607, 3611, 3613, 3614, 3615, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3604, 3605, 3606, 3607, 3611, 3613, 3614, 3615, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3608, 3609, 3610, 3611, 3613, 3614, 3615, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3612, 3613, 3614, 3615, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3616, 3617, 3618, 3619, 3621, 3622, 3623, 3627, 3629, 3630, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3620, 3621, 3622, 3623, 3627, 3629, 3630, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3624, 3625, 3626, 3627, 3629, 3630, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3628, 3629, 3630, 3631, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3632, 3633, 3634, 3635, 3637, 3638, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3636, 3637, 3638, 3639, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3640, 3641, 3642, 3643, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3644, 3645, 3646, 3647, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3648, 3649, 3650, 3651, 3653, 3654, 3655, 3659, 3661, 3662, 3663, 3671, 3675, 3677, 3678, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3652, 3653, 3654, 3655, 3659, 3661, 3662, 3663, 3671, 3675, 3677, 3678, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3656, 3657, 3658, 3659, 3661, 3662, 3663, 3671, 3675, 3677, 3678, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3660, 3661, 3662, 3663, 3671, 3675, 3677, 3678, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3664, 3665, 3666, 3667, 3669, 3670, 3671, 3675, 3677, 3678, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3668, 3669, 3670, 3671, 3675, 3677, 3678, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3672, 3673, 3674, 3675, 3677, 3678, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3676, 3677, 3678, 3679, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3680, 3681, 3682, 3683, 3685, 3686, 3687, 3691, 3693, 3694, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3684, 3685, 3686, 3687, 3691, 3693, 3694, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3688, 3689, 3690, 3691, 3693, 3694, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3692, 3693, 3694, 3695, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3696, 3697, 3698, 3699, 3701, 3702, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3700, 3701, 3702, 3703, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3704, 3705, 3706, 3707, 3709, 3710, 3711, 3775, 3807, 3823, 3831, 3835, 3837, 3838, 3839, 3967, 4031, 4063, 4079, 4087, 4091, 4093, 4094, 4095},

W_PO={3708, 3709, 3710, 3711, 3775, 3807, 3823, 3831, 3835, 3837, 3838, 3839, 3967, 4031, 4063, 4079, 4087, 4091, 4093, 4094, 4095},

W_PO={3712, 3713, 3714, 3715, 3717, 3718, 3719, 3723, 3725, 3726, 3727, 3735, 3739, 3741, 3742, 3743, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3716, 3717, 3718, 3719, 3723, 3725, 3726, 3727, 3735, 3739, 3741, 3742, 3743, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3720, 3721, 3722, 3723, 3725, 3726, 3727, 3735, 3739, 3741, 3742, 3743, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3724, 3725, 3726, 3727, 3735, 3739, 3741, 3742, 3743, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3728, 3729, 3730, 3731, 3733, 3734, 3735, 3739, 3741, 3742, 3743, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3732, 3733, 3734, 3735, 3739, 3741, 3742, 3743, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3736, 3737, 3738, 3739, 3741, 3742, 3743, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3740, 3741, 3742, 3743, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3744, 3745, 3746, 3747, 3749, 3750, 3751, 3755, 3757, 3758, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3748, 3749, 3750, 3751, 3755, 3757, 3758, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3752, 3753, 3754, 3755, 3757, 3758, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3756, 3757, 3758, 3759, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3760, 3761, 3762, 3763, 3765, 3766, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3764, 3765, 3766, 3767, 3771, 3773, 3774, 3775, 3807, 3823, 3831, 3835, 3837, 3838, 3839, 3967, 4031, 4063, 4079, 4087, 4091, 4093, 4094, 4095},

W_PO={3768, 3769, 3770, 3771, 3773, 3774, 3775, 3807, 3823, 3831, 3835, 3837, 3838, 3839, 3967, 4031, 4063, 4079, 4087, 4091, 4093, 4094, 4095},

W_PO={3772, 3773, 3774, 3775, 3807, 3823, 3831, 3835, 3837, 3838, 3839, 3967, 4031, 4063, 4079, 4087, 4091, 4093, 4094, 4095},

W_PO={3776, 3777, 3778, 3779, 3781, 3782, 3783, 3787, 3789, 3790, 3791, 3799, 3803, 3805, 3806, 3807, 3823, 3831, 3835, 3837, 3838, 3839, 3967, 4031, 4063, 4079, 4087, 4091, 4093, 4094, 4095},

W_PO={3780, 3781, 3782, 3783, 3787, 3789, 3790, 3791, 3799, 3803, 3805, 3806, 3807, 3823, 3831, 3835, 3837, 3838, 3839, 3967, 4031, 4063, 4079, 4087, 4091, 4093, 4094, 4095},

W_PO={3784, 3785, 3786, 3787, 3789, 3790, 3791, 3799, 3803, 3805, 3806, 3807, 3823, 3831, 3835, 3837, 3838, 3839, 3967, 4031, 4063, 4079, 4087, 4091, 4093, 4094, 4095},

W_PO={3788, 3789, 3790, 3791, 3799, 3803, 3805, 3806, 3807, 3823, 3831, 3835, 3837, 3838, 3839, 3967, 4031, 4063, 4079, 4087, 4091, 4093, 4094, 4095},

W_PO={3792, 3793, 3794, 3795, 3797, 3798, 3799, 3803, 3805, 3806, 3807, 3823, 3831, 3835, 3837, 3838, 3839, 3967, 4031, 4063, 4079, 4087, 4091, 4093, 4094, 4095},

W_PO={3796, 3797, 3798, 3799, 3803, 3805, 3806, 3807, 3823, 3831, 3835, 3837, 3838, 3839, 3967, 4031, 4063, 4079, 4087, 4091, 4093, 4094, 4095},

W_PO={3800, 3801, 3802, 3803, 3805, 3806, 3807, 3823, 3831, 3835, 3837, 3838, 3839, 3967, 4031, 4063, 4079, 4087, 4091, 4093, 4094, 4095},

W_PO={3804, 3805, 3806, 3807, 3823, 3831, 3835, 3837, 3838, 3839, 3967, 4031, 4063, 4079, 4087, 4091, 4093, 4094, 4095},

W_PO={3808, 3809, 3810, 3811, 3813, 3814, 3815, 3819, 3821, 3822, 3823, 3831, 3835, 3837, 3838, 3839, 3967, 4031, 4063, 4079, 4087, 4091, 4093, 4094, 4095},

W_PO={3812, 3813, 3814, 3815, 3819, 3821, 3822, 3823, 3831, 3835, 3837, 3838, 3839, 3967, 4031, 4063, 4079, 4087, 4091, 4093, 4094, 4095},

W_PO={3816, 3817, 3818, 3819, 3821, 3822, 3823, 3831, 3835, 3837, 3838, 3839, 3967, 4031, 4063, 4079, 4087, 4091, 4093, 4094, 4095},

W_PO={3820, 3821, 3822, 3823, 3831, 3835, 3837, 3838, 3839, 3967, 4031, 4063, 4079, 4087, 4091, 4093, 4094, 4095},

W_PO={3824, 3825, 3826, 3827, 3829, 3830, 3831, 3835, 3837, 3838, 3839, 3967, 4031, 4063, 4079, 4087, 4091, 4093, 4094, 4095},

W_PO={3828, 3829, 3830, 3831, 3835, 3837, 3838, 3839, 3967, 4031, 4063, 4079, 4087, 4091, 4093, 4094, 4095},

W_PO={3832, 3833, 3834, 3835, 3837, 3838, 3839, 3967, 4031, 4063, 4079, 4087, 4091, 4093, 4094, 4095},

W_PO={3836, 3837, 3838, 3839, 3967, 4031, 4063, 4079, 4087, 4091, 4093, 4094, 4095},

W_PO={3840, 3841, 3842, 3843, 3845, 3846, 3847, 3851, 3853, 3854, 3855, 3863, 3867, 3869, 3870, 3871, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3844, 3845, 3846, 3847, 3851, 3853, 3854, 3855, 3863, 3867, 3869, 3870, 3871, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3848, 3849, 3850, 3851, 3853, 3854, 3855, 3863, 3867, 3869, 3870, 3871, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3852, 3853, 3854, 3855, 3863, 3867, 3869, 3870, 3871, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3856, 3857, 3858, 3859, 3861, 3862, 3863, 3867, 3869, 3870, 3871, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3860, 3861, 3862, 3863, 3867, 3869, 3870, 3871, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3864, 3865, 3866, 3867, 3869, 3870, 3871, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3868, 3869, 3870, 3871, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3872, 3873, 3874, 3875, 3877, 3878, 3879, 3883, 3885, 3886, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3876, 3877, 3878, 3879, 3883, 3885, 3886, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3880, 3881, 3882, 3883, 3885, 3886, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3884, 3885, 3886, 3887, 3895, 3899, 3901, 3902, 3903, 3935, 3951, 3959, 3963, 3965, 3966, 3967, 4031, 4063, 4079, 4087, 4091, 4093, 4094, 4095},

W_PO={3888, 3889, 3890, 3891, 3893, 3894, 3895, 3899, 3901, 3902, 3903, 3935, 3951, 3959, 3963, 3965, 3966, 3967, 4031, 4063, 4079, 4087, 4091, 4093, 4094, 4095},

W_PO={3892, 3893, 3894, 3895, 3899, 3901, 3902, 3903, 3935, 3951, 3959, 3963, 3965, 3966, 3967, 4031, 4063, 4079, 4087, 4091, 4093, 4094, 4095},

W_PO={3896, 3897, 3898, 3899, 3901, 3902, 3903, 3935, 3951, 3959, 3963, 3965, 3966, 3967, 4031, 4063, 4079, 4087, 4091, 4093, 4094, 4095},

W_PO={3900, 3901, 3902, 3903, 3935, 3951, 3959, 3963, 3965, 3966, 3967, 4031, 4063, 4079, 4087, 4091, 4093, 4094, 4095},

W_PO={3904, 3905, 3906, 3907, 3909, 3910, 3911, 3915, 3917, 3918, 3919, 3927, 3931, 3933, 3934, 3935, 3951, 3959, 3963, 3965, 3966, 3967, 4031, 4063, 4079, 4087, 4091, 4093, 4094, 4095},

W_PO={3908, 3909, 3910, 3911, 3915, 3917, 3918, 3919, 3927, 3931, 3933, 3934, 3935, 3951, 3959, 3963, 3965, 3966, 3967, 4031, 4063, 4079, 4087, 4091, 4093, 4094, 4095},

W_PO={3912, 3913, 3914, 3915, 3917, 3918, 3919, 3927, 3931, 3933, 3934, 3935, 3951, 3959, 3963, 3965, 3966, 3967, 4031, 4063, 4079, 4087, 4091, 4093, 4094, 4095},

W_PO={3916, 3917, 3918, 3919, 3927, 3931, 3933, 3934, 3935, 3951, 3959, 3963, 3965, 3966, 3967, 4031, 4063, 4079, 4087, 4091, 4093, 4094, 4095},

W_PO={3920, 3921, 3922, 3923, 3925, 3926, 3927, 3931, 3933, 3934, 3935, 3951, 3959, 3963, 3965, 3966, 3967, 4031, 4063, 4079, 4087, 4091, 4093, 4094, 4095},

W_PO={3924, 3925, 3926, 3927, 3931, 3933, 3934, 3935, 3951, 3959, 3963, 3965, 3966, 3967, 4031, 4063, 4079, 4087, 4091, 4093, 4094, 4095},

W_PO={3928, 3929, 3930, 3931, 3933, 3934, 3935, 3951, 3959, 3963, 3965, 3966, 3967, 4031, 4063, 4079, 4087, 4091, 4093, 4094, 4095},

W_PO={3932, 3933, 3934, 3935, 3951, 3959, 3963, 3965, 3966, 3967, 4031, 4063, 4079, 4087, 4091, 4093, 4094, 4095},

W_PO={3936, 3937, 3938, 3939, 3941, 3942, 3943, 3947, 3949, 3950, 3951, 3959, 3963, 3965, 3966, 3967, 4031, 4063, 4079, 4087, 4091, 4093, 4094, 4095},

W_PO={3940, 3941, 3942, 3943, 3947, 3949, 3950, 3951, 3959, 3963, 3965, 3966, 3967, 4031, 4063, 4079, 4087, 4091, 4093, 4094, 4095},

W_PO={3944, 3945, 3946, 3947, 3949, 3950, 3951, 3959, 3963, 3965, 3966, 3967, 4031, 4063, 4079, 4087, 4091, 4093, 4094, 4095},

W_PO={3948, 3949, 3950, 3951, 3959, 3963, 3965, 3966, 3967, 4031, 4063, 4079, 4087, 4091, 4093, 4094, 4095},

W_PO={3952, 3953, 3954, 3955, 3957, 3958, 3959, 3963, 3965, 3966, 3967, 4031, 4063, 4079, 4087, 4091, 4093, 4094, 4095},

W_PO={3956, 3957, 3958, 3959, 3963, 3965, 3966, 3967, 4031, 4063, 4079, 4087, 4091, 4093, 4094, 4095},

W_PO={3960, 3961, 3962, 3963, 3965, 3966, 3967, 4031, 4063, 4079, 4087, 4091, 4093, 4094, 4095},

W_PO={3964, 3965, 3966, 3967, 4031, 4063, 4079, 4087, 4091, 4093, 4094, 4095},

W_PO={3968, 3969, 3970, 3971, 3973, 3974, 3975, 3979, 3981, 3982, 3983, 3991, 3995, 3997, 3998, 3999, 4015, 4023, 4027, 4029, 4030, 4031, 4063, 4079, 4087, 4091, 4093, 4094, 4095},

W_PO={3972, 3973, 3974, 3975, 3979, 3981, 3982, 3983, 3991, 3995, 3997, 3998, 3999, 4015, 4023, 4027, 4029, 4030, 4031, 4063, 4079, 4087, 4091, 4093, 4094, 4095},

W_PO={3976, 3977, 3978, 3979, 3981, 3982, 3983, 3991, 3995, 3997, 3998, 3999, 4015, 4023, 4027, 4029, 4030, 4031, 4063, 4079, 4087, 4091, 4093, 4094, 4095},

W_PO={3980, 3981, 3982, 3983, 3991, 3995, 3997, 3998, 3999, 4015, 4023, 4027, 4029, 4030, 4031, 4063, 4079, 4087, 4091, 4093, 4094, 4095},

W_PO={3984, 3985, 3986, 3987, 3989, 3990, 3991, 3995, 3997, 3998, 3999, 4015, 4023, 4027, 4029, 4030, 4031, 4063, 4079, 4087, 4091, 4093, 4094, 4095},

W_PO={3988, 3989, 3990, 3991, 3995, 3997, 3998, 3999, 4015, 4023, 4027, 4029, 4030, 4031, 4063, 4079, 4087, 4091, 4093, 4094, 4095},

W_PO={3992, 3993, 3994, 3995, 3997, 3998, 3999, 4015, 4023, 4027, 4029, 4030, 4031, 4063, 4079, 4087, 4091, 4093, 4094, 4095},

W_PO={3996, 3997, 3998, 3999, 4015, 4023, 4027, 4029, 4030, 4031, 4063, 4079, 4087, 4091, 4093, 4094, 4095},

W_PO={4000, 4001, 4002, 4003, 4005, 4006, 4007, 4011, 4013, 4014, 4015, 4023, 4027, 4029, 4030, 4031, 4063, 4079, 4087, 4091, 4093, 4094, 4095},

W_PO={4004, 4005, 4006, 4007, 4011, 4013, 4014, 4015, 4023, 4027, 4029, 4030, 4031, 4063, 4079, 4087, 4091, 4093, 4094, 4095},

W_PO={4008, 4009, 4010, 4011, 4013, 4014, 4015, 4023, 4027, 4029, 4030, 4031, 4063, 4079, 4087, 4091, 4093, 4094, 4095},

W_PO={4012, 4013, 4014, 4015, 4023, 4027, 4029, 4030, 4031, 4063, 4079, 4087, 4091, 4093, 4094, 4095},

W_PO={4016, 4017, 4018, 4019, 4021, 4022, 4023, 4027, 4029, 4030, 4031, 4063, 4079, 4087, 4091, 4093, 4094, 4095},

W_PO={4020, 4021, 4022, 4023, 4027, 4029, 4030, 4031, 4063, 4079, 4087, 4091, 4093, 4094, 4095},

W_PO={4024, 4025, 4026, 4027, 4029, 4030, 4031, 4063, 4079, 4087, 4091, 4093, 4094, 4095},

W_PO={4028, 4029, 4030, 4031, 4063, 4079, 4087, 4091, 4093, 4094, 4095},

W_PO={4032, 4033, 4034, 4035, 4037, 4038, 4039, 4043, 4045, 4046, 4047, 4055, 4059, 4061, 4062, 4063, 4079, 4087, 4091, 4093, 4094, 4095},

W_PO={4036, 4037, 4038, 4039, 4043, 4045, 4046, 4047, 4055, 4059, 4061, 4062, 4063, 4079, 4087, 4091, 4093, 4094, 4095},

W_PO={4040, 4041, 4042, 4043, 4045, 4046, 4047, 4055, 4059, 4061, 4062, 4063, 4079, 4087, 4091, 4093, 4094, 4095},

W_PO={4044, 4045, 4046, 4047, 4055, 4059, 4061, 4062, 4063, 4079, 4087, 4091, 4093, 4094, 4095},

W_PO={4048, 4049, 4050, 4051, 4053, 4054, 4055, 4059, 4061, 4062, 4063, 4079, 4087, 4091, 4093, 4094, 4095},

W_PO={4052, 4053, 4054, 4055, 4059, 4061, 4062, 4063, 4079, 4087, 4091, 4093, 4094, 4095},

W_PO={4056, 4057, 4058, 4059, 4061, 4062, 4063, 4079, 4087, 4091, 4093, 4094, 4095},

W_PO={4060, 4061, 4062, 4063, 4079, 4087, 4091, 4093, 4094, 4095},

W_PO={4064, 4065, 4066, 4067, 4069, 4070, 4071, 4075, 4077, 4078, 4079, 4087, 4091, 4093, 4094, 4095},

W_PO={4068, 4069, 4070, 4071, 4075, 4077, 4078, 4079, 4087, 4091, 4093, 4094, 4095},

W_PO={4072, 4073, 4074, 4075, 4077, 4078, 4079, 4087, 4091, 4093, 4094, 4095}

W_PO={4076, 4077, 4078, 4079, 4087, 4091, 4093, 4094, 4095},

W_PO={4080, 4081, 4082, 4083, 4085, 4086, 4087, 4091, 4093, 4094, 4095},

W_PO={4084, 4085, 4086, 4087, 4091, 4093, 4094, 4095},

W_PO={4088, 4089, 4090, 4091, 4093, 4094, 4095}, or W_PO={4092, 4093, 4094, 4095}.

The sequences show a reliability order between bit indices for which PO1 and PO2 are to be evaluated from among bit indices greater than or equal to 1024 and less than 4096. In some implementations of the present disclosure, a sequence of bit indices 1024 to N−1 in each polar sequence with N=4096 may contain one of the sequences as a nested structure. For example, the $W_{4096}$ contains each of the sequences as a subset.

Partial sequences to be provided in a nested structure in a sequence including bit indices 1024 to N−1 in a polar sequence with N=2048 may be obtained by removing bit indices greater than or equal to 2048 from each of the sequences. The $W_{4096}$ contains each of the partial sequences as a subset. In some implementations of the present disclosure, a sequence of bit indices 1024 to N−1 in each polar sequence with N=2048 may contain one of the partial sequences as a nested structure. For example, in a polar sequence $Q^{N-1}_0$ with N=4096, a partial order relation may be evaluated from bit indices $1024 <= Q^N_i < 4096$, and when bit indices satisfying $W(Q^N_x) < W(Q^N_y)$ for $Q^N_x < Q^N_y$ include 1024, 1025, 1026, 1027, 1029, 1030, 1031, 1035, 1037, 1038, 1039, 1047, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095}, a partial order relation may be evaluated from bit indices $1024 <= Q^N_i, < 2048$ in a polar sequence $Q^{N-1}_0$ with N=2048, and bit indices satisfying $W(Q^N_x) < W(Q^N_y)$ for $Q^N_x < Q^N_y$ may include {1024, 1025, 1026, 1027, 1029, 1030, 1031, 1035, 1037, 1038, 1039, 1047, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047}.

In some implementations of the present disclosure, as another method, a reliability order W of a polar code with N=4096 may be shared as a parameter such that a transmission end and a reception end may obtain the reliability order W without being defined in the standard. For example, general provisions for Principles 1 and 2 are specified in the standard, and parameter(s) required to obtain a reliability order for a mother code size (e.g., $n_u$ used in GPO calculation or erasure probability used in Battacharyya parameter calculation) are shared between the transmission end and the reception end, and thus the transmission end and the reception end may obtain a reliability order of a polar code. In this case, the parameter(s) used to obtain the reliability order of the polar code may be shared using a radio resource control (RRC) layer, a medium access control (MAC) layer, and/or physical layer (i.e., L1) signaling, and when the polar code is used during an initial access process, may be shared using a master information block (MIB) and/or a system information block (SIB).

According to some implementations of the present disclosure, the reliability order of bit channels of a polar code with a mother code size greater than 1024 may be obtained. According to some implementations of the present disclosure, a polar code may also be used for encoding/decoding channels with N>1024. In some implementations of the present disclosure, backward compatibility with communication systems based on existing NR standards may be maintained by complying with the reliability order of the existing NR standard up to mother code size 1024. In some implementations of the present disclosure, optimal performance of polar codes may be ensured to some extent regardless of the state and/or type of the channel, by determining a reliability order according to a partial order of bit indices for complying with a relationship of partial order. According to some implementations of the present disclosure, a wireless communication system using a polar code may be implemented efficiently.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL AVAILABILITY

The implementations of the present disclosure may be used in a BS, a UE, or other equipment in a wireless communication system.

The invention claimed is:

1. A channel encoding method by a communication device in a wireless communication system, the method comprising:

determining an information block input to channel encoding;

encoding the information block based on a polar sequence $Q^{N-1}_0 = \{Q_0, Q_1, \ldots, Q_{N-1}\}$ to produce N encoded bits;

performing rate matching on the encoded bits to produce rate-matched bits; and transmitting the rate-matched bits, wherein $0 <= Q^N_i <= N-1$ is a bit index for $i = 0, 1, \ldots$, and $N-1$, wherein the polar sequence $Q^{N-1}_0$ is defined in ascending order of reliability $W(Q^N_0) < W(Q^N_1) < \ldots < W(Q^N_{N-1})$, $W(Q^N_i)$ being reliability of a bit index $Q^N_i$, wherein $N > 1024$, wherein a reliability order between bit indices 0 to 1023 in the polar sequence $Q^{N-1}_0$ is equal to a reliability order between bit indices 0 to 1023 in a predefined polar sequence $Q_0^{Nmax-1}$ with Nmax=1024, and wherein, from among bit indices greater than or equal to 1024 in the polar sequence $Q^{N-1}_0$, bit indices for which a partial order is to be evaluated satisfy $W(Q^N_x) < W(Q^N_y)$ for at least $Q^N_x < Q^N_y$.

2. The method of claim 1, wherein the predefined polar sequence $Q_0^{Nmax-1} = \{Q_0^{Nmax}, Q_1^{Nmax}, \ldots, Q_{Nmax-1}^{Nmax}\} = \{0, 1, 2, 4, 8, 16, 32, 3, 5, 64, 9, 6, 17, 10, 18, 128, 12, 33, 65, 20, 256, 34, 24, 36, 7, 129, 66, 512, 11, 40, 68, 130, 19, 13, 48, 14, 72, 257, 21, 132, 35, 258, 26, 513, 80, 37, 25, 22, 136, 260, 264, 38, 514, 96, 67, 41, 144, 28, 69, 42, 516, 49, 74, 272, 160, 520, 288, 528, 192, 544, 70, 44, 131, 81, 50, 73, 15, 320, 133, 52, 23, 134, 384, 76, 137, 82, 56, 27, 97, 39, 259, 84, 138, 145, 261, 29, 43, 98, 515, 88, 140, 30, 146, 71, 262, 265, 161, 576, 45, 100, 640, 51, 148, 46, 75, 266, 273, 517, 104, 162, 53, 193, 152, 77, 164, 768, 268, 274, 518, 54, 83, 57, 521, 112, 135, 78, 289, 194, 85, 276, 522, 58, 168, 139, 99, 86, 60, 280, 89, 290, 529, 524, 196, 141, 101, 147, 176, 142, 530, 321, 31, 200, 90, 545, 292, 322, 532, 263, 149, 102, 105, 304, 296, 163, 92, 47, 267, 385, 546, 324, 208, 386, 150, 153, 165, 106, 55, 328, 536, 577, 548, 113, 154, 79, 269, 108, 578, 224, 166, 519, 552, 195, 270, 641, 523, 275, 580, 291, 59, 169, 560, 114, 277, 156, 87, 197, 116, 170, 61, 531, 525, 642, 281, 278, 526, 177, 293, 388, 91, 584, 769, 198, 172, 120, 201, 336, 62, 282, 143, 103, 178, 294, 93, 644, 202, 592, 323, 392, 297, 770, 107, 180, 151, 209, 284, 648, 94, 204, 298, 400, 608, 352, 325, 533, 155, 210, 305, 547, 300, 109, 184, 534, 537, 115, 167, 225, 326, 306, 772, 157, 656, 329, 110, 117, 212, 171, 776, 330, 226, 549, 538, 387, 308, 216, 416, 271, 279, 158, 337, 550, 672, 118, 332, 579, 540, 389, 173, 121, 553, 199, 784, 179, 228, 338, 312, 704, 390, 174, 554, 581, 393, 283, 122, 448, 353, 561, 203, 63, 340, 394, 527, 582, 556, 181, 295, 285, 232, 124, 205, 182, 643, 562, 286, 585, 299, 354, 211, 401, 185, 396, 344, 586, 645, 593, 535, 240, 206, 95, 327, 564, 800, 402, 356, 307, 301, 417, 213, 568, 832, 588, 186, 646, 404, 227, 896, 594, 418, 302, 649, 771, 360, 539, 111, 331, 214, 309, 188, 449, 217, 408, 609, 596, 551, 650, 229, 159, 420, 310, 541, 773, 610, 657, 333, 119, 600, 339, 218, 368, 652, 230, 391, 313, 450, 542, 334, 233, 555, 774, 175, 123, 658, 612, 341, 777, 220, 314, 424, 395, 673, 583, 355, 287, 183, 234, 125, 557, 660, 616, 342, 316, 241, 778, 563, 345, 452, 397, 403, 207, 674, 558, 785, 432, 357, 187, 236, 664, 624, 587, 780, 705, 126, 242, 565, 398, 346, 456, 358, 405, 303, 569, 244, 595, 189, 566, 676, 361, 706, 589, 215, 786, 647, 348, 419, 406, 464, 680, 801, 362, 590, 409, 570, 788, 597, 572, 219, 311, 708, 598, 601, 651, 421, 792, 802, 611, 602, 410, 231, 688, 653, 248, 369, 190, 364, 654, 659, 335, 480, 315, 221, 370, 613, 422, 425, 451, 614, 543, 235, 412, 343, 372, 775, 317, 222, 426, 453, 237, 559, 833, 804, 712, 834, 661, 808, 779, 617, 604, 433, 720, 816, 836, 347, 897, 243, 662, 454, 318, 675, 618, 898, 781, 376, 428, 665, 736, 567, 840, 625, 238, 359, 457, 399, 787, 591, 678, 434, 677, 349, 245, 458, 666, 620, 363, 127, 191, 782, 407, 436, 626, 571, 465, 681, 246, 707, 350, 599, 668, 790, 460, 249, 682, 573, 411, 803, 789, 709, 365, 440, 628, 689, 374, 423, 466, 793, 250, 371, 481, 574, 413, 603, 366, 468, 655, 900, 805, 615, 684, 710, 429, 794, 252, 373, 605, 848, 690, 713, 632, 482, 806, 427, 904, 414, 223, 663, 692, 835, 619, 472, 455, 796, 809, 714, 721, 837, 716, 864, 810, 606, 912, 722, 696, 377, 435, 817, 319, 621, 812, 484, 430, 838, 667, 488, 239, 378, 459, 622, 627, 437, 380, 818, 461, 496, 669, 679, 724, 841, 629, 351, 467, 438, 737, 251, 462, 442, 441, 469, 247, 683, 842, 738, 899, 670, 783, 849, 820, 728, 928, 791, 367, 901, 630, 685, 844, 633, 711, 253, 691, 824, 902, 686, 740, 850, 375, 444, 470, 483, 415, 485, 905, 795, 473, 634, 744, 852, 960, 865, 693, 797, 906, 715, 807, 474, 636, 694, 254, 717, 575, 913, 798, 811, 379, 697, 431, 607, 489, 866, 723, 486, 908, 718, 813, 476, 856, 839, 725, 698, 914, 752, 868, 819, 814, 439, 929, 490, 623, 671, 739, 916, 463, 843, 381, 497, 930, 821, 726, 961, 872, 492, 631, 729, 700, 443, 741, 845, 920, 382, 822, 851, 730, 498, 880, 742, 445, 471, 635, 932, 687, 903, 825, 500, 846, 745, 826, 732, 446, 962, 936, 475, 853, 867, 637, 907, 487, 695, 746, 828, 753, 854, 857, 504, 799, 255, 964, 909, 719, 477, 915, 638, 748, 944, 869, 491, 699, 754, 858, 478, 968, 383, 910, 815, 976, 870, 917, 727, 493, 873, 701, 931, 756, 860, 499, 731, 823, 922, 874, 918, 502, 933, 743, 760, 881, 494, 702, 921, 501, 876, 847, 992, 447, 733, 827, 934, 882, 937, 963, 747, 505, 855, 924, 734, 829, 965, 938, 884, 506, 749, 945, 966, 755, 859, 940, 830, 911, 871, 639, 888, 479, 946, 750, 969, 508, 861, 757, 970, 919, 875, 862, 758, 948, 977, 923, 972, 761, 877, 952, 495, 703, 935, 978, 883, 762, 503, 925, 878, 735, 993, 885, 939, 994, 980, 926, 764, 941, 967, 886, 831, 947, 507, 889, 984, 751, 942, 996, 971, 890, 509, 949, 973, 1000, 892, 950, 863, 759, 1008, 510, 979, 953, 763, 974, 954, 879, 981, 982, 927, 995, 765, 956, 887, 985, 997, 986, 943, 891, 998, 766, 511, 988, 1001, 951, 1002, 893, 975, 894, 1009, 955, 1004, 1010, 957, 983, 958, 987, 1012, 999, 1016, 767, 989, 1003, 990, 1005, 959, 1011, 1013, 895, 1006, 1014, 1017, 1018, 991, 1020, 1007, 1015, 1019, 1021, 1022, 1023}.

3. The method of claim 1, wherein, in a polar sequence $Q^{N-1}_0$ with N=4096, a partial order relation is to be evaluated from among bit indices $1024 <= Q^N_i < 4096$, and a sequence of bit indices satisfying $W(Q^N_x) < W(Q^N_y)$ for $Q^N_x < Q^N_y$ includes a sequence of {1024, 1025, 1026, 1027, 1029, 1030, 1031, 1035, 1037, 1038, 1039, 1047, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047, 3071, 3583, 3839, 3967, 4031, 4063, 4079, 4087, 4091, 4093, 4094, 4095}.

4. The method of claim 3, wherein, in a polar sequence $Q^{N-1}_0$ with N=2048, a partial order relation is to be evaluated from among bit indices $1024 <= Q^N_i < 2048$, and bit indices satisfying $W(Q^N_x) < W(Q^N_y)$ for $Q^N_x < Q^N_y$ includes {1024, 1025, 1026, 1027, 1029, 1030, 1031, 1035, 1037, 1038, 1039, 1047, 1051, 1053, 1054, 1055, 1071, 1079, 1083, 1085, 1086, 1087, 1119, 1135, 1143, 1147, 1149, 1150, 1151, 1215, 1247, 1263, 1271, 1275, 1277, 1278, 1279, 1407, 1471, 1503, 1519, 1527, 1531, 1533, 1534, 1535, 1791, 1919, 1983, 2015, 2031, 2039, 2043, 2045, 2046, 2047}.

5. The method of claim 1, wherein the transmitting of the rate-matched bits includes transmitting the rate-matched bits through a physical data channel.

6. The method of claim 5, wherein the data channel includes a physical uplink shared channel (PUSCH).

7. The method of claim 5, wherein the data channel includes a physical downlink shared channel (PDSCH).

8. A communication device for performing channel encoding in a wireless communication system, the communication device comprising:

at least one transceiver;

at least one processor; and at least one computer memory operably connected to the at least one processor and configured to store instructions that, when executed, cause the at least one processor to perform operations including:

determining an information block input to channel encoding;

encoding the information block based on a polar sequence $Q^{N-1}_0 = \{Q_0, Q_1, \ldots, Q_{N-1}\}$ to produce N encoded bits;

performing rate matching on the encoded bits to produce rate-matched bits; and transmitting the rate-matched bits, wherein $0 <= Q^N_i <= N-1$ is a bit index for i=0, 1, . . . , and N−1, wherein the polar sequence $Q^{N-1}_0$ is defined in ascending order of reliability $W(Q^N_0) < W(Q^N_1) < \ldots < W(Q^N_{N-1})$, $W(Q^N_i)$ being reliability of a bit index $Q^N_i$, wherein N>1024, wherein a reliability order between bit indices 0 to 1023 in the polar sequence $Q^{N-1}_0$ is equal to a reliability order between bit indices 0 to 1023 in a predefined polar sequence $Q_0^{Nmax-1}$ with Nmax=1024, and wherein, from among bit indices greater than or equal to 1024 in the polar sequence $Q^{N-1}_0$, bit indices for which a partial order is to be evaluated satisfy $W(Q^N_x) < W(Q^N_y)$ for at least $Q^N_x < Q^N_y$.

9. A communication device for performing channel decoding in a wireless communication system, the communication device comprising:

at least one transceiver;

at least one processor; and at least one computer memory operably connected to the at least one processor and configured to store instructions that, when executed, cause the at least one processor to perform operations including:

receiving encoded bits; and decoding the encoded bits based on a polar sequence $Q^{N-1}_0 = \{Q_0, Q_1, \ldots, Q_{N-1}\}$ to determine an information block, wherein $0 <= Q^N_i <= N-1$ is a bit index for i=0, 1, . . . , and N−1, wherein the polar sequence $Q^{N-1}_0$ is defined in ascending order of reliability $W(Q^N_0) < W(Q^N_1) < \ldots < W(Q^N_{N-1})$, $W(Q^N_i)$ being reliability of a bit index $Q^N_i$, wherein N>1024, wherein a reliability order between bit indices 0 to 1023 in the polar sequence $Q^{N-1}_0$ is equal to a reliability order between bit indices 0 to 1023 in a predefined polar sequence $Q_0^{Nmax-1}$ with Nmax=1024, and wherein, from among bit indices greater than or equal to 1024 in the polar sequence $Q^{N-1}_0$, bit indices for which a partial order is to be evaluated satisfy $W(Q^N_x) < W(Q^N_y)$ for at least $Q^N_x < Q^N_y$.

* * * * *